(12) United States Patent
Kii et al.

(10) Patent No.: US 7,478,249 B2
(45) Date of Patent: Jan. 13, 2009

(54) RECORDING METHOD AND APPARATUS, AND EDITING METHOD APPARATUS

(75) Inventors: Manabu Kii, Tokyo (JP); Seiji Ohbi, Tokyo (JP); Takashi Kawakami, Tokyo (JP); Masato Hattori, Kanagawa (JP)

(73) Assignee: Sony Corporation, Tokyo (JP)

( * ) Notice: Subject to any disclaimer, the term of this patent is extended or adjusted under 35 U.S.C. 154(b) by 983 days.

(21) Appl. No.: 10/403,096

(22) Filed: Apr. 1, 2003

(65) Prior Publication Data

US 2003/0185393 A1 Oct. 2, 2003

(30) Foreign Application Priority Data

Apr. 1, 2002 (JP) ............................. 2002-099277
Jun. 28, 2002 (JP) ............................. 2002-190812

(51) Int. Cl.
*G06F 12/14* (2006.01)
(52) U.S. Cl. ........................ 713/193; 713/194; 707/200; 707/205; 711/206; 711/207; 711/208
(58) Field of Classification Search ................. 713/194, 713/193; 380/201; 369/54; 360/1; 707/200, 707/205; 711/206, 207, 208; 386/4, 33, 386/39, 94
See application file for complete search history.

(56) References Cited

U.S. PATENT DOCUMENTS

| | | | |
|---|---|---|---|
| 5,394,382 A | | 2/1995 | Hu et al. |
| 5,444,687 A | | 8/1995 | Okumura |
| 5,553,048 A | * | 9/1996 | Maeda ..................... 369/47.34 |
| 5,832,525 A | * | 11/1998 | Wong et al. ................. 707/205 |
| 6,160,778 A | * | 12/2000 | Ito et al. ................... 369/53.15 |
| 6,226,618 B1 | * | 5/2001 | Downs et al. ................... 705/1 |
| 6,377,530 B1 | * | 4/2002 | Burrows .................. 369/59.21 |
| 6,434,103 B1 | * | 8/2002 | Shitara et al. ................. 369/83 |
| 6,853,727 B1 | * | 2/2005 | Foster et al. ................ 380/239 |
| 2002/0015252 A1 | * | 2/2002 | Noble et al. ............... 360/72.1 |

(Continued)

FOREIGN PATENT DOCUMENTS

DE 197 22 466 12/1997

(Continued)

OTHER PUBLICATIONS

U.S. Appl. No. 10/402,943, file Apr. 1, 2003, Tobita et al.

(Continued)

*Primary Examiner*—Kim Yen Vu
*Assistant Examiner*—Edward Zee
(74) *Attorney, Agent, or Firm*—Oblon, Spivak, McClelland, Maier & Neustadt, P.C.

(57) ABSTRACT

A recording method includes the steps of causing a first management system retained in a first apparatus to manage a storage medium loaded in a second apparatus when the first apparatus and the second apparatus are connected to one another; and recording the data to the storage medium based on a second management system which is retained in the second apparatus and which limits consecution of data recording segments when it is determined that data transferred from the first apparatus to the second apparatus are to be recorded to the storage medium. A recording apparatus and editing method and apparatus also manage data storage and editing between first and second apparatuses.

10 Claims, 58 Drawing Sheets

U.S. PATENT DOCUMENTS

2002/0048105 A1* 4/2002 Shin et al. .................... 360/1

FOREIGN PATENT DOCUMENTS

| EP | 0 613 135 | 8/1994 |
|---|---|---|
| EP | 1 152 412 | 11/2001 |
| GB | 2 344 925 | 6/2000 |
| JP | 07-175592 | 7/1995 |
| JP | 07-325669 | 12/1995 |
| JP | 08-273297 | 10/1996 |
| JP | 3043591 | 3/2000 |
| JP | 2000-267904 | 9/2000 |
| JP | 2000-322826 | 11/2000 |

OTHER PUBLICATIONS

U.S. Appl. No. 10/403,097, file Apr. 1, 2003, Hattori et al.
U.S. Appl. No. 10/403,075, file Apr. 1, 2003, Ohbi et al.
U.S. Appl. No. 10/403,486, file Apr. 1, 2003, Ohbi et al.
U.S. Appl. No. 10/402,924, file Apr. 1, 2003, Hattori et al.
U.S. Appl. No. 10/403,012, file Apr. 1, 2003, Kawakami et al.
U.S. Appl. No. 10/403,273, file Apr. 1, 2003, Ohbi et al.
U.S. Appl. No. 10/403,279, file Apr. 1, 2003, Hattori et al.
U.S. Appl. No. 10/403,298, file Apr. 1, 2003, Ohbi et al.
U.S. Appl. No. 10/403,096, file Apr. 1, 2003, Kii et al.
U.S. Appl. No. 10/403,498, file Apr. 1, 2003, Ohbi et al.

* cited by examiner

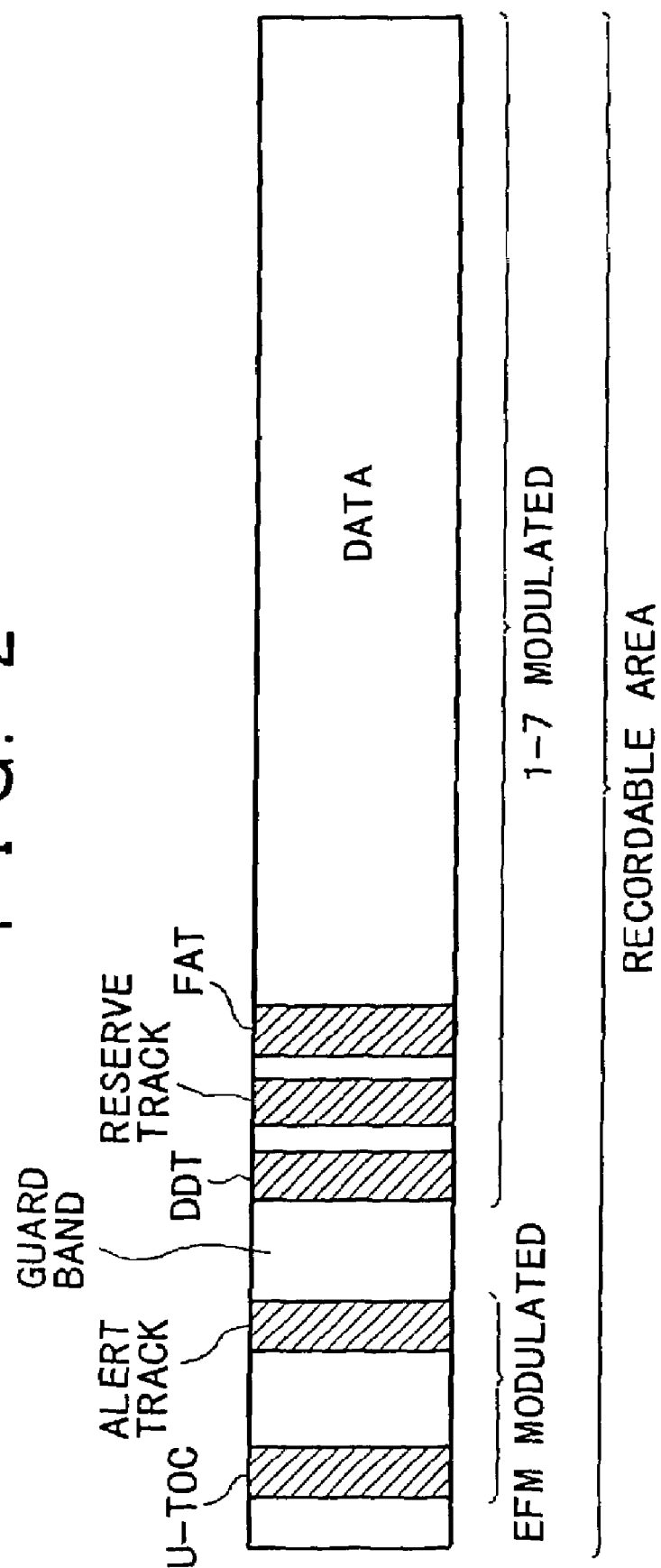

← DIRECTION OF MAGNETIC WALL SHIFT

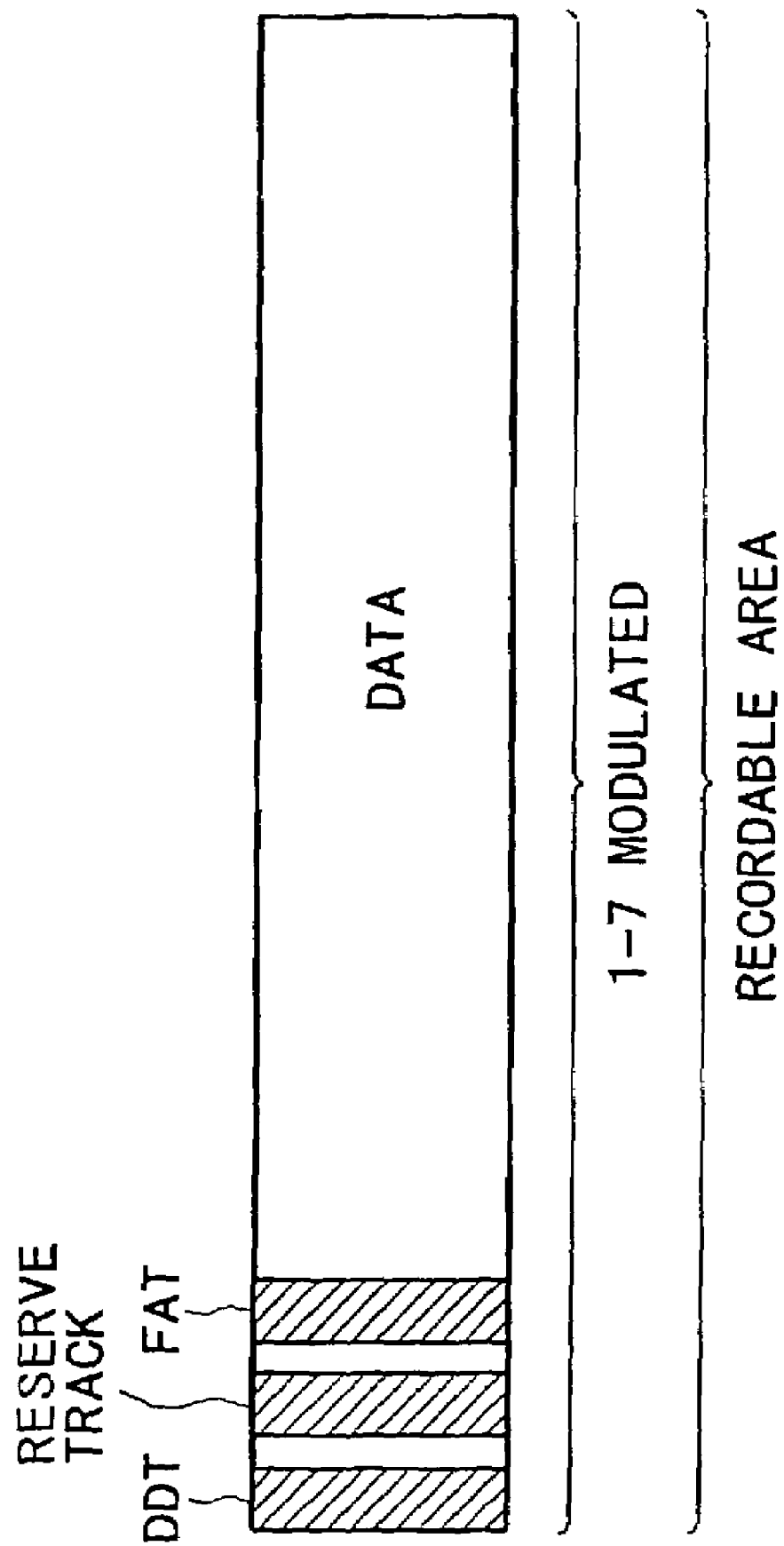

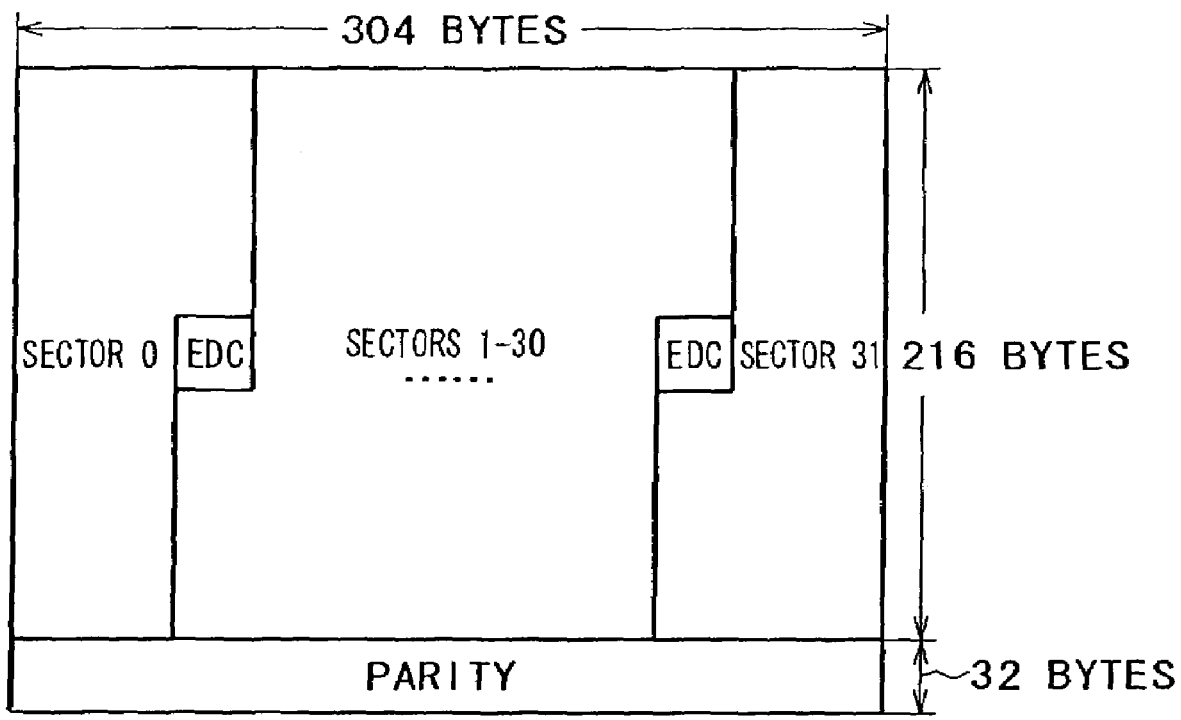
F I G. 5

F I G. 6
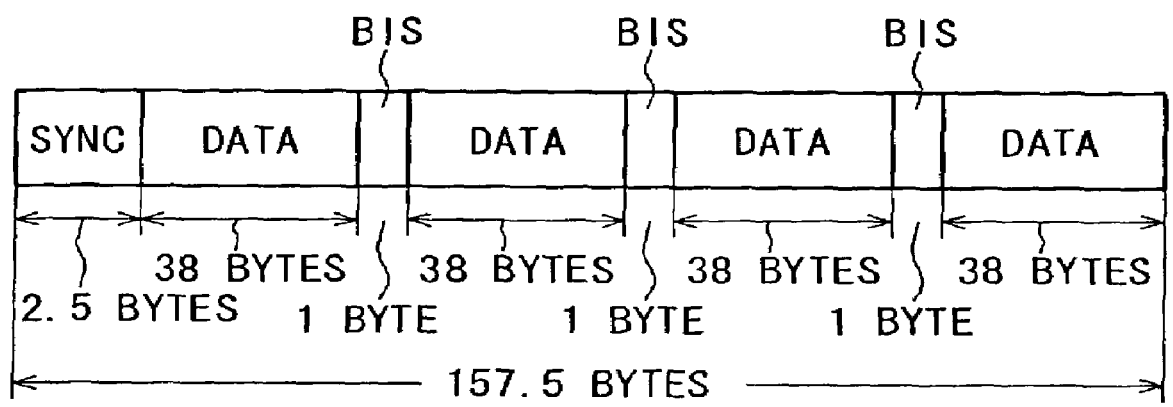

FIG. 20

| RECORDING BLOCK (RB) NO. | BIT |
|---|---|
| 0 | 0 |
| 1 | 0 |
| 2 | 1 |
| 3 | 0 |
| ⋮ | ⋮ |

| START TRACK NO. | END TRACK NO. | GROUP NAME | FLAG |

| CODING SYSTEM | | |
|---|---|---|
| COPYRIGHT MANAGEMENT INFORMATION | KEY INFORMATION | |
| PART NO. | ARTIST NAME | TITLE |
| ORIGINAL TITLE ORDER | RECORDING TIME | |

FIG. 38

TRACK INFORMATION TABLE

| TRACK DESCRIPTOR 0 |
| ARTIST |
| TRACK DESCRIPTOR 1 |
| ARTIST |
| TRACK DESCRIPTOR 2 |
| ARTIST |
| TRACK DESCRIPTOR 3 |
| ARTIST |
| TRACK DESCRIPTOR 4 |
| ARTIST |
| TRACK DESCRIPTOR 5 |
| ARTIST |
| TRACK DESCRIPTOR 6 |
| ARTIST |
| TRACK DESCRIPTOR 7 |
| ARTIST |

NAME TABLE

- ABC STARS
- DEF BAND
- GHQ GIRLS

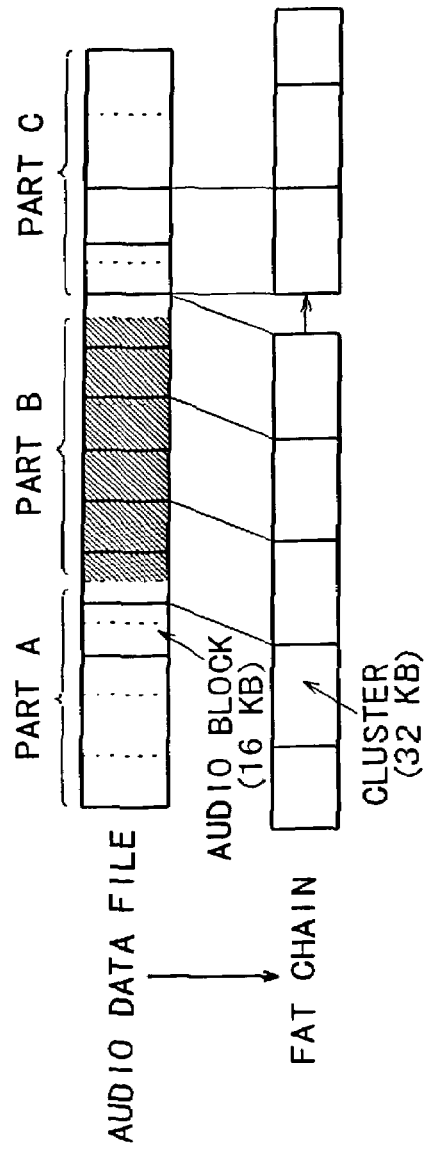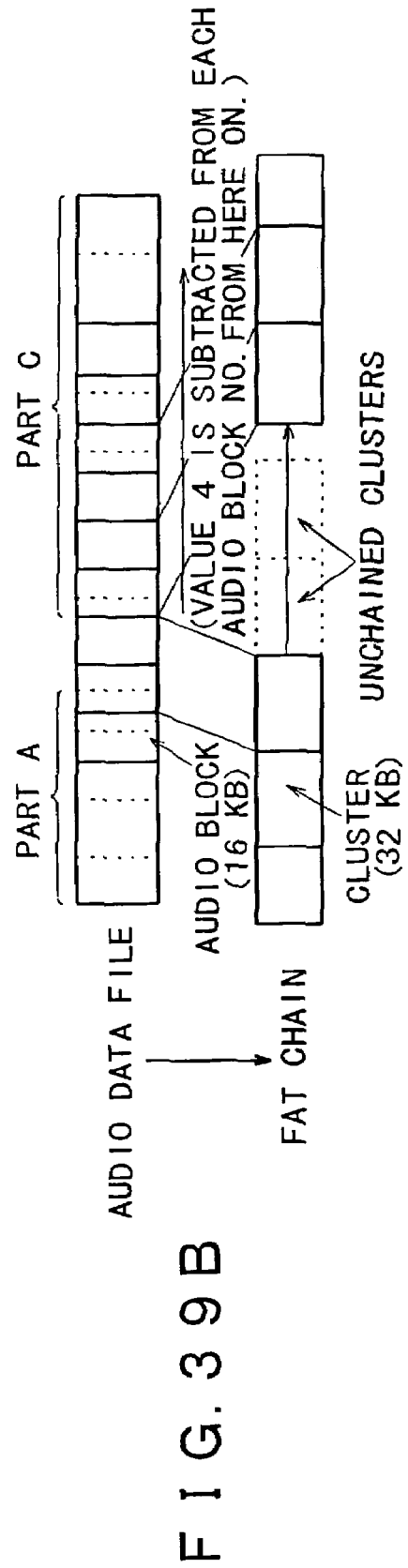

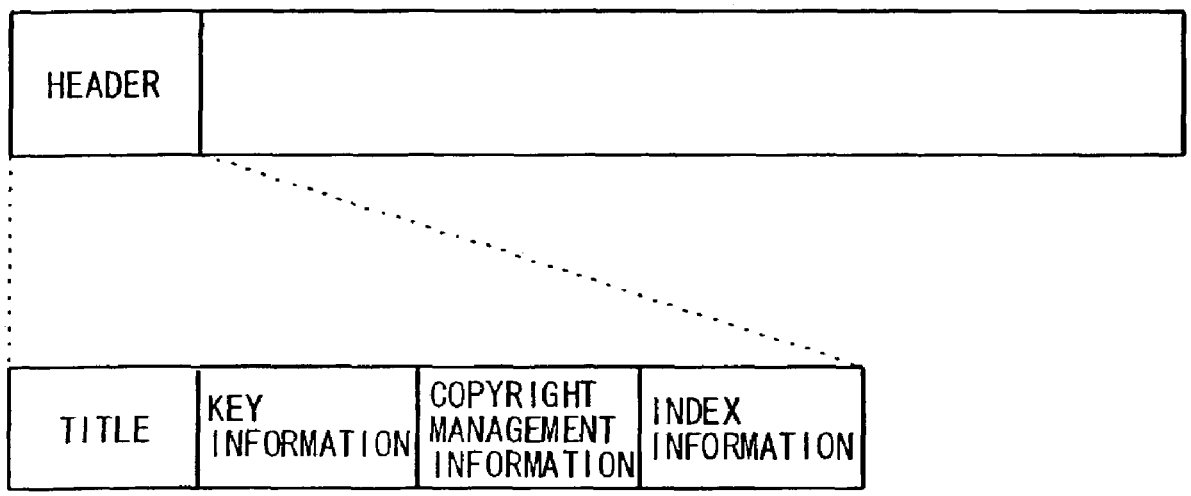
F I G. 4 1

FIG. 46A

| TRACK DESCRIPTOR 0 |
|---|
| TRACK DESCRIPTOR 1 |
| TRACK DESCRIPTOR 2 |
| ⋮ |
| TRACK DESCRIPTOR n |

FIG. 46B

| CODING SYSTEM | | | |
|---|---|---|---|
| AUDIO FILE | INDEX | ARTIST NAME | TITLE |
| ORIGINAL TITLE ORDER | | RECORDING TIME | |

FIG. 50
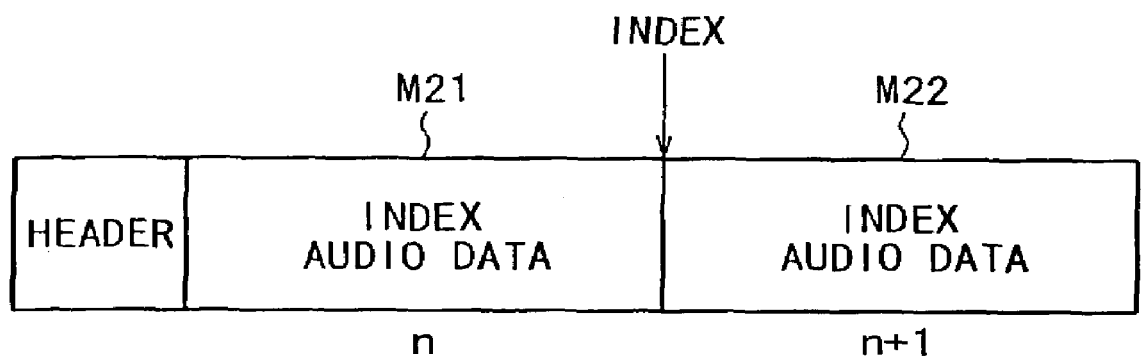
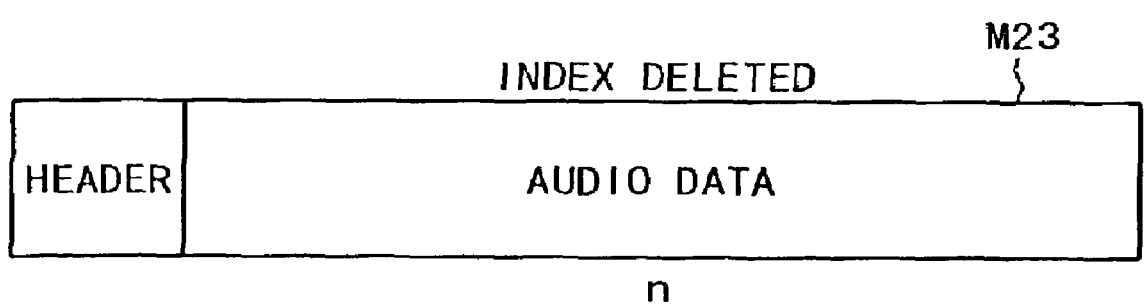

RECORDING METHOD AND APPARATUS, AND EDITING METHOD APPARATUS

BACKGROUND OF THE INVENTION

1. Field of the Invention

The present invention relates generally to a recording method and apparatus, and editing method and apparatus for functionally expanding a magneto-optical disc usable by a conventional mini-disc (MD) system, the expansion being made in such a manner as to maintain compatibility with the conventional MD system.

2. Discussion of the Background

The so-called Mini-disc (MD), a 64 mm-across magneto-optical disc housed in a cartridge, has gained widespread acceptance today as a storage medium to and from which digital audio data are recorded and reproduced.

The MD system adopts ATRAC (Adaptive TRansform Acoustic Coding) as its audio data compression method. ATRAC involves compression-coding audio data by what is called MDCT (Modified Discrete Cosine Transform). The audio data has been acquired through a predetermined time window. Typically, music data are compressed by ATRAC to one-fifth to one-tenth the original size.

The MD system utilizes a convolution code called ACIRC (Advanced Cross Interleave Reed-Solomon Code) as its error correction system and EFM (Eight-to-Fourteen Modulation) as its modulation technique. ACIRC is a convolution code that provides dual error correction on C1 and C2 sequences (in vertical and oblique directions). The method is used to carry out a powerful error correction process on sequential data such as audio data. One disadvantage of ACIRC is that it requires a linking sector arrangement for data update purposes. ACIRC and EFM are basically the same as those employed in a conventional compact disc (CD) system.

For music data management, the MD system uses U-TOC (User TOC [Table of Contents]). Specifically, a U-TOC area is furnished on an inner side of a recordable area of the disc. For the current MD system, U-TOC constitutes the track (audio track/data track) title sequence and management information that is updated to keep up with the recording or deletion of such tracks. Under the U-TOC scheme, each track (i.e., parts constituting each track) is managed in terms of start position, end position, and mode settings.

The disc for the MD system is small, inexpensive, and offers good characteristics when used by the system to record or reproduce audio data. These advantages have enabled the MD system to gain widespread market acceptance.

As recognized by the present inventors, MD systems have not fully achieved their potential in the market as they are not compatible with general purpose computers, such as personal computers. Moreover, conventional MD systems use different file management schemes than the File Allocation Table (FAT)-based file systems used in personal computers.

With more general use of personal computers and PC-based networking, more and more audio data are distributed over PC-based networks. Today, it is common practice for the user of a personal computer to use it as an audio server from which to download favorite music files to a portable data reproducing apparatus for music reproduction. As recognized by the present inventors, because the conventional MD system is not fully compatible with personal computers, a new MD system is desirable that would adopt a general-purpose management system, such as a FAT (File Allocation Table) system, to enhance PC-compatibility.

As explained in White, R., "How Computers Work, Millennium Edition" Que Corporation, pages 146 and 158 for example, 1999, the entire contents of which being incorporated herein by reference, the FAT is created by the disk drive on a particular disk sector, such as sector 0. The term "FAT" (or "FAT System") is used generically herein to describe various PC-based file systems, and is intended to cover the specific FAT-based file systems used in DOS, VFAT (virtual FAT) used in Windows 95/98, FAT 32 used in Windows 98/ME/2000, as well as NTFS (NT file system; sometimes New Technology File System) which is the file system used by Windows NT operating system, or optionally in Windows 2000 operating system, for storing and retrieving files on read/write disks. NTFS is the Windows NT equivalent of the Windows 95 file allocation table (FAT) and the OS/2 High Performance File System (HPFS).

Meanwhile, a higher degree of compatibility with personal computers means increased risk of unauthorized copying of copyrighted works, which in-turn requires better techniques to protect against unauthorized copying of audio works. One technological way of reinforcing copyright laws involves encrypting the audio works when recorded. It is also desired that music titles and artist names recorded on the disc be managed in a more efficient manner than at present.

The current MD system uses a disc with a storage capacity of about 160 MB, which, as recognized by the present inventors, is not always sufficient for the user's requirement for data storage. It is thus desired that the storage capacity of a new disc be boosted while remaining backwards-compatible with the current MD system.

SUMMARY OF THE INVENTION

It is therefore an object of the present invention to overcome the above and other deficiencies of the related art and to provide a reproducing method, reproducing apparatus, a recording method, and recording apparatus for efficiently managing audio data through the integration of the FAT system on MD media. Alternatively, other media formats be used as well in light of the teachings of the present disclosure.

While a "summary" of selected aspects of the invention are provided below, this summary is not intended to be an exhaustive listing of all novel attributes and combination of attributes of the present invention. Nor is this summary intended to be construed independent of the other aspects of the present disclosure.

In carrying out the invention and according to one aspect thereof, there is provided a recording method including the steps of causing a first management system retained in a first apparatus to manage a storage medium loaded in a second apparatus when the first apparatus and the second apparatus are connected to one another; and recording the data to the storage medium based on a second management system which is retained in the second apparatus and which limits consecution of data recording segments when it is determined that data transferred from the first apparatus to the second apparatus are to be recorded to the storage medium.

A feature of the first aspect of the present invention is that it further includes the step of recording the data to the storage medium under the second management system based on a write request command transferred from the first apparatus to the second apparatus.

Another feature of the first aspect of the present invention is that it further includes the steps of executing software instructions stored in a storing means within the first apparatus so as to output the write request command to record audio data stored in the storing means to the storage medium in response to a user-actuated instruction; transferring the write request command from the first apparatus to the second apparatus; reading-out the audio data from the storing means; executing other software instructions so as to compress the audio data and output compressed audio data; transferring the compressed audio data from the first apparatus to the second apparatus; and recording at the second apparatus the compressed audio data to the storage medium under the second management system according to the write request command.

Still another feature of the first aspect of the present invention is that it further includes the steps of searching for free areas having at least a predetermined physical length based on the second management system configured to manage a file stored in the storage medium; generating a track descriptor having an attribute of a track and an encryption key configured to encrypt the compressed audio data to be stored in the storage medium; generating a part descriptor having a part pointer information pointing to the file; recording as encrypted compressed audio data the compressed audio data encrypted with the encryption key in the free areas; connecting the free areas where the encrypted compressed audio data is recorded to an end of the file managed by the second management system under the second management system; recording the part pointer information pointing to the free areas where the encrypted compressed audio data is recorded in the part descriptor; recording a decryption key so as to enable later decryption of the encrypted compressed audio data and pointer information pointing to the part descriptor in the track descriptor; and recording a track number that points to the track descriptor in a play order table having a play order of a plurality of tracks.

A feature of the first aspect of the present invention is that the second management system is configured to search consecutive free areas having at least a physical length of 64 kilobytes multiplied by four.

A second aspect of the present invention is directed to a recording method in a recording apparatus, includes the steps of causing a first management system retained in an another apparatus to manage a storage medium loaded in the recording apparatus when the recording apparatus and the another apparatus are connected; and recording the data to the storage medium based on a second management system which is retained in the recording apparatus and which limits concatenation of data recording segments when data transferred from the another apparatus to the recording apparatus are to be recorded to the storage medium.

A third aspect of the present invention is directed to an editing method that includes the steps of causing a first management system retained in the first apparatus to manage a storage medium loaded in the second apparatus when a first apparatus and a second apparatus are connected; and deleting the part of the file based on a second management system which is retained in the second apparatus when the first apparatus instructs part of a file to be deleted from the storage medium loaded in the second apparatus.

A feature of the third aspect of the present invention is that it further includes the steps of obtaining track information corresponding to a predetermined track from a play order table having a plurality of track information that respectively point to a track descriptor in a track information table; obtaining a track descriptor designated by the track information from the track information table, the track descriptor including a decryption key corresponding to a track and pointer information that points to one of a plurality of part descriptors in a part information table; reading a part descriptor corresponding to the pointer information in the track descriptor; reading a part of the file according to part pointer information in the part descriptor, the part pointer information pointing to the part of the file; and decrypting with the decryption key the part of the file.

Another feature of the third aspect of the present invention is that it further includes the steps of transferring at least the track descriptor from the second apparatus to the first apparatus; transferring a delete request command and a track identification to be deleted from the first apparatus to the second apparatus; obtaining track information corresponding to the track to be deleted from a play order table; obtaining a track descriptor designated by the track information from a track information table; adjusting a play order of a track set to be played after the track to be deleted; reading the part descriptor corresponding to the pointer information in the track descriptor; separating a data block as the part of the file specified by the part pointer information in the part descriptor from the file on the second management system and freeing the data block on the second management system; freeing the part descriptor on the file system; and freeing the track descriptor on the file system.

A fourth aspect of the present invention is directed to an editing method in an editing apparatus that includes the steps of causing a first management system retained in the another apparatus to manage a storage medium loaded in the editing apparatus when the editing apparatus and an another apparatus are connected to one another; and deleting the part of the file based on a second management system that is retained in the editing apparatus when the another apparatus instructs part of a file to be deleted from the storage medium loaded in the editing apparatus.

According to this invention, a track information file and an audio data file are generated on a disc serving as the storage medium. These are the files managed by the so-called FAT system.

The audio data file is a file that accommodates a plurality of audio data items. When viewed from the FAT system, the audio data file appears to be a very large file. The composition of this file is divided into parts, so that audio data are handled as a set of such parts.

The track information file is a file that describes various types of information for managing the audio data contained in the audio data file. The track index file is made up of a play order table, a programmed play order table, a group information table, a track information table, a part information table, and a name table.

The play order table indicates the order of audio data reproduction defined by default. As such, the play order table contains information representing links to track descriptors corresponding to track numbers (i.e., music title numbers) in the track information table.

The programmed play order table contains the order of audio data reproduction defined by the individual user. As such, the programmed play order table describes programmed track information representing links to the track descriptors corresponding to the track numbers.

The group information table describes information about groups. A group is defined as a set of one or more tracks having serial track numbers, or a set of one or more tracks with programmed serial track numbers.

The track information table describes information about tracks representing music titles. Specifically, the track information table is made up of track descriptors representing tracks (music titles). Each track descriptor describes a coding system, copyright management information, content decryption key information, pointer information pointing to the part number serving as the entry to the music title of the track in question, an artist name, a title name, original title order information, and recording time information about the track in question.

The part information table describes pointers allowing part numbers to point to actual music title locations. Specifically, the part information table is made up of part descriptors corresponding to individual parts. Entries of part descriptors are designated from the track information table. Each part descriptor is composed of a start address and an end address of the J part in question in the audio data file, and a link to the next part.

When audio data are desired to be reproduced from a particular track, information about the designated track number is retrieved from the play order table. The track descriptor corresponding to the track from which to reproduce the audio data is then acquired.

Key information is then obtained from the applicable track descriptor in the track information table, and the part descriptor indicating the area containing entry data is acquired. From the part descriptor, access is gained to the location, in the audio data file, of the first part containing the desired audio data, and data are retrieved from the accessed location. The reproduced data from the location are decrypted using the acquired key information for audio data reproduction. If the part descriptor has a link to another part, the linked part is accessed and the above steps are repeated.

BRIEF DESCRIPTION OF THE DRAWINGS

These and other objects of the invention will be seen by reference to the description, taken in connection with the accompanying drawing, in which:

FIG. 2 is an explanatory view of a recordable area on the disc for use with the next-generation MD1 system;

FIG. 4 is an explanatory view of a recordable area on the disc for use with the next-generation MD2 system;

FIG. 5 is an explanatory view of an error-correcting code scheme for use with the next-generation MD1 and MD2 systems;

FIG. 6 is another explanatory view of the error-correcting code scheme for use with the next-generation MD1 and MD2 systems;

FIG. 20 is an explanatory view of a signal recording bitmap;

FIG. 38 is an explanatory view showing how each name slot in the name table is accessed from a plurality of pointers;

FIGS. 39A and 39B are explanatory views of a process performed by the first example of the audio data management system to delete parts from the audio data file;

FIG. 41 an explanatory view of an audio data file for use with the second example of the audio data management system;

FIGS. 46A and 46B are explanatory views of a track information table for use with the second example of the audio data management system;

FIG. 50 is an explanatory view depicting how the second example of the audio data management system connects tracks using the index scheme;

DESCRIPTION OF THE PREFERRED EMBODIMENTS

Figure 1:
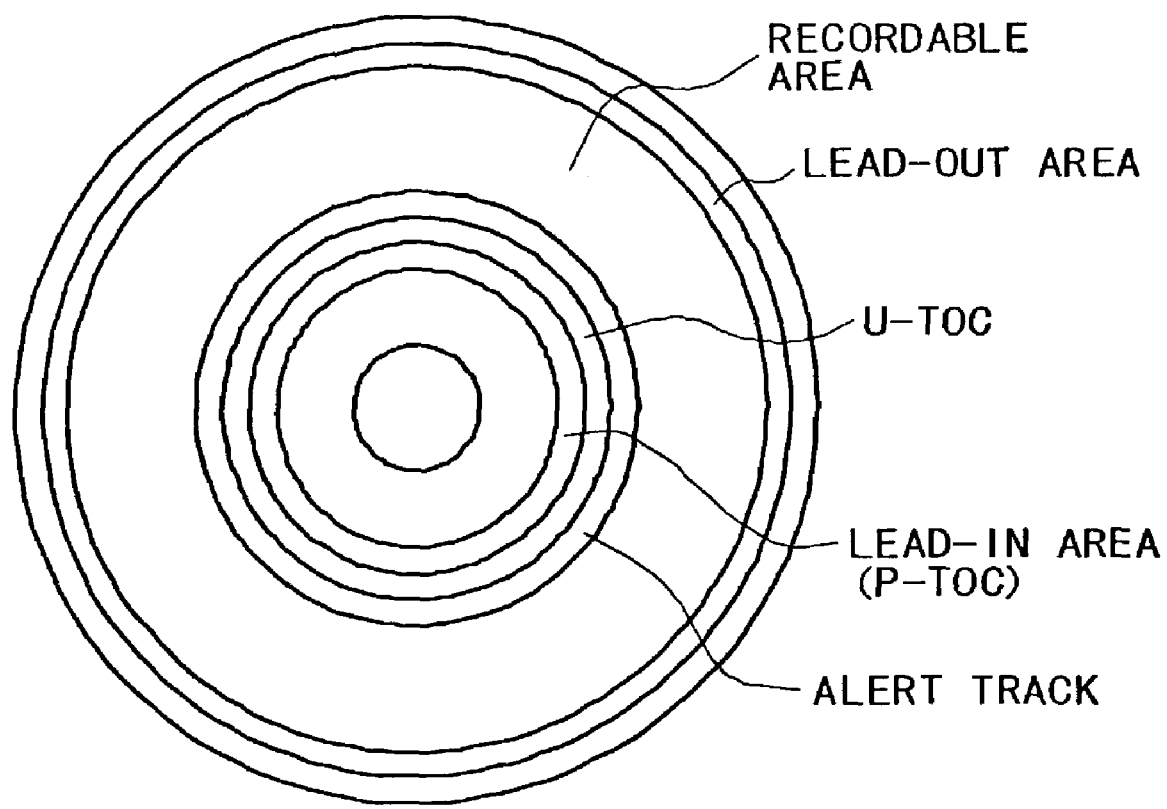
FIG. 1 is an explanatory view of a disc for use with a next-generation MD1 system.

The following description is divided into the following 10 sections:
1. Outline of the recording system
2. Discs
3. Signal formats
4. Structure of the recording/reproducing apparatus
5. Initialization of next-generation MD1 and MD2 discs
6. First example of the audio data management system
7. Second example of the audio data management system
8. Operation during connection with the personal computer
9. Restrictions on copying of audio data from the disc
10. Coexistence of the next-generation MD1 system with the current MD system
1. Outline of the Recording System The recording/reproducing apparatus according to the present invention uses a magneto-optical disc as its storage medium. The physical attributes, such as form-factor, of the disc are substantially similar to the disc utilized by so-called MD (Mini-disc) systems. However, data recorded on the disc and how the data is arranged on the disc differs from a conventional MD. More particularly, the inventive apparatus employs a FAT (File Allocation Table) system as its file management system for recording or reproducing content data such as audio data, so that compatibility with existing personal computers is ensured. Once again, the term "FAT" (or "FAT System") is used generically herein to describe various PC-based file systems, and it intended to be descriptive of the specific FAT structure used in DOS, VFAT (virtual FAT) used in Windows 95/98, FAT 32 used in Windows 98/ME/2000, as well as NTFS (NT file system; sometimes New Technology File System) which is the file system used by Windows NT operating system, or optionally in Windows 2000 operating system, for storing and retrieving files on a read/write disks. Compared with the conventional MD system, the recording/reproducing apparatus of the invention has an improved error correction system and an advanced modulation technique designed to boost data storage capacity and to increase data security. Furthermore, the inventive apparatus encrypts content data and takes measures to prevent illegal data copying and ensure copyright protection for the content data.

Generally, there are two kinds of specifications, MD1 and MD2, developed by the present inventors for the next-generation MD system. The MD1 specifications involve the use of the same disc (i.e., physical medium) as that which is currently used by the existing MD system. The MD2 specifications adopt a disc which has a same form-factor as, and is identical externally to the disc of the current MD system, but which utilizes a magnetic super-resolution (MSR) technique to enhance recording density in the linear direction, whereby storage capacity is boosted.

The current MD system utilizes as its storage medium a 64 mm-across magneto-optical disc enclosed in a cartridge. The disc is 1.2 mm thick and has a center hole 11 mm in diameter. The cartridge measures 68 mm by 72 mm by 5 mm.

The dimensions and shapes of the discs and cartridges are the same as the next-generation MD1 and MD2 systems. On both the MD1 and MD2 discs, the start position of the lead-in area is the same as with the current MD system, i.e., starting at 29 mm.

It is proposed for the next-generation MD2 system that the track pitch be in an inclusive range of 1.2 µm through 1.3 µm (e.g., 1.25 µm). For the next-generation MD1 system with its disc structurally identical to that of the current MD system, the track pitch is set to 1.6 µm. The bit length is set to 0.44 µm/bit for the next-generation MD1 disc and proposed at 0.16 µm/bit for the MD2 disc. Redundancy is set to 20.50% for both the next-generation MD1 and the next-generation MD2 discs.

The next-generation MD2 disc is arranged to increase its storage capacity in the linear direction by resorting to the magnetic super-resolution technique. The MSR technique involves taking advantage of a specific phenomenon on the disc: that a cut-through layer becomes magnetically neutral when a particular temperature is reached, allowing magnetic walls that were transferred to a regenerative layer to move in such a manner that infinitesimal markings are viewed apparently larger under a beam spot.

That is, the next-generation MD2 disc is constituted by a magnetic layer acting as a recording layer for recording at least data, by a cut-through layer, and by a magnetic layer for data regeneration, all deposited on a transparent substrate. The cut-through layer serves as a layer that regulates switched connective force. When a specific temperature is reached, the cut-through layer becomes magnetically neutral to let the magnetic walls transferred in the recording layer be shifted into the regenerative magnetic layer. This allows infinitesimal markings to become visible under the beam spot. For data recording, a laser pulse magnetic field modulation technique is adopted to generate minuscule markings on the disc.

On the next-generation MD2 disc, grooves are made deeper than with a conventional MD disc and their gradient is steeper as well so as to improve de-track margins and to reduce land-induced crosstalk, wobble signal crosstalk, and focus leaks. Illustratively, the grooves are in an inclusive range of 160 nm through 180 nm deep, the groove gradient is in an inclusive range of 60 through 70 degrees, and the groove width is in an inclusive range of 600 nm through 700 nm on the next-generation MD2 disc.

As part of its optical specifications, the next-generation MD1 disc has its laser wavelength λ set to 780 nm and its numerical aperture NA to 0.45 for an objective lens in an optical head. Likewise, the next-generation MD2 disc has its laser wavelength λ also set to 780 nm and its numerical aperture NA to 0.45 for the objective lens in the optical head.

The next-generation MD1 and MD2 systems both adopt the so-called groove recording system as their recording scheme. That is, grooves are formed over the disc surface as tracks for recording and reproduction purposes.

As its error-correcting code system, the existing MD system utilizes a convolutional code based on ACIRC (Advanced Cross Interleave Reed-Solomon Code). By contract, the next-generation MD1 and MD2 systems employ a block complete code that combines RS-LDC (Reed Solomon-Long Distance Code) with BIS (Burst Indicator Subcode). Using the block complete error-correcting code eliminates the need for linking sectors. Under the error correction scheme combining LDC with BIS, the location of a burst error that may occur is detected by BIS. The error location is utilized in getting the LDC code to effect erasure correction.

Adopted as the addressing system is the so-called wobbled groove system whereby a single spiral groove is formed, and both sides of the groove are flanked by wobbles furnished as address information. This type of addressing system is called ADIP (Address in Pregroove). The current MD system and the next-generation MD1 and MD2 systems differ in linear density. Whereas the current MD system adopts as its error-correcting code a convolutional code called ACIRC, the next-generation MD1 and MD2 systems are set to use the block complete code combining LDC and BIS. As a result, the current MD system and the next-generation MD1 and MD2 systems differ in redundancy and have different relative positions between ADIP and data. For these reasons, the next-generation MD1 system with its physical disc structurally identical to that of the current MD system handles the ADIP signal in a manner different from the current MD system. The next-generation MD2 system is set to modify its ADIP signal specifications for better compliance with the next-generation MD2 specifications.

The current MD system adopts EFM (8 to 14 modulation) as its modulation system, whereas the next-generation MD1 and MD2 systems utilize RLL(1, 7)PP (RLL, Run Length Parity Preserve/Prohibit rmtr [repeated minimum transition Limited; PP, runlength]), called the 1-7 pp modulation system hereinafter. The next-generation MD1 and MD2 systems use a Viterbi decoding method as their data detection method, based on partial response PR(1, 2, 1)ML for the MD1 system and on partial response PR(1, −1)ML for the MD2 system.

The disc driving system adopts either CLV (Constant Linear Velocity) or ZCAV (Zone Constant Angular Velocity). Standard linear velocity is set to 2.4 m/sec for the next-generation MD1 system and 1.98 m/sec for the next-generation MD2 system. With the current MD system, standard linear velocity is set to 1.2 m/sec for 60-min discs and 1.4 m/sec for 74-min discs.

For the next generation MD1 system with its disc structurally identical to that of the current MD system, total data storage capacity per disc is about 300 megabytes (on the 80-min disc). Because the 1-7 pp modulation system is adopted instead of EFM as the modulation system, window margins are changed from 0.5 to 0.666, whereby recording density is increased by a factor of 1.33. Since the ACIRC system is replaced by the combination of BIS with LDC as the error correction system, data efficiency is boosted, whereby recording density is further increased by a factor of 1.48. Overall, with the same disc in use, data storage capacity is made approximately double that of the current MD system.

The next-generation MD2 disc utilizing the magnetic super-resolution technique is further boosted in recording density in the linear direction; the total data storage capacity amounts to about one gigabytes.

At standard linear velocity, the data rate is set to 4.4 megabits/sec for the next-generation MD1 system and 9.8 megabits/sec for the next-generation MD2 system.

2. Discs

FIG. 1 shows a typical structure of the next-generation MD1 disc. This disc is structurally identical to that of the current MD system. That is, the disc is made up of a dielectric film, a magnetic film, another dielectric film, and a reflective film, deposited on a transparent polycarbonate substrate. The disc surface is covered with a protective film.

On the next-generation MD1 disc, as shown in FIG. 1, a lead-in area on the innermost side (of the recordable area, where "innermost" refers to a radial direction relative to a center of the disc) has a P-TOC (Pre-mastered TOC [Table Of Contents]) area. As a physical structure, this area constitutes a pre-mastered area. That is, embossed pits are formed here to record control information and other related information such as P-TOC information.

On the outer side, in the radial direction, of the lead-in area including the P-TOC area is a recordable area (where magneto-optical recording is possible). This is a recordable as well as reproducible area including recording tracks furnished with grooves as their guides. On the inner side of the recordable area is a U-TOC (User TOC) area.

The U-TOC area is the same in structure as that of the current MD system in which disc management information is recorded. What is held in the U-TOC area is the order of track (audio track/data track) titles and management information written over as needed to keep up with the recording or erasure of such tracks. More specifically, the management information includes start and end positions of tracks (i.e., parts making up the tracks) and mode settings.

An alert track is furnished on the outer side of the U-TOC area. This track contains an alert sound recorded thereon that is activated (audibilized) by the MD player if the disc is loaded into the current MD system. The sound indicates a warning that the disc is for use with the next-generation MD1 system and cannot be used for reproduction with the current system. The remaining portion of the recordable area (shown in more detail in FIG. 2) is followed in the radial direction by a lead-out area.

FIG. 2 shows a typical structure of the recordable area on the next-generation MD1 disc indicated in FIG. 1. As illustrated in FIG. 2, the beginning of the recordable area (inner side) has the U-TOC area and the alert track. A region containing the U-TOC area and alert track has its data recorded in EFM format so that the data may be reproduced by current MD system players. On the outer side of the area of data stored in EFM format is an area where data are recorded in 1-7 pp modulation format for the next-generation MD1 system. There is a clearance of a predetermined distance called a "guard band" between the area of data recordings in EFM format on the one hand, and the area of data storage in 1-7 pp modulation format on the other hand. The guard band is intended to prevent malfunction of the current MD player when the latter is loaded with a next-generation MD1 system disc.

At the beginning of the area of data recordings in 1-7 pp modulation format (i.e., inner side), there are a DDT (Disc Description Table) area and a reserve track. The DDT area is designed to replace physically defective regions and includes a unique ID (UID). The UID is unique to each storage medium, typically based on randomly generated numbers. The reserve track is provided to accommodate information for content protection.

Furthermore, the area of data storage in 1-7 pp modulation format includes a FAT (File Allocation Table) area. The FAT area is an area that allows the FAT system to manage data pursuant to FAT system criteria used by general-purpose computers. More specifically, the FAT system carries out file management based on FAT chains involving both a directory indicating the entry points of root files and directories, and a FAT table describing FAT cluster link information. Once again, the term FAT is used in a general sense to refer to a variety of different file management schemes employed by PC operating systems.

The U-TOC area on the next-generation MD1 disc records two kinds of information: an alert track start position, and the start position of the area for data storage in 1-7 pp modulation format.

When a next-generation MD1 disc is loaded into a current MD system player, information is read from the U-TOC area of the loaded disc. The retrieved U-TOC information reveals the alert track position, allowing the alert track to be accessed so that its data will start being reproduced. The alert track contains data constituting the alert sound warning that the disc is for the next-generation MD1 system and cannot be used for reproduction with the current system.

The alert sound may illustratively articulate a message like "This disc cannot be used on this player." Alternatively, the alert sound may also be a simple beep, tone or other warning signal.

When a next-generation MD1 disc is loaded into a next-generation MD1 system player, information is read from the U-TOC area of the loaded disc. The retrieved U-TOC information reveals the start position of the area where data are stored in 1-7 pp modulation format and allows data to be read from the DDT, reserve track, and FAT area. Over the area of data storage in 1-7 pp modulation format, data management is effected not with the U-TOC but with the FAT system.

Figure 3A:
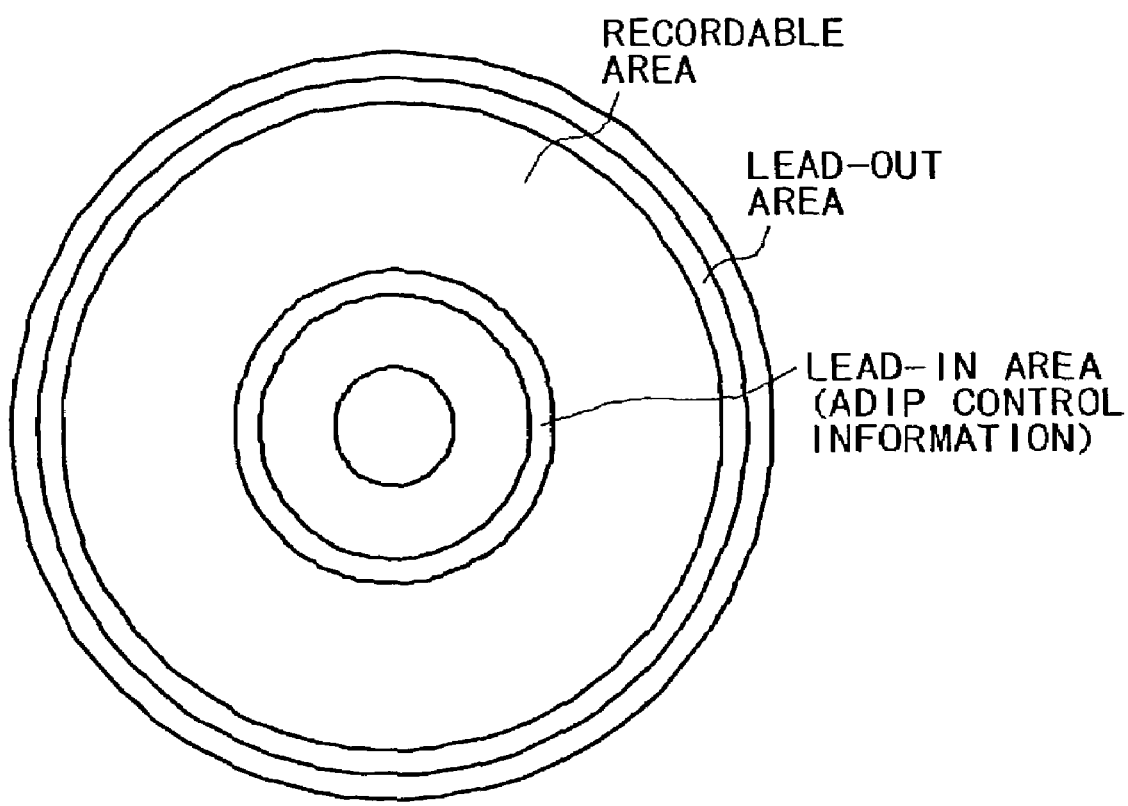
FIGS. 3A and 3B are explanatory views of a disc for use with a next-generation MD2 system.
Figure 3B:
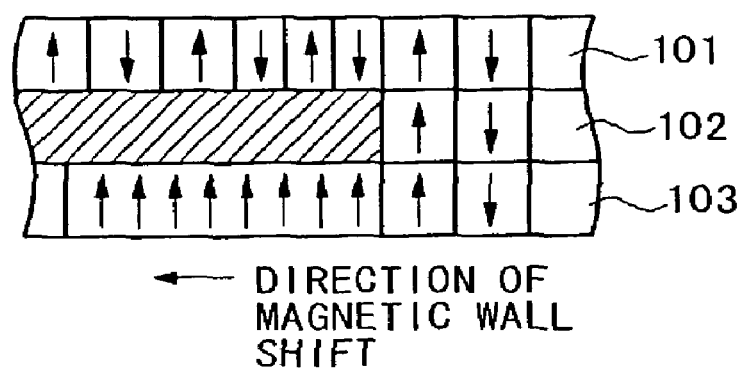

FIGS. 3A and 3B show a typical structure of the next-generation MD2 disc. This disc is also made up of a dielectric film, a magnetic film, another dielectric film, and a reflective film, deposited on a transparent polycarbonate substrate. The disc surface is covered with a protective film.

On the next-generation MD2 disc, as depicted in FIG. 3A, the lead-in area on the inner side (in a radial direction) has control information recorded using an ADIP signal. On the MD2 disc, the currently-used P-TOC area of embossed pits is replaced by the lead-in area having control information based on the ADIP signal. The recordable area starting from outside the lead-in area is a recordable as well as reproducible area that has grooves formed therein as guides for recording tracks. The recordable area has data recorded in 1-7 pp modulation format.

On the next-generation MD2 disc, as indicated in FIG. 3B, the magnetic film is constituted by a magnetic layer 101 acting as a recording layer for recording data, by a cut-through layer 102, and by a magnetic layer 103 for data regeneration, all deposited on the substrate. The cut-through layer 102 serves as a layer that regulates switched connective force. When a specific temperature is reached, the cut-through layer 102 becomes magnetically neutral to let the magnetic walls transferred in the recording layer 101 to be shifted into the regenerative magnetic layer 103. This allows infinitesimal markings in the recording layer 101 to be viewed as apparently enlarged under the beam spot on the regenerative magnetic layer 103.

Whether a loaded disc is a next-generation MD1 disc or a next-generation MD2 disc can be determined based on the information retrieved from the lead-in area. Specifically, if P-TOC information in embossed pits is detected from the lead-in area, it means the loaded disc is a current MD system disc or a next-generation MD1 disc. If control information based on the ADIP signal is detected from the lead-in area, with no P-TOC information in embossed pits detected, it means the disc in question is a next-generation MD2 disc. However, this manner of distinguishing the MD1 disc from the MD2 disc is not limitative of the invention. Alternatively, phase differences in a tracking error signal between on-track and off-track modes may be utilized in determining the disc type. As another alternative, the disc may be given a detection hole for disc identification purposes.

FIG. 4 shows a typical structure of the recordable area on the next-generation MD2 disc. As illustrated in FIG. 4, the recordable area has all its data recorded in 1-7 pp modulation format. A DDT area and a reserve track are located at the beginning of (i.e., on the inner side of) the area where data are recorded in 1-7 pp modulation format. The DDT area is provided to record alternate area management data for managing alternate areas intended to replace physically defective areas. Moreover, the DDT area includes a management table that manages a replacement area, which includes a recordable area that substitutes for the physically defective areas. The management table keeps track of the logical cluster(s) determined to be defective and also keeps tracks of the logical cluster(s) in the replacement area assigned to replace the defective logical clusters. The DDT area also contains the UID mentioned above. The reserve track stores information for content protection purposes.

A FAT area is also included in the area with its data recorded in 1-7 pp modulation format. The FAT area is used by the FAT system for managing data. The FAT system, in this embodiment, effects data management pursuant to the FAT system criteria applicable to general-purpose personal computers.

No U-TOC area is provided on the next-generation MD2 disc. When a next-generation MD2 disc is loaded into a next-generation MD2 player, data are read from the DDT area, reserve track, and FAT located as described above on the disc. The retrieved data are used for data management by the FAT system.

A time-consuming initialization process is not needed on next-generation MD1 and MD2 discs. More specifically, initialization is not required on these discs except for advance preparation of a DDT area, a reserve track, and a minimum set of tables including a FAT table. Data may be directly written to the recordable area of an unused disc and then read therefrom without recourse to an initialization process.

3. Signal Formats

What follows is a description of signal formats for the next-generation MD1 and MD2 systems. The current MD system utilizes the convolutional code called ACIRC as its error correction system in which a 2,352-byte sector corresponding to the data size of a sub-code block is regarded as an increment of access for read and write operations. Because the convolutional code scheme involves an error-correcting code sequence spanning a plurality of sectors, it is necessary to provide a linking sector between adjacent sectors when data are to be updated. As its addressing system, the current MD system adopts the wobbled groove scheme called ADIP in which a single spiral groove is formed, and both sides of the groove are flanked by wobbles furnished as address information. The current MD system optimally arranges the ADIP signal for gaining access to the 2,352-byte sector.

The next-generation MD1 and MD2 systems, by contrast, employ a block complete code scheme that combines LDC with BIS, and regards a 64-kilobyte block as an increment of access for read and write operations. Linking sectors are not needed by the block complete code. This, however, requires that the next-generation MD1 system utilizing the disc of the current MD system rearrange the ADIP signal in a manner complying with a new recording method. The next-generation MD2 system is set to alter the ADIP signal specifications to comply with the specifications of the next-generation MD2 system.

Figure 7:
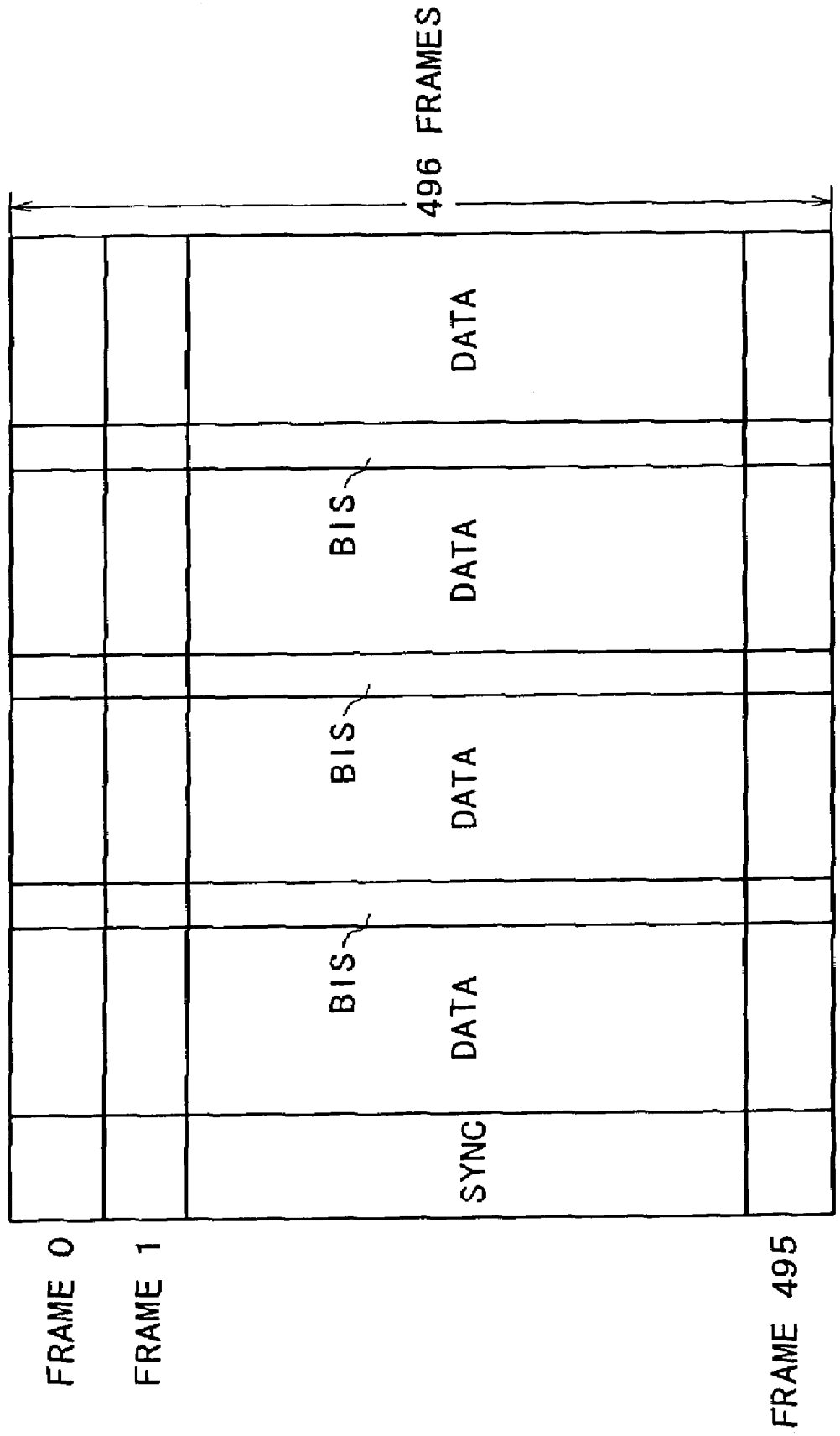
FIG. 7 is another explanatory view of the error-correcting code scheme for use with the next-generation MD1 and MD2 systems.

FIGS. 5, 6, and 7 are explanatory views of the error correction system for use with the next-generation MD1 and MD2 systems. This error correction system combines an LDC-based error-correcting code scheme illustrated in FIG. 5, with the BIS scheme shown in FIGS. 6 and 7.

FIG. 5 depicts a typical structure of a code block in the LDC-based error-correcting code scheme. As shown in FIG. 5, each error-correcting code sector is provided with a four-byte error detection code EDC, and data are laid out two-dimensionally in the error-correcting code block that is 304 bytes long horizontally and 216 bytes long vertically. Each error-correcting code sector is made up of two-kilobyte data. As illustrated in FIG. 5, the 304-byte-by-216-byte error-correcting code block includes 32 error-correcting code sectors of two-kilobyte data each. The 32 error-correcting code sectors laid out two-dimensionally in the 304-byte-by-216-byte error-correcting code block are furnished vertically with a 32bit error-correcting Reed-Solomon parity code.

FIGS. 6 and 7 depict a typical BIS structure. As shown in FIG. 6, a one-byte BIS is inserted at intervals of 38 bytes of data. One frame is constituted by 152 bytes (38×4) of data, three-byte BIS data, and 2.5-byte frame sync data amounting to 157.5 bytes of data.

As shown in FIG. 7, a BIS block is formed by 496 frames each structured as described above. A BIS data code (3×496=1,488 bytes) includes 576-byte user control data, a 144-byte address unit number, and a 768-byte error-correcting code.

As described, the BIS code has the 768-byte error-correcting code attached to the 1,488-byte data. This code structure provides a reinforced error correction feature. With this BIS code embedded at intervals of 38 bytes of data, the location of any error that may occur is readily detected. The error location is then used as the basis for erasure correction using the LDC code.

Figure 8:
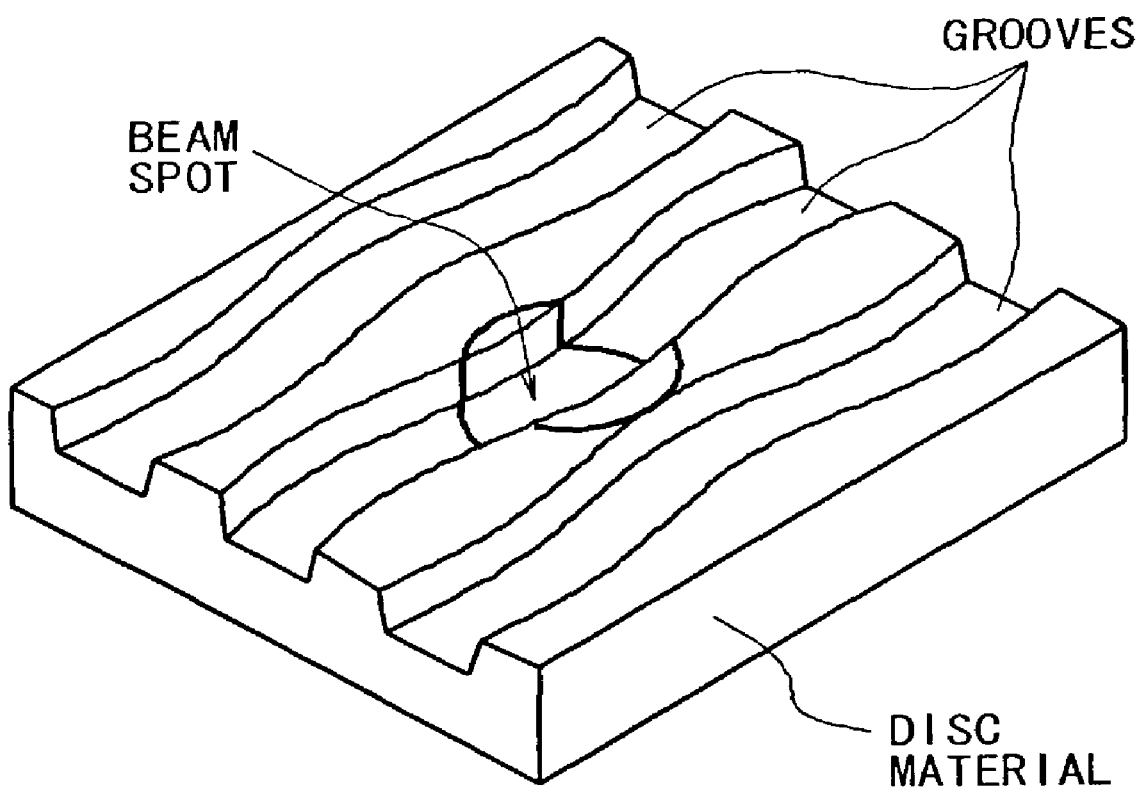
FIG. 8 is a perspective view of a disc portion showing how an address signal is generated using wobbles.

The ADIP signal is recorded as wobbles formed on both sides of a single spiral groove, as shown in FIG. 8. That is, the ADIP signal is recorded by having address data frequency-modulated and formed into groove wobbles in disc material.

Figure 9:
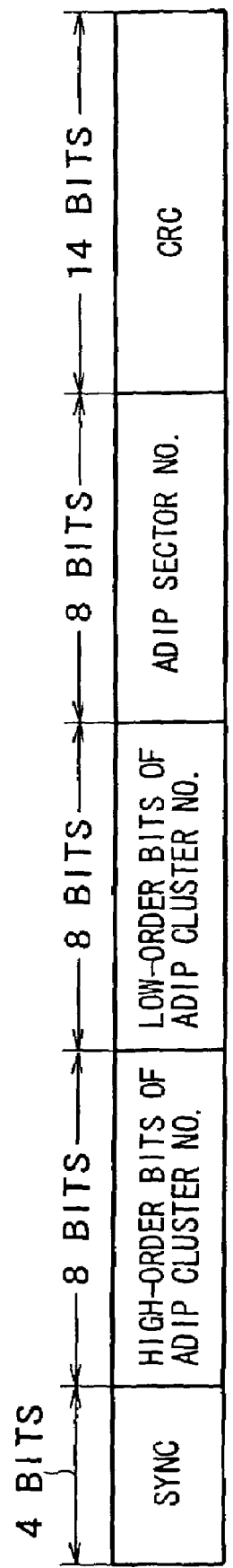
FIG. 9 is an explanatory view of an ADIP signal for use with the current MD system and the next-generation MD1 system.

FIG. 9 depicts a typical sector format of the ADIP signal for the next-generation MD1 system.

As shown in FIG. 9, each sector of the ADIP signal (ADIP sector) is made up of four-bit sync data, eight high-order bits of an ADIP cluster number, eight low-order bits of the ADIP cluster number, an eight-bit ADIP sector number, and a 14-bit error detection code CRC.

The sync data constitute a signal of a predetermined pattern used to detect the beginning of an ADIP sector. Linking sectors are needed by the current MD system, because this system utilizes convolutional coding. The sector numbers for linking use are negative numbers for sectors FCh, FDh, FEh, and FFh (h: hexadecimal). The ADIP sector format is the same as that of the current MD system, because the next-generation MD1 system utilizes the same disc used by the current MD system.

Figure 10:
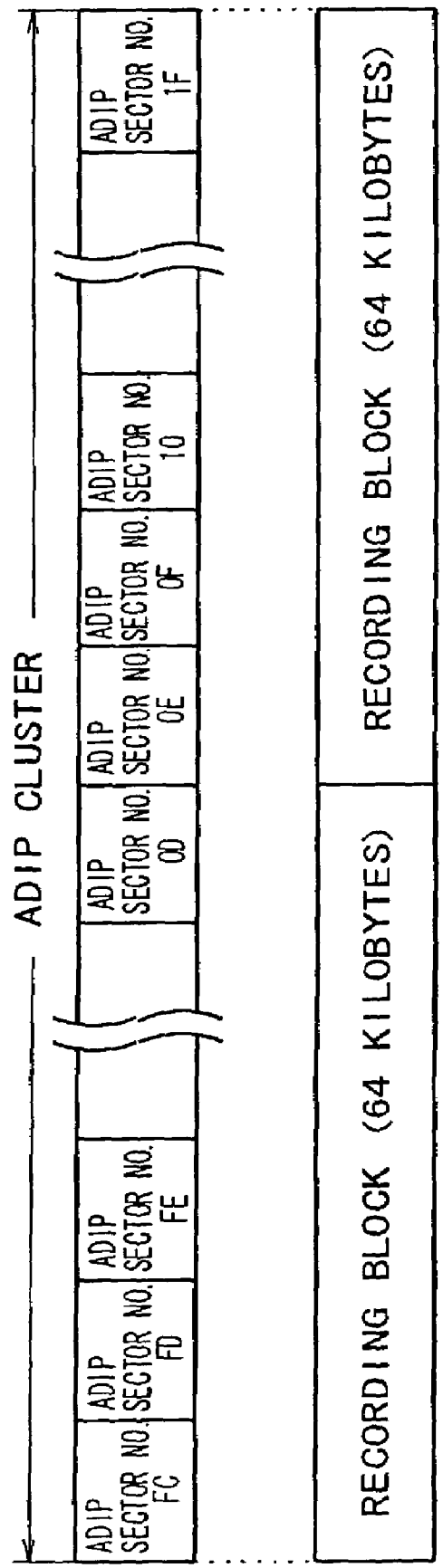
FIG. 10 is another explanatory view of the ADIP signal for use with the current MD system and the next-generation MD1 system.

The next-generation MD1 system, as shown in FIG. 10, has its ADP cluster structure formed by 36 ADIP sectors ranging from FCh to FFh and from 0Fh to 1Fh. And as illustrated in FIG. 10, one ADIP cluster is made up of data constituting two recording blocks of 64 kilobytes each.

Figure 11:
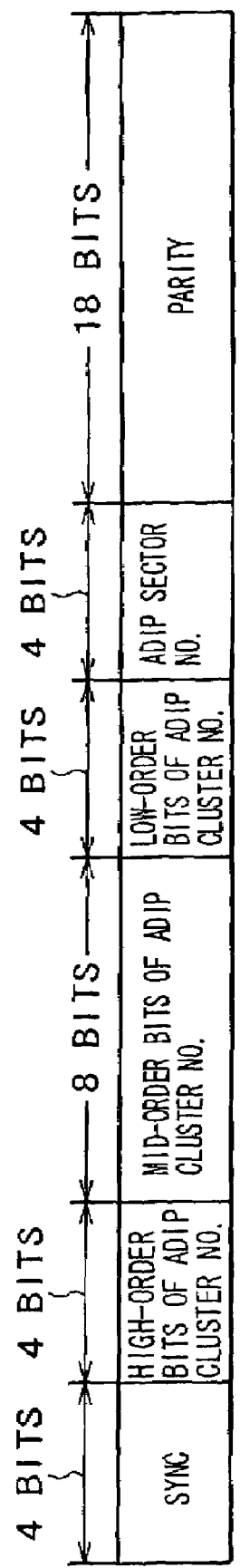
FIG. 11 is an explanatory view of an ADIP signal for use with the next-generation MD2 system.

FIG. 11 depicts an ADIP sector structure for use with the next-generation MD2 system. This structure contains 16 ADIP sectors, so that each ADIP sector number can be expressed in four bits. Linking sectors are not needed by the next-generation MD2 system, because the system uses the block complete error-correcting code.

As shown in FIG. 11, the ADIP sector structure for the next-generation MD2 system includes four-bit sync data, four high-order bits of an ADIP cluster number, eight mid-order bits of the ADIP cluster number, four low-order bits of the ADIP cluster number, a four-bit ADIP sector number, and an 18-bit error-correcting parity code.

The sync data constitute a signal of a predetermined pattern used to detect the beginning of an ADIP sector. The ADIP cluster number constitutes 16 bites, i.e., high-order four bits, mid-order eight bits, and low-order four bits. Since 16 ADIP sectors make up an ADIP cluster, each ADIP sector number is given in four bits. Whereas the current MD system utilizes the 14-bit error-detecting code, the next-generation MD2 system employs the 18-bit error-correcting parity code. For the next-generation MD2 system, as show in FIG. 12, each ADIP cluster is provided with one recording block of 64 kilobytes.

Figure 13:
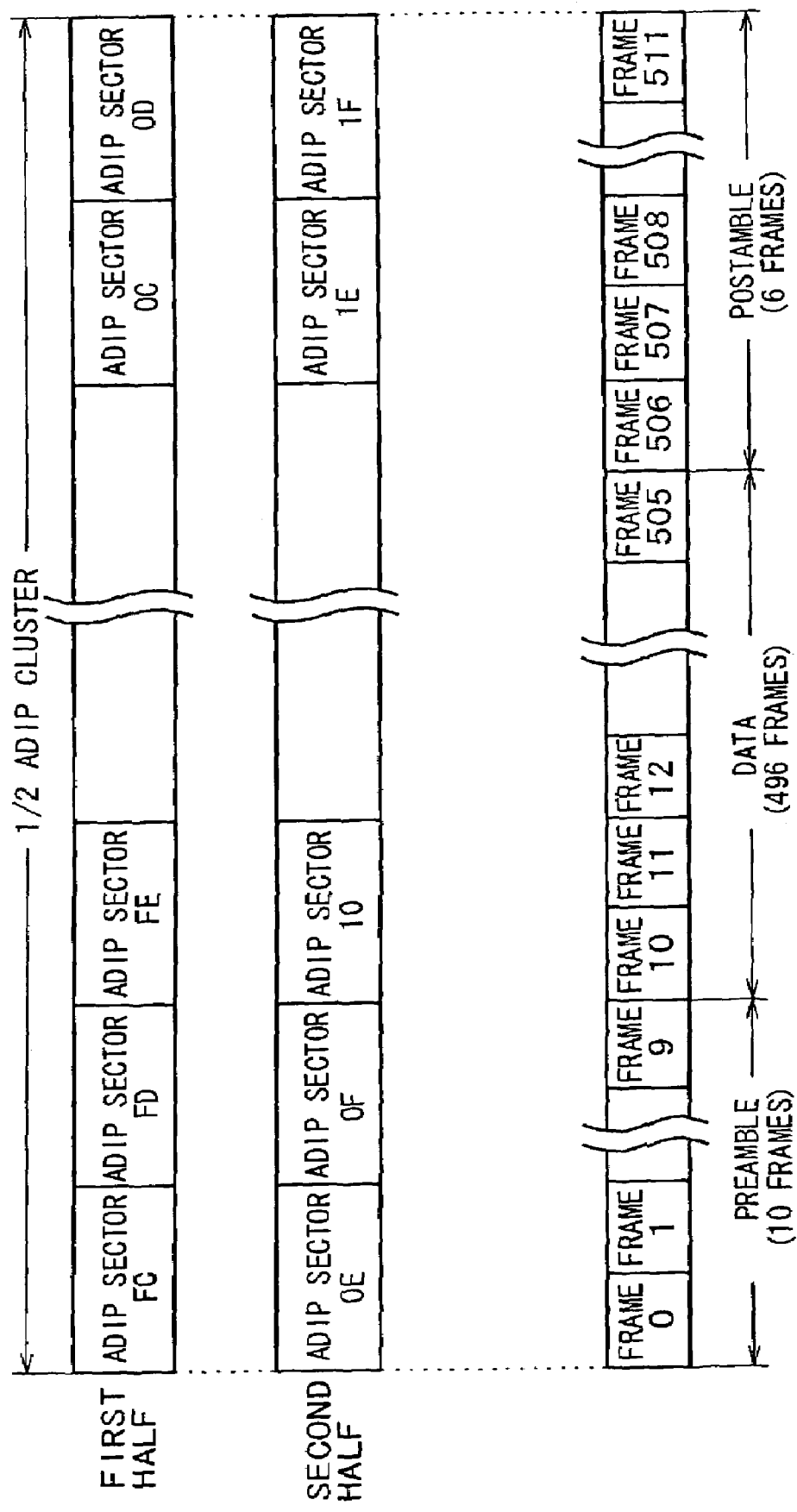
FIG. 13 is a schematic view showing relations between the ADIP signal and frames for the current MD system and the next-generation MD1 system.

FIG. 13 depicts relations between an ADIP cluster and BIS frames for the next-generation MD1 system.

As shown in FIG. 10, one ADIP cluster is constituted by 36 ADIP sectors ranging from FC to FF and from 00 to 1F. A recording block of 64 kilobytes, which is an increment for read and write operations, is laid out in two portions in each ADIP cluster.

Each ADIP sector is divided into two parts, i.e., the first-half 18 sectors and the second-half 18 sectors as shown in FIG. 13.

The data in one recording block forming an increment for read and write operations are placed in a BIS block made of 496 frames ranging from frame 10 to frame 505. The 496-frame data constituting the BIS block are prefixed with a 10-frame preamble ranging from frame 0 to frame 9. The data frames are further suffixed with a six-frame postamble ranging from frame 506 to frame 511. A total of 512 frames of data are thus placed in each of the first and the second half of the ADIP cluster, the first half ranging from ADIP sector FCh to ADIP sector 0Dh, the second half ranging from ADIP sector 0Eh to ADIP sector 1Fh. The preamble and postamble are provided to protect the data upon linkage with adjacent recording blocks. The preamble frames are also used for data PLL settlement, signal amplitude control, and signal offset control.

A physical address used to record or reproduce data to or from a given recording block is designated in two portions: an ADIP cluster, and distinction of either the first half or the second half of the cluster. When a physical address is designated for a write or a read operation, the ADIP sector is first read from the ADIP signal in question. From a reproduced signal of the ADIP sector, the ADIP cluster number and ADIP sector number are retrieved so as to determine whether the first half or the second half of the ADIP cluster is in effect.

Figure 12:
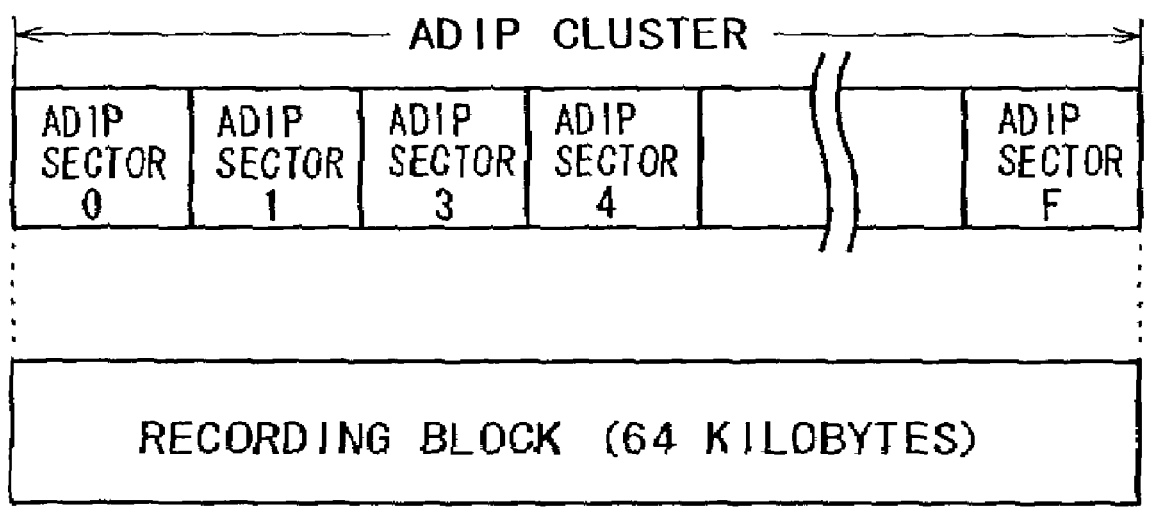
FIG. 12 is another explanatory view of the ADIP signal for use with the next-generation MD2 system.
Figure 14:
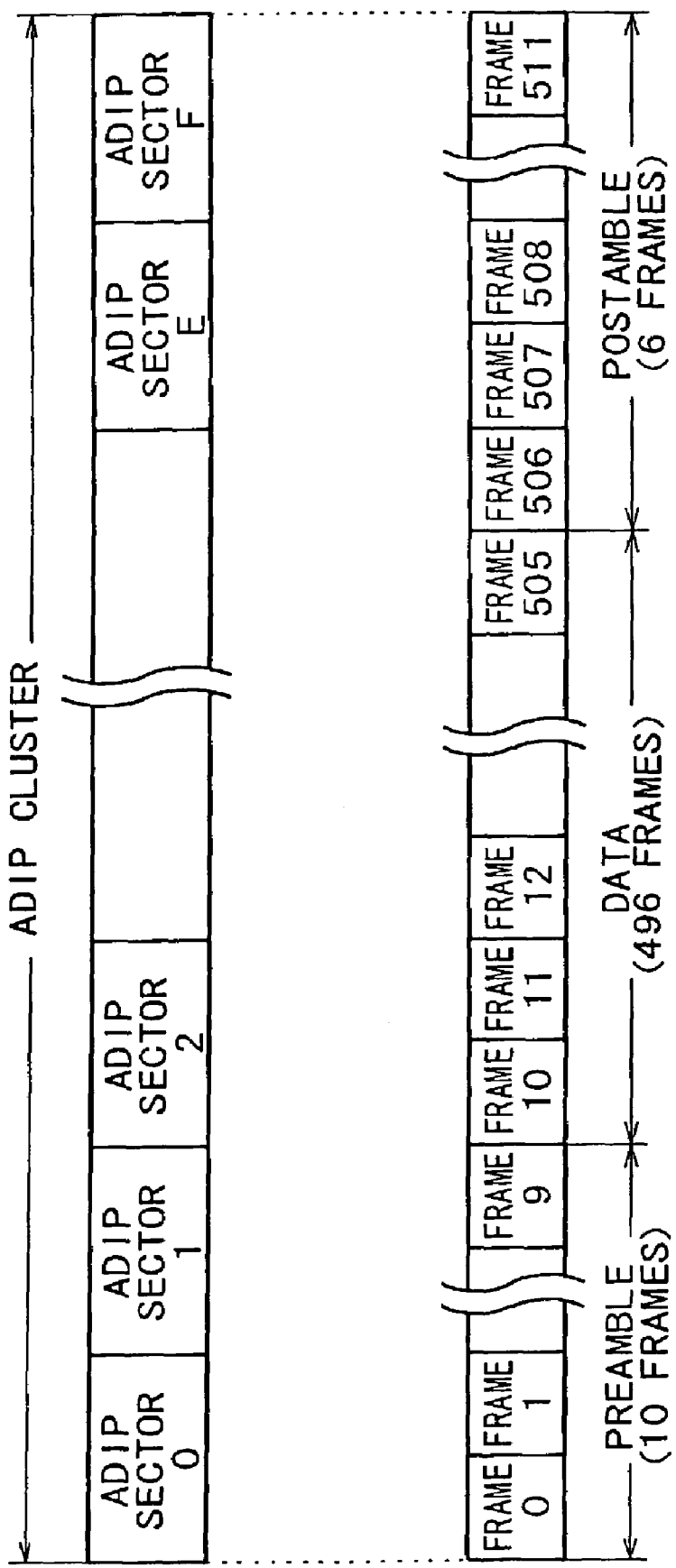
FIG. 14 is a schematic view indicating relations between the ADIP signal and frames for the next-generation MD1 system.

FIG. 14 illustrates relations between an ADIP cluster and BIS frames for the next-generation MD2 system. For the next-generation MD2 system, as shown in FIG. 12, 16 ADIP sectors constitute one ADIP cluster. Each ADIP cluster is furnished with one recording block of 64 kilobytes of data.

As shown in FIG. 14, the data in one recording block (64 kilobytes) constituting an increment for read and write operations are placed in a BIS block made up of 496 frames ranging from frame 10 to frame 505. The 496-frame data constituting the BIS block are prefixed with a 10-frame preamble ranging from frame 0 to frame 9. The data frames are further suffixed with a six-frame postamble ranging from frame 506 to frame 511. A total of 512 frames of data are placed in the ADIP cluster ranging from ADIP sector 0h to ADIP sector Fh.

The preamble and postamble frames before and after the data frames are provided to protect the data upon linkage with adjacent recording blocks. The preamble frames are also used for data PLL settlement, signal amplitude control, and signal offset control.

A physical address used to record or reproduce data to or from a given recording block is designated in the form of an ADIP cluster. When a physical address is designated for a write or a read operation, the ADIP sector is first read from the ADIP signal in question. From a reproduced signal of the ADIP sector, the ADIP cluster number is then retrieved.

To start writing or reading data to or from the disc of the above structure requires using various kinds of control information for laser power calibration and other purposes. As shown in FIG. 1, the next-generation MD1 disc has the P-TOC area included in the lead-in area. Diverse items of control information are acquired from the P-TOC area.

A P-TOC area in embossed pits is not provided on the next-generation MD2 disc; control information is instead recorded using the ADIP signal in the lead-in area. Because the next-generation MD2 disc utilizes the magnetic super-resolution technique, laser power control is an important factor. For that reason, calibration areas for use in power control are provided in the lead-in and lead-out areas of the next-generation MD2 disc.

Figure 15:
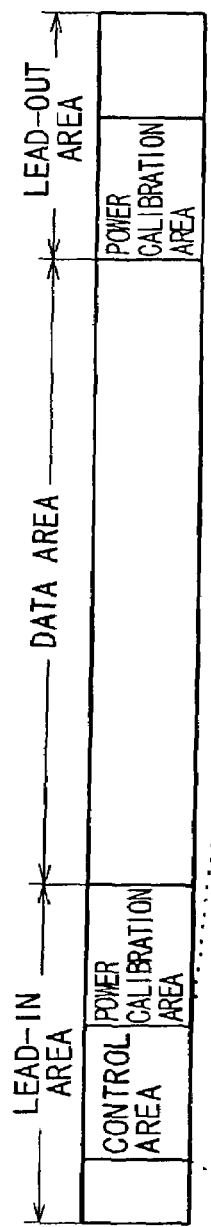
FIG. 15 is an explanatory view of a control signal for use with the next-generation MD2 system.

FIG. 15 shows a lead-in/lead-out area structure on the next-generation MD2 disc. As illustrated in FIG. 15, the lead-in and lead-out areas of the disc have each a power calibration area for laser beam power control purposes.

The lead-in area includes a control area that records ADIP control information. The ADIP control information describes disc control data using the low-order bit area of the ADIP cluster number.

More specifically, the ADIP cluster number starts at the beginning of the recordable area and constitutes a negative value in the lead-in area. As shown in FIG. 15, the ADIP sector on the next-generation MD2 disc is made up of four-bit sync data, eight high-order bits of the ADIP cluster number, eight-bit control data (i.e., low-order bits of the ADIP cluster number), a four-bit ADIP sector number, and an 18-bit error-correcting parity code. As depicted in FIG. 15, the eight low-order bits of the ADIP cluster number describe control data such as a disc type, magnetic phase, intensity, and read power.

The high-order bits of the ADIP cluster number are left intact, which permits detection of the current cluster position with a fairly high degree of accuracy. ADIP sector "0" and ADIP sector "8" allow the locations of ADIP clusters to be known precisely at predetermined intervals, because the eight low-order bits of the ADIP cluster number are left intact.

How control data are recorded using the ADIP signal is described in detail in Applicants' Japanese Patent Application No. 2001-123535, filed in the Japanese Patent Office in 2001, the entire contents of which being incorporated herein by reference.

4. Structure of the Recording/Reproducing Apparatus

Figure 16:
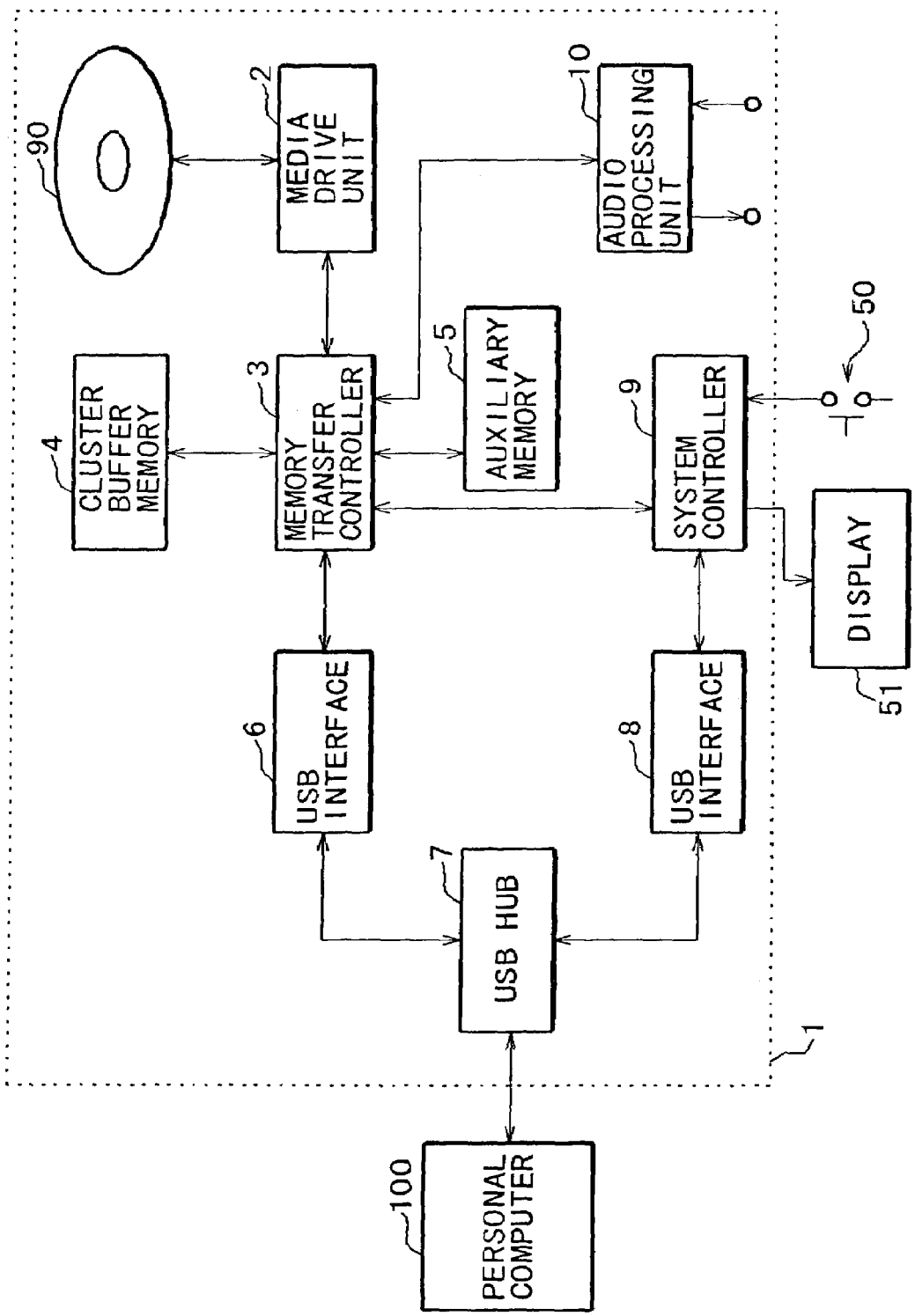
FIG. 16 is a block diagram of a disc drive unit.
Figure 17:
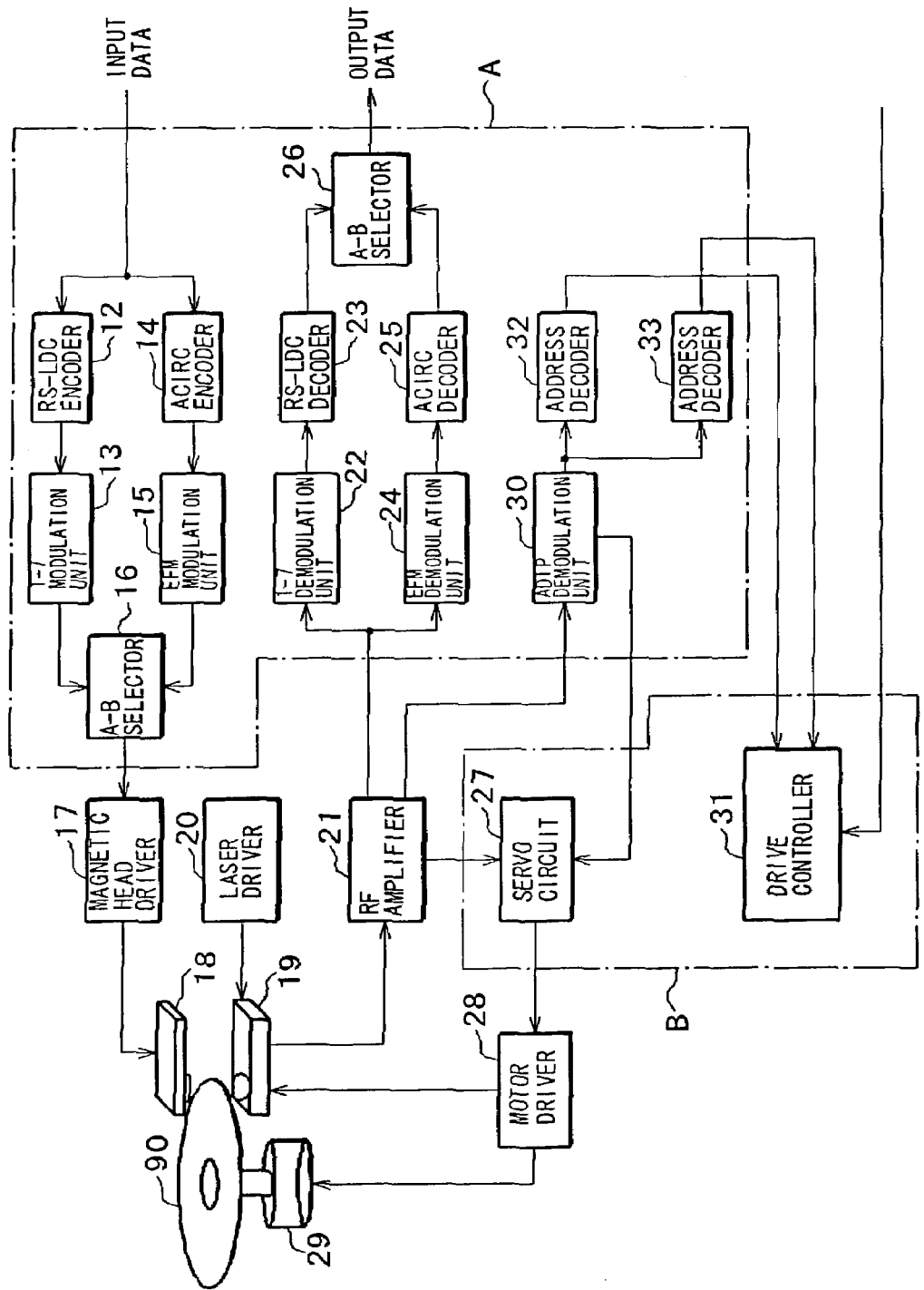
FIG. 17 is a block diagram of a media drive unit.

Described below with reference to FIGS. 16 and 17 is a typical structure of a disc drive unit (recording/reproducing apparatus) that complies with discs for recording/reproducing use with the next-generation MD1 and MD2 systems.

FIG. 16 shows a disc drive unit 1 that is connectable illustratively with a personal computer 100.

The disc drive unit 1 includes a media drive unit 2, a memory transfer controller 3, a cluster buffer memory 4, an auxiliary memory 5, USB (Universal Serial Bus) interfaces 6 and 8, a USB hub 7, a system controller 9, and an audio processing unit 10.

The media drive unit 2 permits recording and reproduction of data to and from a loaded disc 90. The disc 90 is a next-generation MD1 disc, a next-generation MD2 disc, or a current MD system disc. An internal structure of the media drive unit 2 will be discussed later with reference to FIG. 17.

The memory transfer controller 3 controls transfers of write and read data to and from the media drive unit 2.

Under control of the memory transfer controller 3, the cluster buffer memory 4 buffers data that are read in increments of recording blocks from data tracks of the disc 90 by the media drive unit 2.

The auxiliary memory 5, under control of the memory transfer controller 3, stores various items of management information and special information retrieved from the disc 90 by the media drive unit 2.

The system controller 9 provides overall control inside the disc drive unit 1. Furthermore, the system controller 9 controls communications with the personal computer 100 connected to the disc drive unit 1.

More specifically, the system controller 9 is communicatively connected to the personal computer 100 via the USB interface 8 and USB hub 7. In this setup, the system controller 9 receives commands such as a write request and a read request from the personal computer 100 and transmits status information and other necessary information to the PC 100.

Illustratively, when the disc 90 is loaded into the media drive unit 2, the system controller 9 instructs the media drive unit 2 to retrieve management information and others from the disc 90, and causes the memory transfer controller 3 to place the retrieved management information, etc., into the auxiliary memory 5.

Given a request from the personal computer 100 for reading a certain FAT sector, the system controller 9 causes the media drive unit 2 to read a recording block containing the FAT sector in question. The retrieved recording block data are written to the cluster buffer memory 4 under control of the memory transfer controller 3.

From the recording block data written in the cluster buffer memory 4, the system controller 9 retrieves the data constituting the requested FAT sector. The retrieved data are transmitted to the personal computer 100 through the USB interface 6 and USB hub 7 under control of the system controller 9.

Given a request from the personal computer 100 for writing a certain FAT sector, the system controller 9 causes the media drive unit 2 to read the recording block containing the FAT sector in question. The retrieved recording block is written to the cluster buffer memory 4 under control of the memory transfer controller 3.

The system controller 9 feeds the memory transfer controller 3 with the FAT sector data (i.e., write data) coming from the personal computer 100 via the USB interface 6. In the cluster buffer memory 4, the corresponding FAT sector data are updated under control of the system controller 9.

The system controller 9 then instructs the memory transfer controller 3 to transfer from the cluster buffer memory 4 the recording block data, with the relevant FAT sector updated therein, to the media drive unit 2 as write data. The media drive unit 2 writes the received recording block data to the disc 90 following a data modulation process.

A switch 50 is connected to the system controller 9. This switch 50 is used to set the operation mode of the disc drive unit 1 to either the next-generation MD1 system or the current MD system. In other words, the disc drive unit 1 is capable of writing audio data to the current MD system disc 90 in one of two formats: in the format of the current MD system, or in the format of the next-generation MD1 system. The switch 50 serves to show the user explicitly what operation mode is set on the disc drive unit 1. While a mechanical switch is shown, an electrical, magnetic or hybrid switch may be used as well.

The disc drive unit 1 is furnished with a display unit 51 such as an LCD (Liquid Crystal Display). When fed with a display control signal from the system controller 9, the display unit 51 may display text data and simplified icons constituting status information on the disc drive unit 1 as well as user-oriented messages.

In its input section, the audio processing unit 10 includes illustratively an analog audio signal input part made of a line input circuit and a microphone input circuit, an A/D converter, and a digital audio data input part. The audio processing unit 10 also includes an ATRAC compression encoder/decoder and a compressed data buffer memory. Furthermore, the audio processing unit 10 includes in its output section a digital audio data output part, a D/A converter, and an analog audio signal output part made of a line output circuit and a headphone output circuit.

If the disc 90 is a current MD system disc and if audio tracks are to be recorded to the disc 90, digital audio data (or analog audio signals) are input to the audio processing unit 10. The input data are linear PCM digital audio data or analog audio signals, which are converted to linear PCM audio data through the A/D converter. The linear PCM audio data are then subjected to ATRAC compression encoding before being placed into the buffer memory. The buffered data are then read from the memory in a suitably timed manner (i.e., in data increments equivalent to ADIP clusters) and transferred to the media drive unit 2. The media drive unit 2 subjects the compressed data thus transferred to an EFM process before writing the modulated data to the disc 90 as audio tracks.

If the disc 90 is a current MD system disc and if audio tracks are to be reproduced from the disc 90, the media drive unit 2 demodulates the reproduced data back to ATRAC-compressed data and transfers the demodulated data to the audio processing unit 10 through the memory transfer controller 3. The audio processing unit 10 subjects the received data to ATRAC compression decoding to acquire linear PCM audio data which are output through the digital audio data output part. Alternatively, the received data are converted by the D/A converter to analog audio signals, which are output through the line output or headphone output part.

The disc drive unit 1 may be connected to the personal computer 100 in a manner other than through the USB arrangement. Illustratively, an external interface such as IEEE (Institute of Electrical and Electronics Engineers) 1394 may be utilized for the connection.

Read and write data are managed using the FAT system. How conversion is effected between recording blocks and FAT sectors is discussed in detail in Applicants' Japanese Patent Application No. 2001-289380, filed in the Japanese Patent Office in 2001, the entire contents of which being incorporated herein by reference.

Updating a FAT sector, as described above, involves first accessing recording block (RB) containing the FAT sector in question and then reading the recording block data from the disc. The retrieved data are written to the cluster buffer memory 4 and the FAT sector of that recording block is updated therein. With its FAT sector updated, the recording block is written back to the disc from the cluster buffer memory 4.

The recordable area is not initialized on the next-generation MD1 or MD2 disc. This means that if a given recording block has yet to be used upon FAT sector update, an attempt to read the recording block data will result in a data reproduction error because no RF signal is obtained. With no data retrieved from the disc, the FAT sector cannot be updated.

Reading a FAT sector also involves first accessing the recording block containing the FAT sector in question and then reading the recording block data from the disc. The retrieved data are written to the cluster buffer memory 4 so as to extract the target FAT sector data from the recording block. Since the recordable area is not initialized, if the recording block in question has yet to be used, the attempt to extract the data will also fail or will result in erroneous data reproduction with no RF signal obtained.

The failure discussed above is circumvented by determining whether the accessed recording block has ever been used in the past. If the recording block is judged unused, the recording block data are not read.

Figure 20:
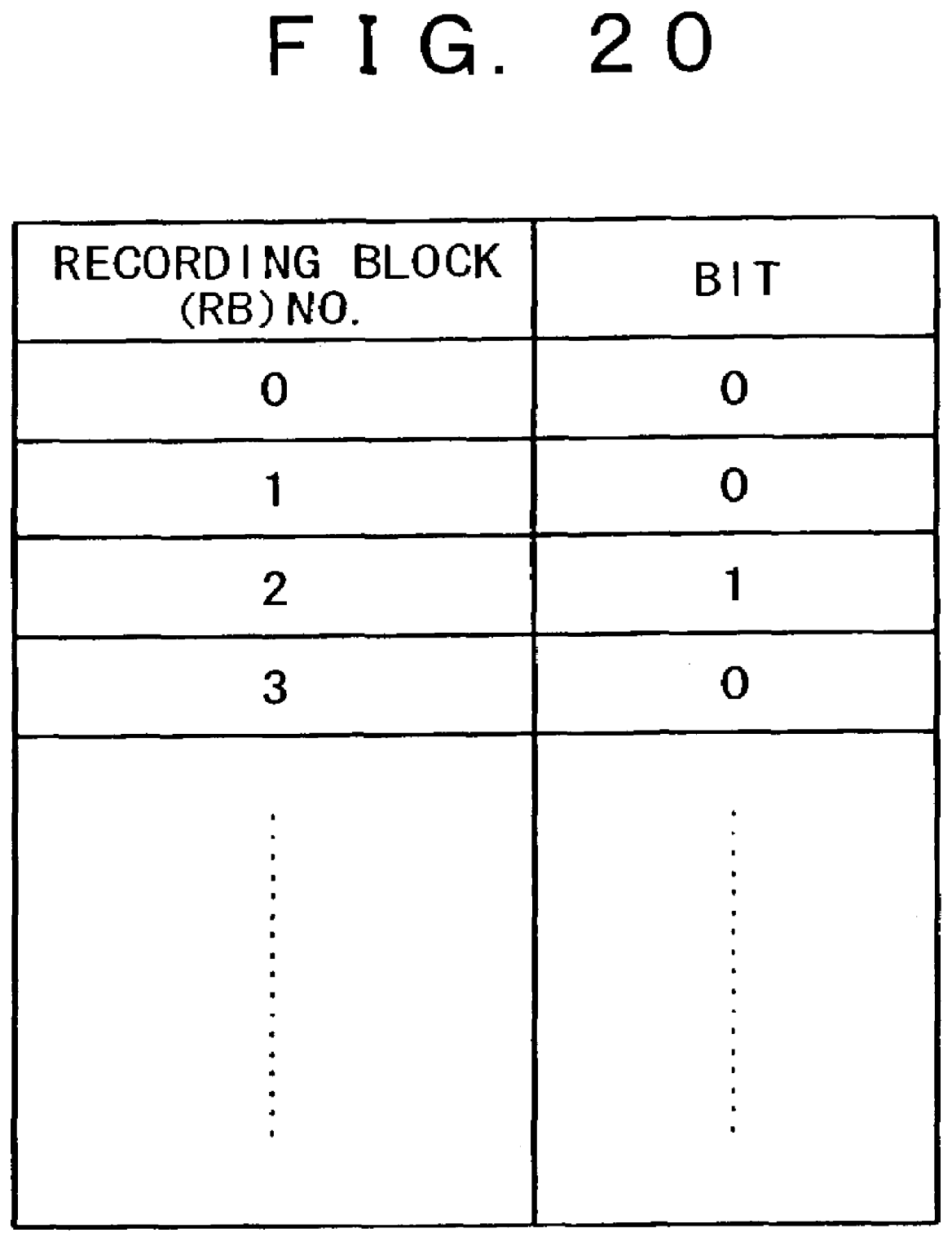

More specifically, a signal recording bitmap (SRB) is created to indicate whether each of the recording blocks represented by a recording block number have ever been used, as shown in FIG. 20. In the signal recording bitmap, a bit "0" is set for each recording block that has never had data written thereto; and a bit "1" is set for the recording block that has data written thereto at least once.

Figure 21:
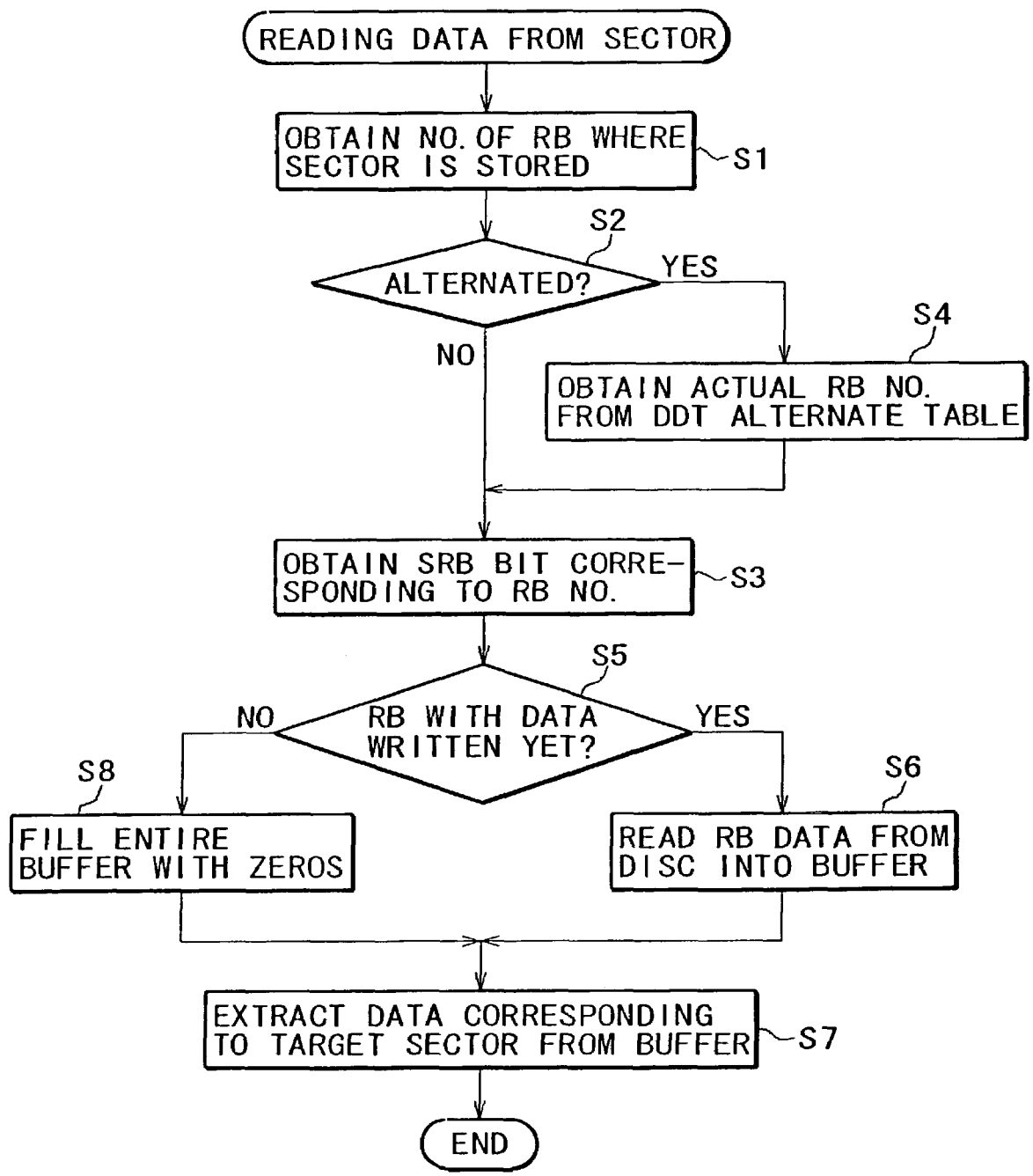
FIG. 21 is a flowchart of steps for reading data from a FAT sector.

FIG. 21 is a flowchart of steps performed when a personal computer connected to a disc drive unit compatible with the next-generation MD1 and MD2 discs reads data in increments of FAT sectors from the disc loaded in the disc drive unit.

In step S1 of FIG. 21, the computer issues a command to read data from a FAT sector, and the number of the recording block containing the FAT sector in question is obtained. The sector number in this case is an absolute sector number, with number 0 representing the beginning of the user area on the disc. In step S2, a check is made to see whether the FAT sector has been replaced by an alternate sector.

If in step S2 the FAT sector is not judged to have been replaced by an alternate sector, this means the target FAT sector is included in the recording block whose number was obtained in step S1. In that case, step S3 is reached in which the bit (0 or 1) corresponding to the recording block number is acquired from the signal recording bitmap.

If in step S2 the FAT sector in question is judged to have been replaced by an alternate sector, an actual read/write operation is to be carried out on the alternate sector. In that case, step S4 is reached in which the recording block number representing the actual alternate sector is obtained from a DDT alternate table. Step S4 is followed by step S3 in which the bit (0 or 1) corresponding to the number of the recording block containing the alternate sector is acquired from the signal recording bitmap.

The signal recording map is structured as shown in FIG. 20. If no data have yet to be written to a given recording block, the bit corresponding to that block is illustratively "0"; if data have been written to a recording block at least once, the corresponding bit for that block is illustratively "1." Step S3 is followed by step S5 in which the signal recording bitmap is referenced to see whether the recording block in question has had data written thereto in the past.

If in step S5 the bit is judged to be "1" corresponding to the recording block number in question in the signal recording bitmap (i.e., the recording block has had data written thereto in the past), then step S6 is reached. In step S6, the recording block data are read from the disc and written to the cluster buffer memory 4. In step S7, the data corresponding to the target FAT sector are extracted from inside the cluster buffer memory 4 and output as read data.

If in step S5 the bit is judged to be "0" corresponding to the recording block number in question in the signal recording bitmap (i.e., the recording block has had no data written thereto so far), then step S8 is reached. In step S8, the entire cluster buffer memory 4 is filled with zeros. Step S8 is followed by step S7 in which the data corresponding to the target FAT sector are extracted from inside the cluster buffer memory 4 and output as read data.

Figure 22:
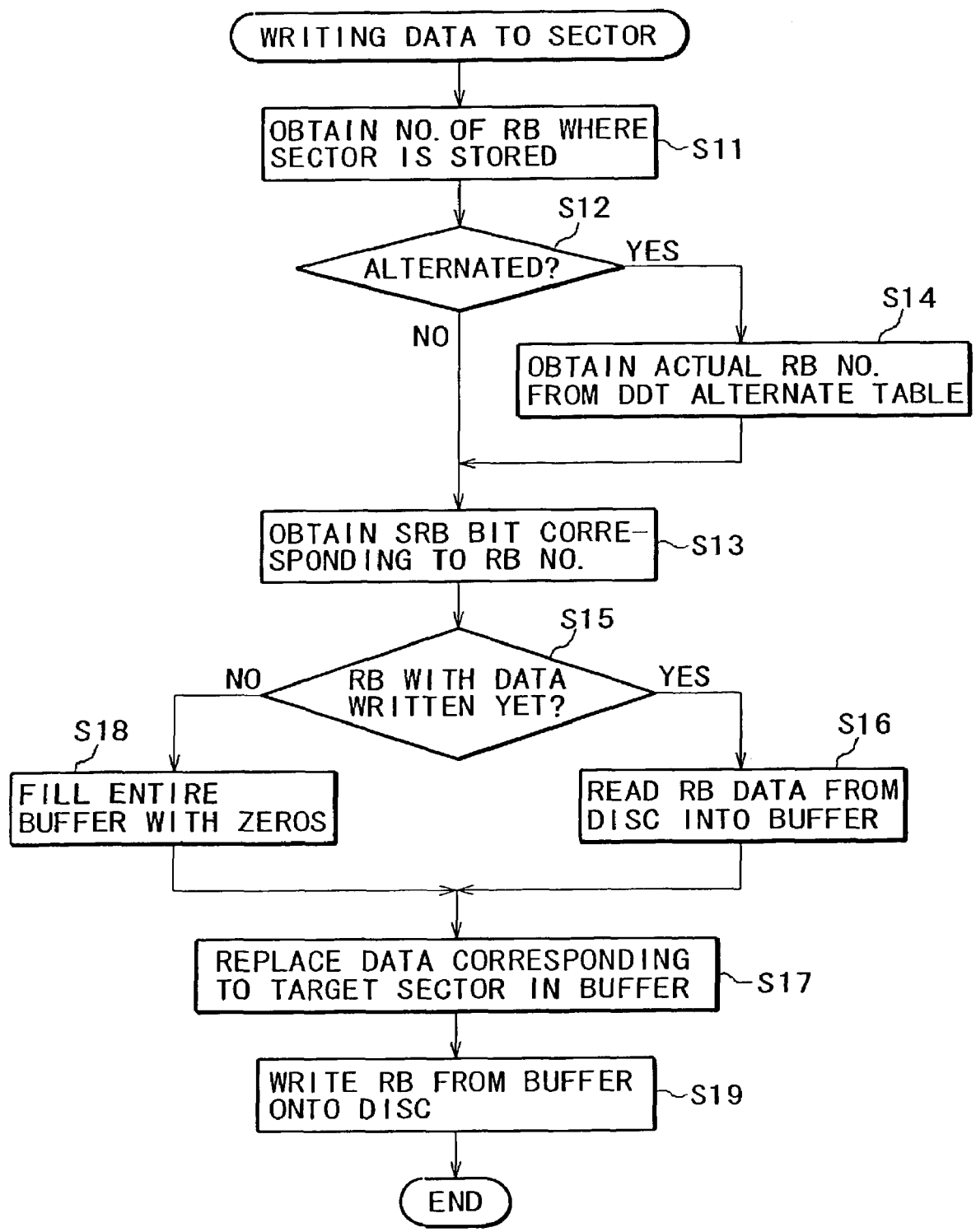
FIG. 22 is a flowchart of steps for writing data to a FAT sector.

FIG. 22 is a flowchart of steps carried out when the personal computer connected to the disc drive unit compatible with the next-generation MD1 and MD2 discs writes data in increments of FAT sectors to the disc loaded in the disc drive unit.

In step S11 of FIG. 22, the computer issues a command to write data to a FAT sector, and the number of the recording block containing the FAT sector in question is obtained. The sector number in this case is also an absolute sector number, with number 0 representing the beginning of the user area on the disc. In step S12, a check is made to see whether the FAT sector has been replaced by an alternate sector.

If in step S12 the FAT sector in question is not judged to have been replaced by an alternate sector, that means the target FAT sector is included in the recording block whose number was obtained in step S11. In this case, step S13 is reached in which the bit (0 or 1) corresponding to the recording block number is acquired from the signal recording bitmap.

If in step S12 the FAT sector is judged to have been replaced by an alternate sector, an actual read/write operation is to be carried out on the alternate sector. In that case, step S14 is reached in which the recording block number representing the actual alternate sector is obtained from the DDT alternate table. Step S14 is followed by step S13 in which the bit (0 or 1) corresponding to the number of the recording block containing the alternate sector is acquired from the signal recording bitmap.

The signal recording map is structured as shown in FIG. 20. If no data have yet to be written to a given recording block, the bit corresponding to that block is illustratively "0"; if data have been written to a recording block at least once, the corresponding bit for that block is illustratively "1." Step S13 is followed by step S15 in which the signal recording bitmap is referenced to see whether the recording block in question has had data written thereto in the past.

If in step S15 the bit is judged to be "1" corresponding to the recording block number in question in the signal recording bitmap (i.e., the recording block has had data written thereto in the past), then step S16 is reached. In step S16, the recording block data are read from the disc and written to the cluster buffer memory 4. In step S17, the data corresponding to the target FAT sector in the recording block are replaced with write data inside the cluster buffer memory 4.

If in step S15 the bit is judged to be "0" corresponding to the recording block number in question in the signal recording bitmap (i.e., the recording block has had no data written thereto so far), then step S18 is reached. In step S18, the entire cluster buffer memory 4 is filled with zeros. Step S18 is followed by step S17 in which the data corresponding to the target FAT sector in the recording block are replaced with the write data inside the cluster buffer memory 4.

After the data corresponding to the target FAT sector in the recording block of interest are replaced with the write data in step S17, step S19 is reached. In step S19, the recording block data are written to the disc.

As described, when data are written to or read from a FAT sector, a check is made to see if the recording block containing that FAT sector has ever been used. If the recording block is judged unused, data are not read from the recording block, and the entire cluster buffer memory 4 is filled with zeros. This allows the unused recording block to be handled as having an initial value of 0. As a result, no error occurs when data are written or read in increments of FAT sectors even if the recording block containing the target FAT sector has never been used and an RF signal is not acquired.

In the preceding examples, data are written to or read from the target FAT sector in a setup where the personal computer is connected to the disc drive unit compatible with the next-generation MD1 and MD2 discs. In such cases, the FAT sector is designated by the personal computer using an absolute sector number, with number 0 representing the beginning of the user area. By contrast, if the disc drive unit alone is used to write or read data to or from the target FAT sector on the disc, the FAT sector is identified using a file directory entry and a FAT chain, as shown in FIGS. 23 and 24.

Figure 23:
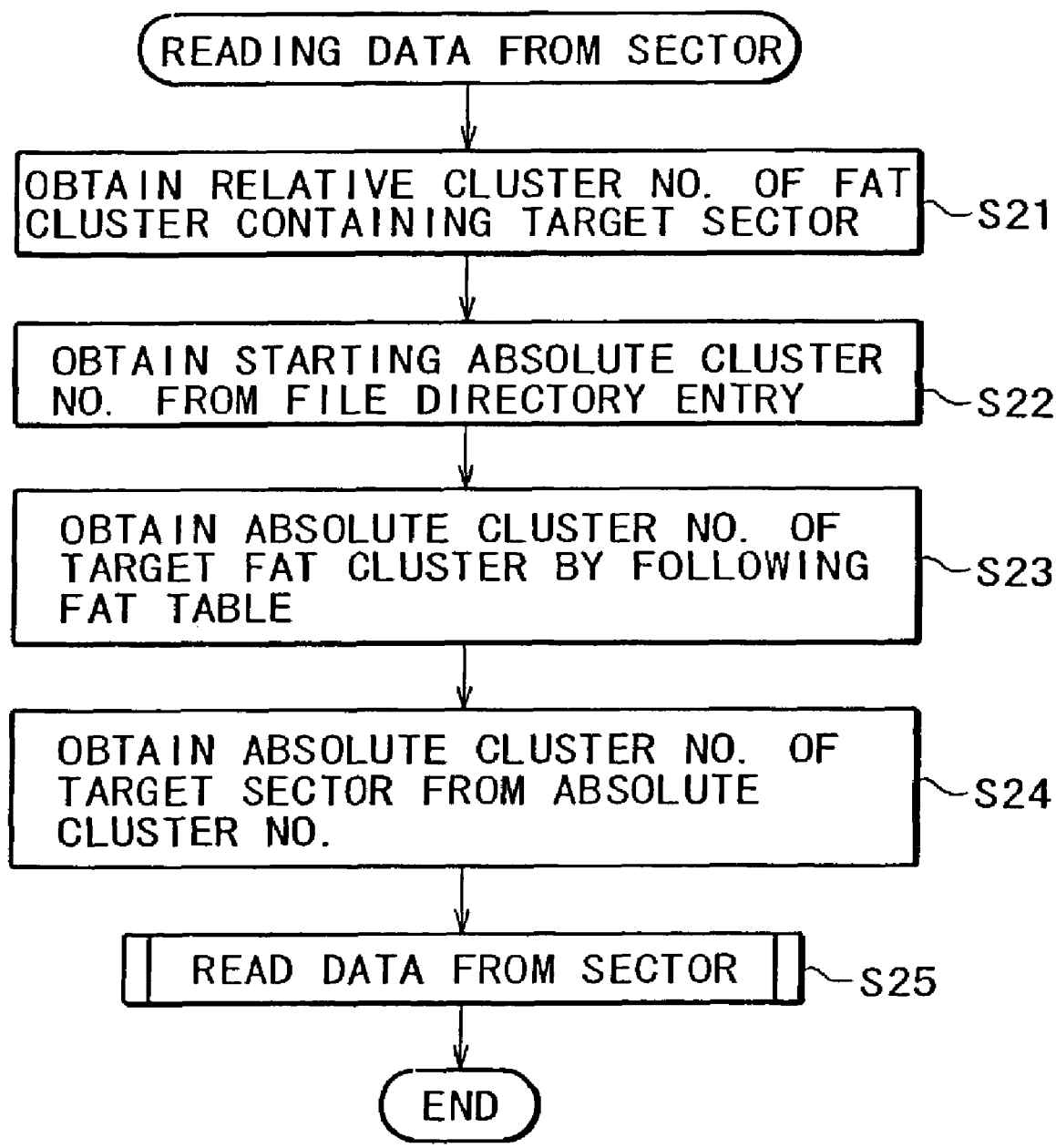
FIG. 23 is a flowchart of steps in which the disc drive unit alone reads data from a FAT sector.

FIG. 23 is a flowchart of steps in which the disc drive unit alone reads data from a FAT sector of a next-generation MD1 or MD2 disc.

In step S21 of FIG. 23, the relative cluster number of the FAT cluster containing the target FAT sector is obtained. In step S22, the absolute cluster number of the first FAT cluster is acquired from the file directory entry. In step S23, a FAT table chain is followed from the starting absolute cluster number thus acquired, until the absolute cluster number of the target FAT cluster is obtained. In step S24, the absolute sector number of the target FAT sector is acquired from the absolute cluster number of the target FAT cluster. With the absolute sector number of the target FAT sector thus acquired, step S25 is reached in which data are read from the FAT sector. The sector data reading process is the same as that shown in FIG. 21.

Figure 24:
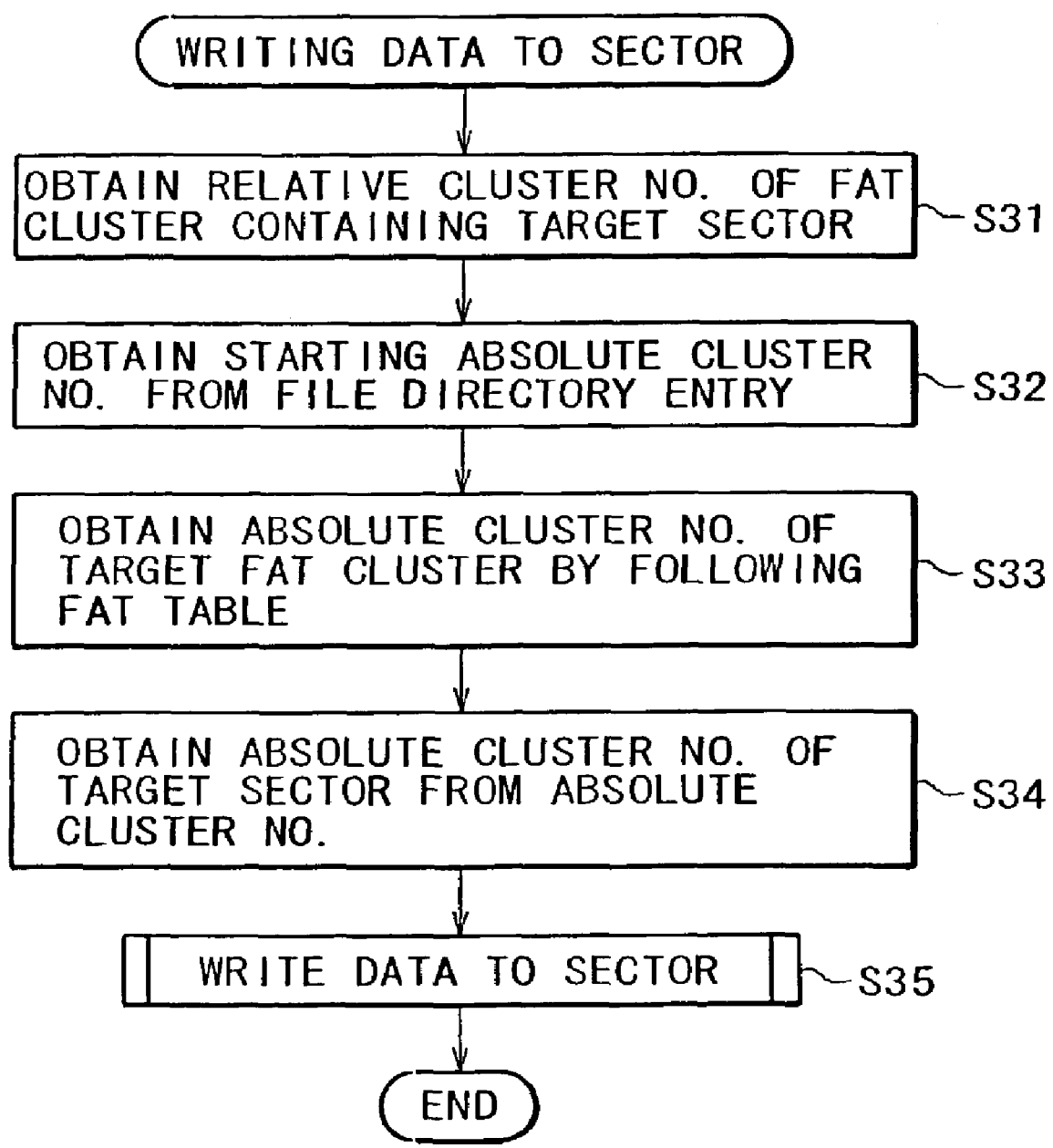
FIG. 24 is a flowchart of steps in which the disc drive unit alone writes data to a FAT sector.

FIG. 24 is a flowchart of steps in which the disc drive unit alone writes data to a FAT sector of a next-generation MD1 or MD2 disc.

In step S31 of FIG. 24, the relative cluster number of the FAT cluster containing the target FAT sector is obtained. In step S32, the absolute cluster number of the first FAT cluster is acquired from the file directory entry. In step S33, the FAT table chain is followed from the starting absolute cluster number thus acquired, until the absolute cluster number of the target FAT cluster is obtained. In step S34, the absolute sector number of the target FAT sector is obtained from the absolute cluster number of the target FAT cluster. With the absolute sector number of the target FAT sector thus acquired, step S35 is reached in which data are written to the FAT sector. The sector data writing process is the same as that shown in FIG. 22.

In the preceding examples, the signal recording bitmap shown in FIG. 20 is used to determine whether the recording block containing the target FAT sector has ever been used before. The FAT is illustratively managed in increments of 32-kilobyte FAT clusters. Using the FAT information makes it possible to check whether any given FAT sector has been used in the past. Based on the FAT information, it is possible to create a signal recording bitmap showing illustratively whether each of the 64-kilobyte recording blocks has already been used at least once.

Figure 25:
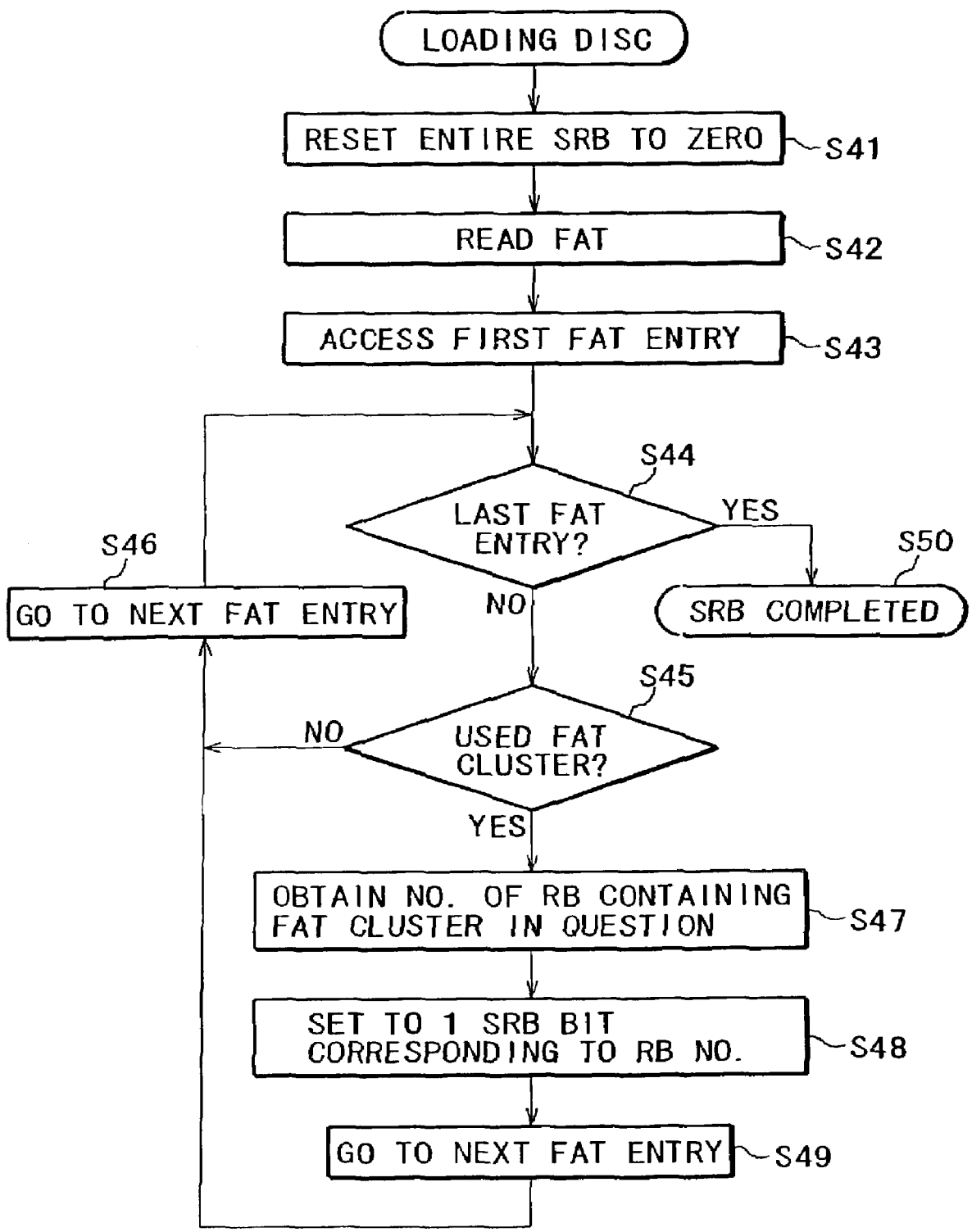
FIG. 25 is a flowchart of steps for generating a signal recording bitmap.

FIG. 25 is a flowchart of steps for generating a signal recording bitmap using FAT information. In step S41 of FIG. 15, with the disc loaded, the values representative of the recording blocks in the signal recording bitmap are all reset to zero. In step S42, the FAT information is read. In step S43, the first FAT entry is accessed.

From the first FAT entry to the last, checks are made to see whether each of the FAT clusters involved has ever been used so far. That bit in the signal recording bitmap, which corresponds to any unused FAT cluster, is left intact at "0"; those bits in the signal recording bitmap, which correspond to used FAT clusters, are each set to "1."

That is, with the first FAT entry accessed in step S43, step S44 is reached in which a check is made to see if the currently checked entry is the last FAT entry. If in step S44 the currently checked entry is not judged to be the last FAT entry, step S45 is reached. In step S45, a check is made to see whether the currently checked FAT entry is a used FAT cluster.

If in step S45 the currently checked FAT entry is judged to be an unused FAT cluster, step S46 is reached in which the next FAT entry is reached. From step S46, control is returned to step S44.

If in step S45 the currently checked FAT entry is judged to be a used FAT cluster, step S47 is reached in which the number of the recording block containing the FAT cluster in question is obtained. In step S48, the bit corresponding to the recording block is set to "1" in the signal recording bitmap. In step S49, the next FAT entry is reached. From step S49, control is returned to step S44.

Repeatedly performing steps S44 through S49 generates a signal recording bitmap in which the bits corresponding to unused FAT clusters are left unchanged at "0" while the bits corresponding to used FAT clusters are each set to "1."

If in step S44 the currently checked FAT entry is judged to be the last FAT entry, then step S50 is reached in which the signal recording bitmap is deemed complete.

As described, using the FAT information makes it possible to create the signal recording bitmap. Depending on the operating system, however, the FAT clusters judged used based on the FAT information may not signify those with data actually written thereto in the past. Under such an operating system, some FAT clusters may be judged already used but in fact they are unused.

The above conflict is avoided by writing the signal recording bitmap to the disc. As illustrated in FIGS. 2 and 4, the next-generation MD1 and MD2 discs have a reserve track each between the DDT track and the FAT track. The reserve track may be used to retain a signal recording bitmap that accommodates signal recording bitmap information shown in FIG. 20.

If the location of the track to which to record the signal recording bitmap is determined in advance by the system, the bitmap can be accessed directly based on its predetermined location. The DDT track and FAT track may also be accessed directly if their locations are determined beforehand by the system. Obviously, the locations of these special tracks may alternatively be recorded in the management area (U-TOC on the next-generation MD1 disc; control area containing ADIP-based control information on the next-generation MD2 disc). The data from the DDT track and FAT track are read when the disc is loaded, and are placed into a buffer memory. The data thus retrieved are used as the basis for generating alternate sector information and FAT information. These items of information in the buffer memory are updated while the disc is being used. When the disc is ejected, the updated alternate sector information and FAT information are written back to the DDT track and FAT track. Writing or reading the signal recording bitmap to or from its recording track is done basically the same way as writing or reading the data to or from the DDT track and FAT track.

When the disc is loaded, the signal recording bitmap information is read from its recording track and placed into the memory. Every time data are written anew to a recording block, the corresponding signal recording bitmap entry is updated in the memory. When the disc is ejected, the updated signal recording bitmap is read from the memory and written to the signal recording bitmap track on the disc.

Figure 26:
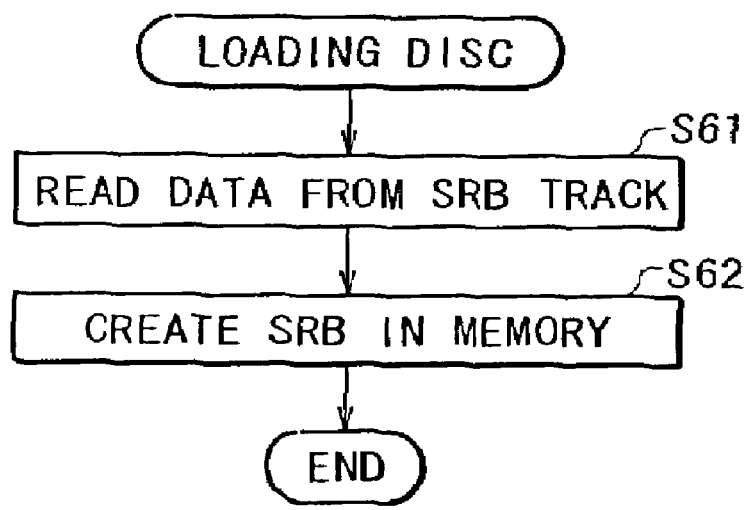
FIG. 26 is another flowchart of steps for generating the signal recording bitmap.

FIG. 26 is a flowchart of steps for reading information from the signal recording bitmap track. In step S61 of FIG. 26, with the disc loaded, information is read from the signal recording bitmap track of the disc. In step S62, the information read from the signal recording bitmap track is written to the memory and turned into a signal recording bitmap.

Figure 27:
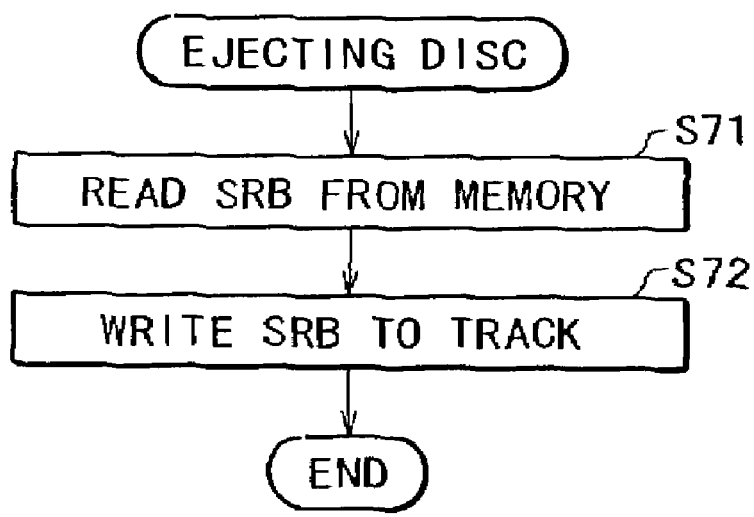
FIG. 27 is another flowchart of steps for generating the signal recording bitmap.

FIG. 27 is a flowchart of steps for writing the signal recording bitmap back to the signal recording bitmap track on the disc. In the memory, the signal recording bitmap is updated every time data are written anew to any recording block.

In step S71 of FIG. 27, when the disc is ejected, the updated signal recording bitmap is read from the memory. In step S72, the updated signal recording bitmap thus retrieved is written to the signal recording bitmap track on the disc.

In its initial state, the information held in the signal recording bitmap track is all zeros. Upon each use of the disc, those bits in the signal recording bitmap, which correspond to the recording blocks subjected to data write operations, are each updated to "1." This information in the signal recording bitmap is written back to the signal recording bitmap track on the disc. Next time the disc is loaded for use, the information is read from the signal recording bitmap track and turned into a signal recording bitmap in the memory. These steps make it possible to generate the signal recording bitmap without recourse to the FAT information.

Described below with reference to FIG. 17 is a typical structure of the media drive unit 2 capable of writing and reading data to and from both the data tracks and the audio tracks of the disc.

As illustrated in FIG. 17, the media drive unit 2 has a turntable that may accommodate three kinds of discs: a current MD system disc, a next-generation MD1 disc, and a next-generation MD2 disc. The disc 90 placed on the turntable is rotated by a spindle motor 29 on a CLV basis. For a write or read operation on the disc 90, an optical head 19 emits a laser beam onto the disc surface.

For the write operation, the optical head 19 outputs a laser beam at a level high enough to heat the recording track up to the Curie temperature; for the read operation, the optical head 19 outputs a laser beam at a relative low level sufficient to detect data from the reflected light based on the magnetic Kerr effect. In order to implement these capabilities, the optical head 19 incorporates a laser diode as laser outputting means, an optical system made up of a polarization beam splitter and an objective lens, and a detector arrangement for detecting the reflected light, not shown. The objective lens in the optical head 19 is held illustratively by a dual axis mechanism in both radially and perpendicularly displaceable relation with the disc surface.

A magnetic head 18 is positioned in symmetrically opposite relation to the optical head 19 across the disc 90. The magnetic head 18 applies to the disc 90 a magnetic field so modulated as to represent write data. Although not shown, there are a sled motor and a sled mechanism for moving the optical head 19 in its entirety and the magnetic head 18 in the radial direction of the disc.

The optical head 19 and magnetic head 18 execute a pulse-driven magnetic field modulation process to form infinitesimal markings on the next-generation MD2 disc. On the current MD system disc or next-generation MD1 disc, the optical head 19 and magnetic head 18 carry out a DC emission magnetic field modulation process.

The media drive unit 2 also includes a recording processing section, a reproduction processing section, and a servo section in addition to the recording/reproducing head section made up of the optical head 19 and magnetic head 18, and the disc rotation drive section formed by the spindle motor 29.

One of three kinds of discs 90 may be loaded: the current MD system disc, the next-generation MD1 disc, or the next-generation MD2 disc. Linear velocity varies with the disc type. The spindle motor 29 is capable of rotating each loaded disc 90 at a speed compatible with the disc type in question. That is, the disc 90 placed on the turntable is rotated at a linear velocity corresponding to one of the three usable disc types above.

The recording processing section includes two portions: one adopting ACIRC for error correction and EFM for data modulation in order to write error-corrected modulated data to audio tracks on the current MD system disc, and the other portion utilizing BIS and LDC in combination for error correction and the 1-7 pp modulation for data modulation so as to write error-corrected modulated data to the next-generation MD1 or MD2 system disc.

The reproduction processing section includes two portions: one adopting EFM for data demodulation and ACIRC for error correction in reproducing data from the current MD system disc, and the other portion utilizing the 1-7 demodulation based on data detection using the partial response scheme and Viterbi decoding method for data reproduction from the next-generation MD1 or MD2 system disc.

The reproduction processing section further includes a portion for decoding ADIP signal-based addresses used by the current MD system or by the next-generation MD1 system, and a portion for decoding the ADIP signal adopted by the next-generation MD2 system.

Laser emission from the optical head 19 onto the disc 90 produces a reflected light beam representative of information detected from the disc. The detected information, i.e., a photoelectric current obtained by a photo detector detecting the reflected laser beam, is sent to an RF amplifier 21.

The RF amplifier 21 subjects the detected information thus received to current-to-voltage conversion, amplification, and matrix computation in order to extract reproduced information including a reproduced RF signal, a tracking error signal TE, a focus error signal FE, and groove information (ADIP information recorded as track wobbles on the disc 90).

When data are reproduced from the current MD system disc, the reproduced RF signal obtained by the RF amplifier 21 is processed by an EFM demodulation unit 24 and an ACIRC decoder 25. More specifically, the EFM demodulation unit 24 binarizes the reproduced RF signal into an EFM signal train before submitting it to EFM demodulation. The demodulated signal is subjected to error correction and de-interleave processing by the ACIRC decoder 25. At this point, ATRAC-compressed data are obtained.

Upon data reproduction from the current MD system disc, a selector 26 is set to contact B. In that setting, the selector 26 allows the demodulated ATRAC-compressed data to be output as the reproduced data from the disc 90.

When data are reproduced from the next-generation MD1 or MD2 disc, the reproduced RF signal obtained by the RF amplifier 21 is fed to an RLL(1-7)PP demodulation unit 22 and an RS-LDC decoder 23. More specifically, given the reproduced RF signal, the RLL(1-7)PP demodulation unit 22 performs data detection through PR(1, 2, 1)ML or PR(1, −1)ML and Viterbi decoding to acquire an RLL(1-7) code train as reproduced data. The demodulation unit 22 subjects the RLL(1-7) code train to RLL(1-7) demodulation. The demodulated data are fed to the RS-LDC decoder 23 for error correction and de-interleave processing.

Upon data reproduction from the next-generation MD1 or MD2 disc, the selector 26 is set to contact A. The selector 26 in that setting allows the demodulated data to be output as the reproduced data from the disc 90.

The tracking error signal TE and focus error signal FE from the RF amplifier 21 are sent to a servo circuit 27. The groove information from the RF amplifier 21 is supplied to an ADIP demodulation unit 30.

The ADIP demodulation unit 30 submits the received groove information to a band-pass filter to extract the wobble components, before effecting FM demodulation and biphase demodulation to demodulate the ADIP signal. The demodulated ADIP signal is fed to address decoders 32 and 33.

On the current MD system disc or next-generation MD1 disc, the ADIP sector number is eight bits long, as shown in FIG. 9. On the next-generation MD2 disc, by contrast, the ADIP sector number is four bits long as illustrated in FIG. 11. The address decoder 32 decodes the ADIP address from the current MD system disc or next-generation MD1 disc, while the address decoder 33 decodes the ADIP address from the next-generation MD2 disc.

The ADIP address decoded by the address decoder 32 or 33 is sent to a drive controller 31. Given the ADIP address, the drive controller 31 carries out necessary control processing. The groove information from the RF amplifier 21 is also fed to the servo circuit 27 for spindle servo control.

The servo circuit 27 integrates phase differences between the received groove information and a reproduced clock signal (PLL clock signal in effect upon decoding) to obtain an error signal. Based on the error signal thus acquired, the servo circuit 27 generates a spindle error signal for CLV or CAV servo control.

The servo circuit 27 generates various servo control signals (e.g., tracking control signal, focus control signal, sled control signal, and spindle control signal) based on the spindle error signal, on the tracking error signal and focus error signal from the RF amplifier 21, or on a track jump command and an access command from the drive controller 31. The servo control signals thus generated are output to a motor driver 28. More specifically, the servo circuit 27 subjects the servo error signals and commands to such processes as phase compensation, gain processing, and target value setting in order to generate the diverse servo control signals.

The motor driver 28 generates servo drive signals based on the servo control signals fed from the servo circuit 27. The servo drive signals generated by the motor driver 28 are made up of dual axis drive signals for driving the dual axis mechanism (two signals for driving in focusing and tracking directions), a sled motor drive signal for driving the sled mechanism, and a spindle motor drive signal for driving the spindle motor 29. These servo drive signals provide focus and tracking control on the disc 90 and CLV or CAV control over the spindle motor 29.

When audio data are to be recorded to the current MD system disc, a selector 16 is set to contact B. The selector setting allows the ACIRC encoder 14 and EFM modulation unit 15 to function. In this setup, the compressed data coming from the audio processing unit 10 are subjected to interleave processing and error correction coding by the ACIRC encoder 14. The output of the ACIRC encoder 14 is submitted to EFM processing by the EFM modulation unit 15.

The EFM-modulated data are fed to a magnetic head driver 17 through the selector 16. The magnetic head 18 applies to the disc 90 a magnetic field representative of the EFM-modulated data, whereby the data are written to audio tracks on the disc 90.

When audio data are to be recorded to the next-generation MD1 or MD2 disc, the selector 16 is set to contact A. That setting allows an RS-LDC encoder 12 and an RLL(1-7)PP modulation unit 13 to function. In this setup, high-density data coming from the memory transfer controller 3 are subjected to interleave processing and RS-LDC-based error correction coding by the RS-LDC encoder 12. The output of the RS-LDC encoder 12 is submitted to RLL(1-7) modulation by the RLL(1-7)PP modulation unit 13.

The write data in the form of an RLL(1-7) code train are fed to the magnetic head driver 17 through the selector 16. The magnetic head 18 applies to the disc 90 a magnetic field representative of the modulated data, whereby the data are written to audio tracks on the disc 90.

The purpose of a laser driver/APC 20 is twofold: to cause the laser diode to emit a laser beam during the read and write operations as described above, and to effect so-called APC (Automatic Laser Power Control).

Although not shown, a detector for monitoring the laser power level is incorporated in the optical head 19. A monitor signal from the detector is fed back to the laser driver/APC 20. The laser driver/APC 20 compares the current laser power level acquired as the monitor signal with an established laser power level to find an error difference. By getting that error difference reflected in the laser drive signal, the laser driver 20 keeps the laser power from the laser diode stabilized at the established level.

Two laser power levels, i.e., a read laser power level and a write laser power level, are set by the drive controller 31 to registers inside the laser driver/APC 20.

Under control of the system controller 9, the drive controller 31 sees to it that the controlled operations described above (access, servo operations, data write operation, and data read operation) are properly carried out.

In FIG. 17, portions A and B enclosed by dashed lines may each be implemented as a single-chip circuit part.

5. Initialization of Next-Generation MD1 and MD2 discs

On both the next-generation MD1 disc and the next-generation MD2 disc, a unique ID (UID) is recorded in addition to the FAT for security management purposes as mentioned earlier. On each next-generation MD1 or MD2 disc, in principle, the UID is recorded to a predetermined location such as in the lead-in area before the disc is shipped from the factory. Alternatively, the UID may be written elsewhere on the disc. As long as the UID is written to a fixed location after disc initialization, the UID may be recorded to that location beforehand.

The next-generation MD1 system utilizes the same disc as that of the current MD system. That means a huge number of current MD system discs already marketed with no UID recorded on any of them are to be used by the next-generation MD1 system.

New standards have thus been established to allocate a specifically protected area on each of these numerous current MD system discs that may be utilized by the next-generation MD1 system. Upon initialization of any of these discs, the disc drive unit 1 writes a random number signal to the protected area for use as the UID of the disc in question. Under new standards, users are prohibited from accessing the UID-filled area. The UID is not limited to random number signals; it may be given as the combination of a manufacturer code, an equipment code, an equipment serial number, and a random number. It is also possible to combine at least one of the manufacturer code, equipment code, and equipment serial number, with a random number for use as the UID.

Figure 18:
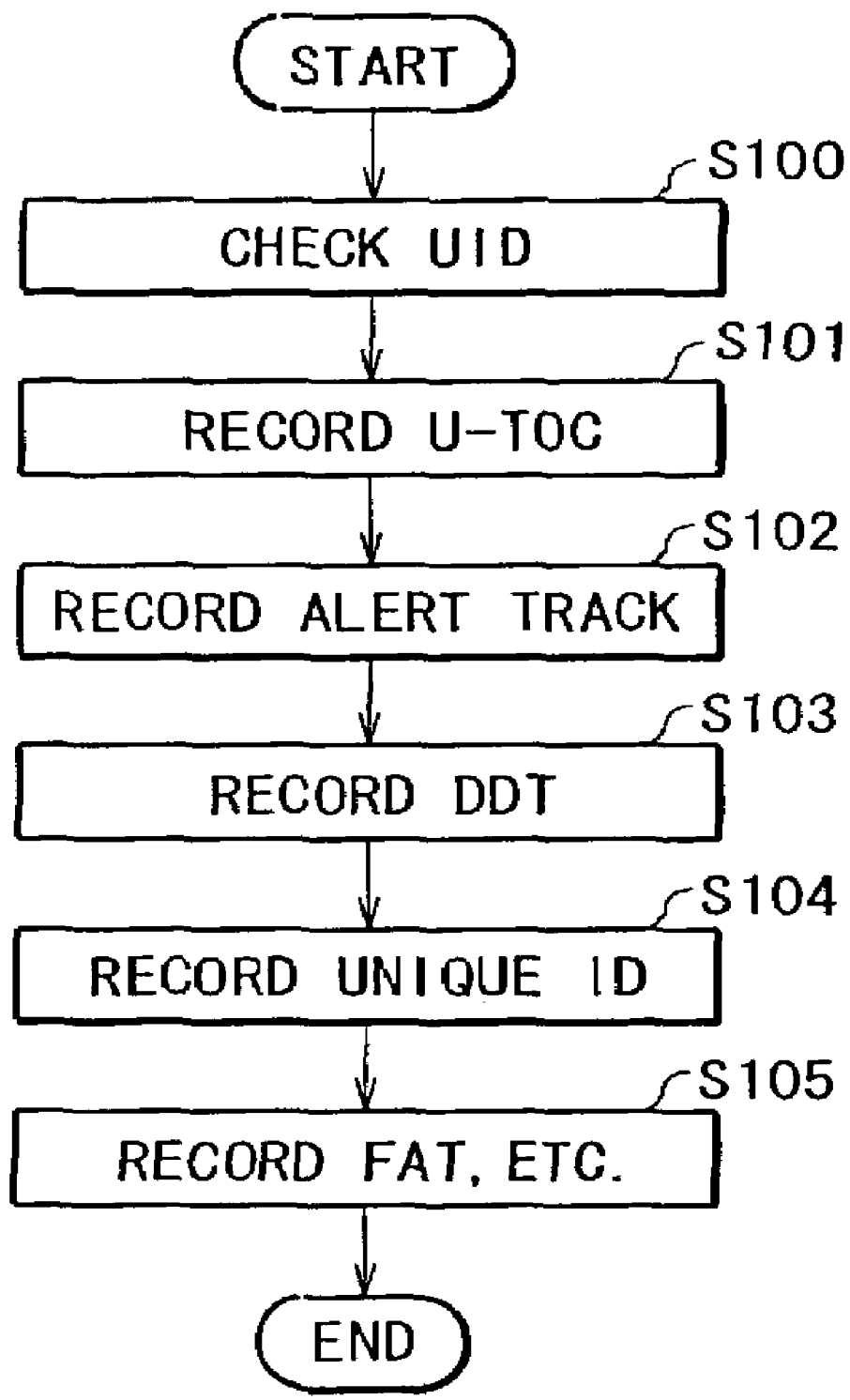
FIG. 18 is a flowchart of steps for initializing a next-generation MD1 disc.

FIG. 18 is a flowchart of steps for initializing a next-generation MD1 disc. In the first step S100 of FIG. 18, a predetermined location on the disc is accessed to determine whether a UID is recorded there. If a UID is judged as being recorded, the UID is read and placed temporarily into, say, the auxiliary memory 5.

The location to be accessed in step S100 is an area outside the FAT area in the next-generation MD1 system format, such as the lead-in area. If the disc 90 in question was initialized in the past and is already furnished with a DDT area, that area may be accessed instead. Step S100 may be skipped where appropriate.

In step S101, data are recorded to the U-TOC area in an EFM modulation process. Written at this point to the U-TOC is information for securing two kinds of areas: an alert track, and an area of tracks following the DDT area, i.e., an area in which data are to be recorded in 1-7 pp modulation format. In step S102, data are written to the alert track in EFM format. In step S103, data are written to the DDT area in 1-7 pp modulation format.

In step S104, a UID is recorded outside the FAT area such as in the DDT area. If the UID was read from its predetermined location and placed into the auxiliary memory 5 in step S100 above, that UID is recorded here. If in step S100 the UID was not judged as being written in a predetermined location on the disc or if step S100 is skipped outright, a UID is generated based on a random number signal and the generated UID is recorded. The UID is generated illustratively by the system controller 9. The generated UID is fed to the media drive unit 2 via the memory transfer controller 3 before being written to the disc 90.

In step S105, FAT and other data are written to the area for data storage in 1-7 pp modulation format. In other words, the UID is recorded outside the FAT area. For the next-generation MD1 system, as described above, initialization of the recordable area managed under the FAT scheme is not mandatory.

Figure 19:
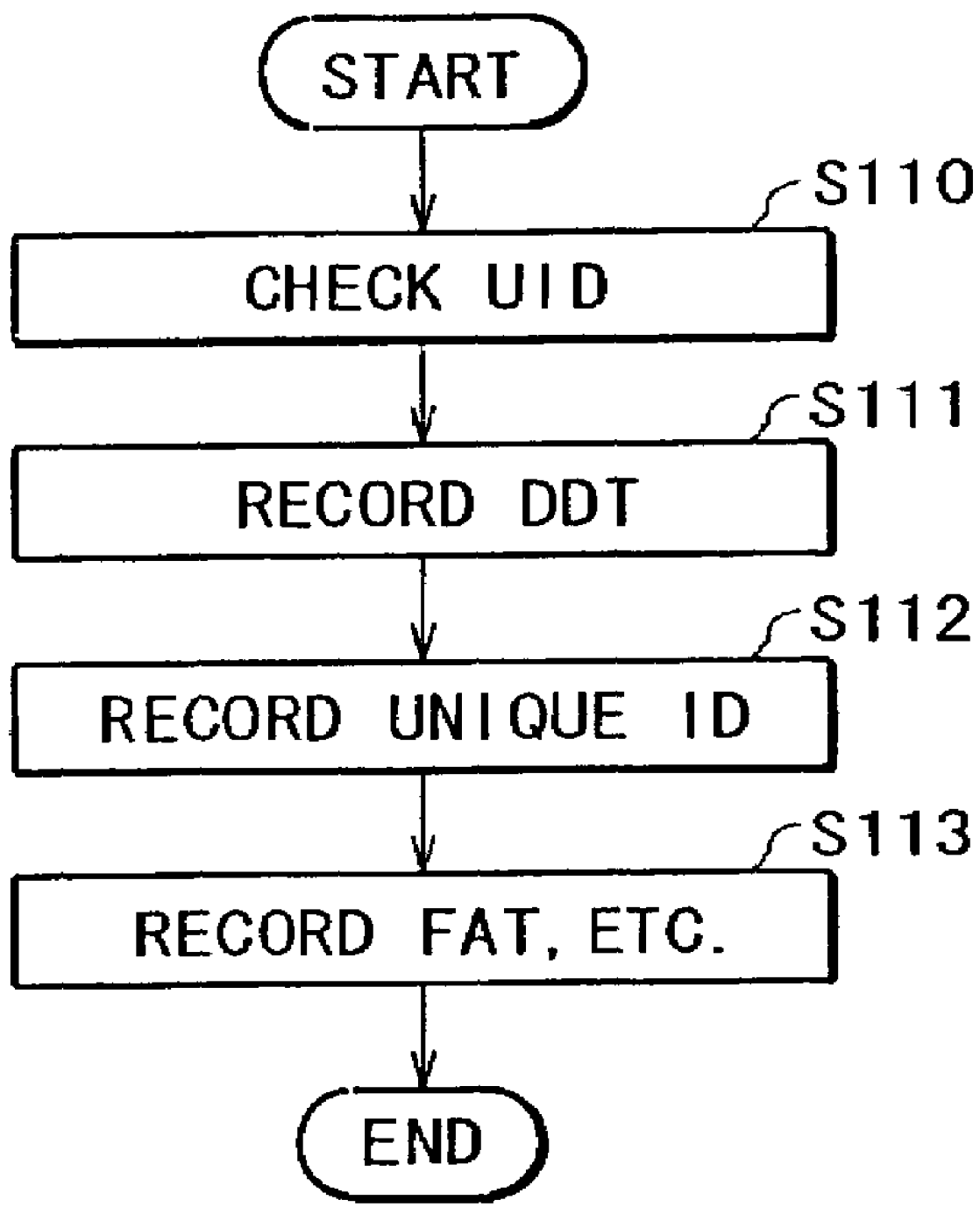
FIG. 19 is a flowchart of steps for initializing a next-generation MD2 disc.

FIG. 19 is a flowchart of steps for initializing a next-generation MD2 disc. In the first Step S110 0f FIG. 19, a predetermined location where a UID is supposed to be recorded beforehand such as the lead-in area, or the DDT area if the disc was initialized in the past, is accessed to determine whether a UID is recorded there. If the UID is judged recorded, that UID is read and placed temporarily in, say, the auxiliary memory 5. Because the UID recording location is fixedly determined in the format, it can be accessed directly without reference to any other management information on the disc. This feature may also be applied to the processing discussed above with reference to FIG. 18.

In step S111, data are recorded to the DDT area in 1-7 pp modulation format. In step S112, the UID is recorded outside the FAT area such as in the DDT area. The UID recorded at this point is the UID that was retrieved from the predetermined location on the disc and placed into the auxiliary memory 5 in step S110. If in step S110 the UID was not judged recorded in the predetermined location on the disc, then a UID is generated on the basis of a random number signal, and the generated UID is written. The UID is generated illustratively by the system controller 9. The generated UID is fed to the media drive unit 2 via the memory transfer controller 3 before being written to the disc 90.

In step S113, FAT and other data are recorded. The UID is recorded outside the FAT area. For the next-generation MD2 system, as described above, initialization of the recordable area managed under the FAT scheme is not effected.

6. First Example of the Audio Data Management System

As discussed above, the next-generation MD1 and MD2 systems embodying this invention have their data managed by the FAT system. Audio data to be recorded are compressed by a predetermined data compression method and encrypted for copyright protection. The audio data compression method is illustratively ATRAC3 or ATRAC5. It is also possible to adopt MP3 (MPEG1 Audio Layer 3), AAC (MPEG2 Advanced Audio Coding), or other suitable compression method. Not only audio data but also still image data and moving image data may be handled. Since the FAT system is in use, general-purpose data may also be recorded and reproduced by the next-generation MD1 and MD2 systems. Furthermore, computer-readable and executable instructions may be encoded on the disc so the MD1 or MD2 may also contain executable files.

Described below is a system for managing audio data as they are recorded and reproduced to and from the next-generation MD1 and MD2 discs.

Because the next-generation MD1 and MD2 systems are designed to reproduce high-quality audio data for extended periods of time, there are a large number of audio data items to be managed on a single disc. Since the FAT system is adopted for data management purposes, better compatibility with computers is ensured. This feature, however, as recognized by the present inventors, has its advantages and disadvantages. Whereas the ease of operation is enhanced on the part of users, audio data could be copied illegally to the detriment of copyright holders. These characteristics were especially taken into consideration in the development of the inventive audio data management system.

Figure 28:
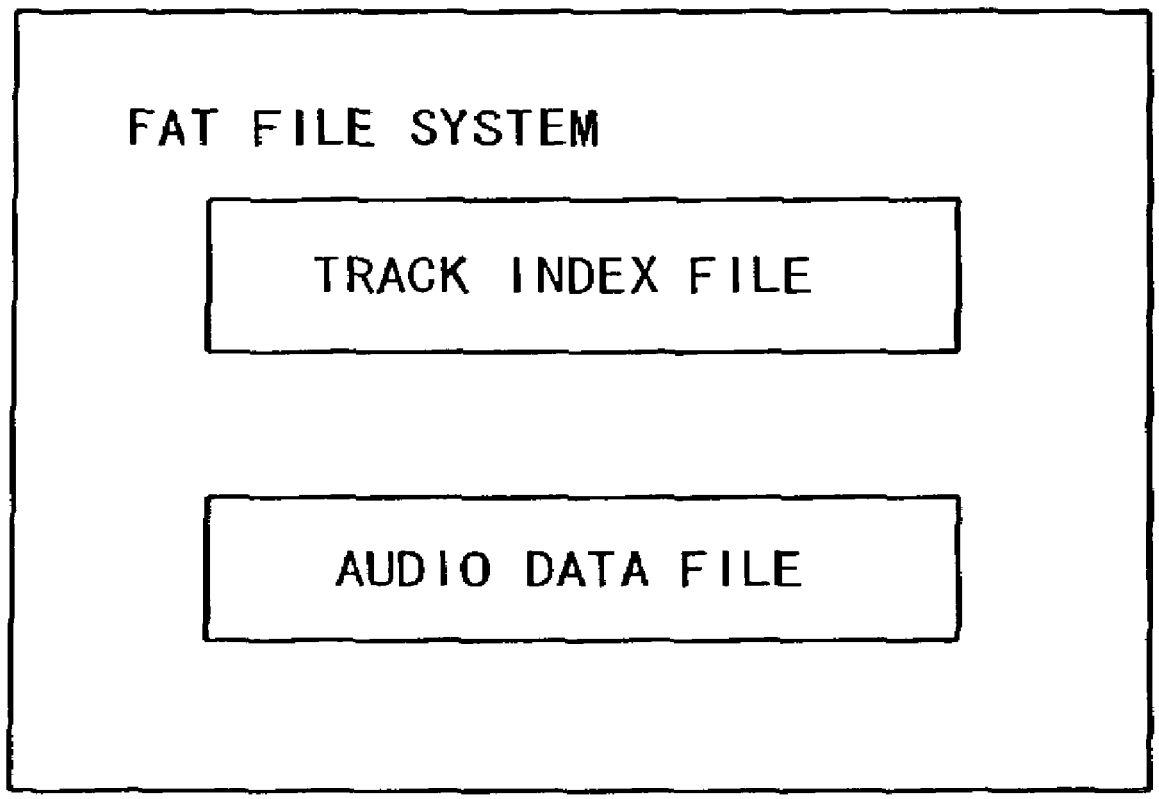
FIG. 28 is an explanatory view of a first example of an audio data management system.

FIG. 28 is an explanatory view of a first example of the audio data management system. As shown in FIG. 28, the audio data management system in its first-example setup generates a track index file and an audio data file on the disc. These are the files managed by the FAT system.

Figure 29:
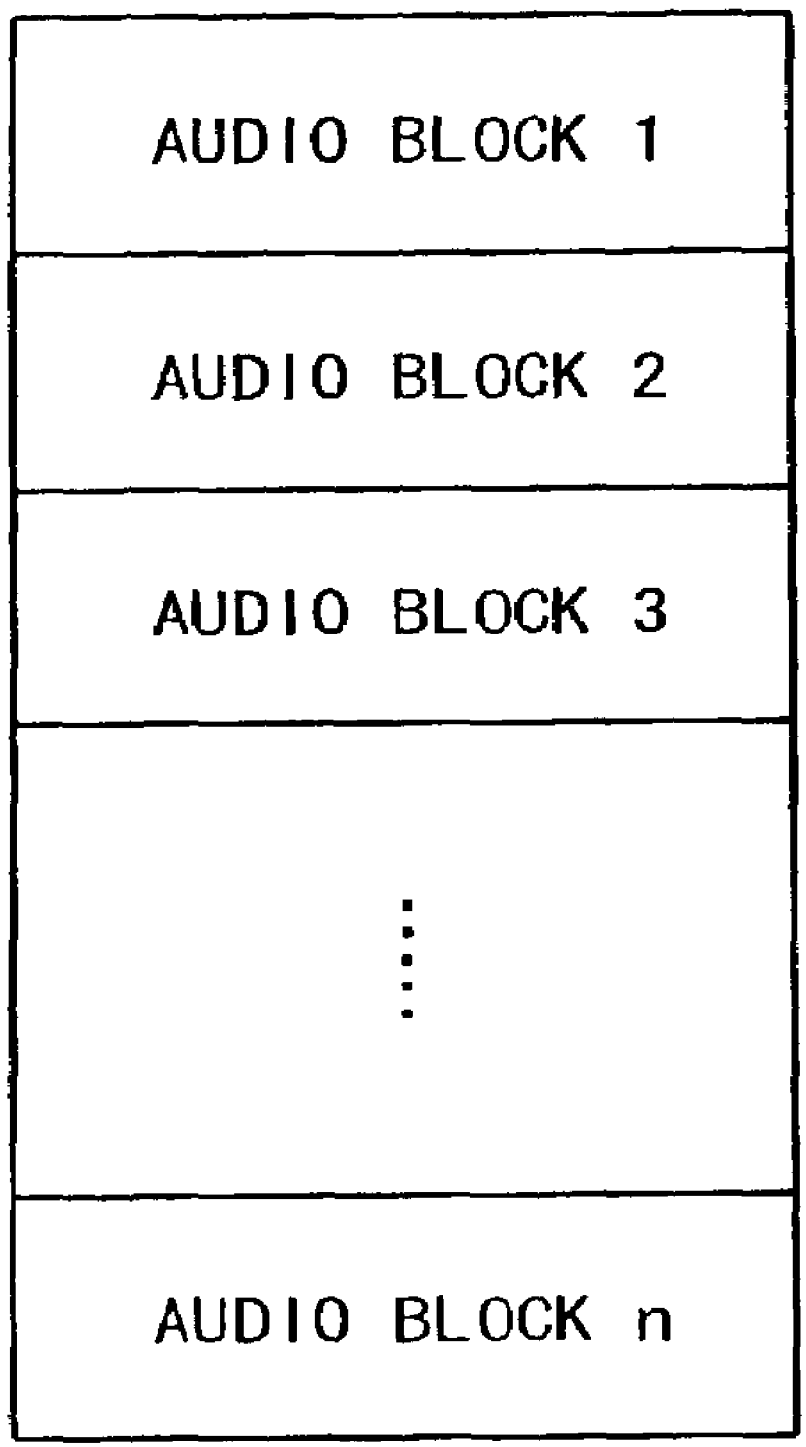
FIG. 29 an explanatory view of an audio data file for use with the first example of the audio data management system.

The audio data file is a file that accommodates a plurality of audio data items as illustrated in FIG. 29. When viewed from the FAT system, the audio data file appears to be a very large file. The inside of this file is divided into parts, so that audio data are handled as a set of such parts.

Figure 30:
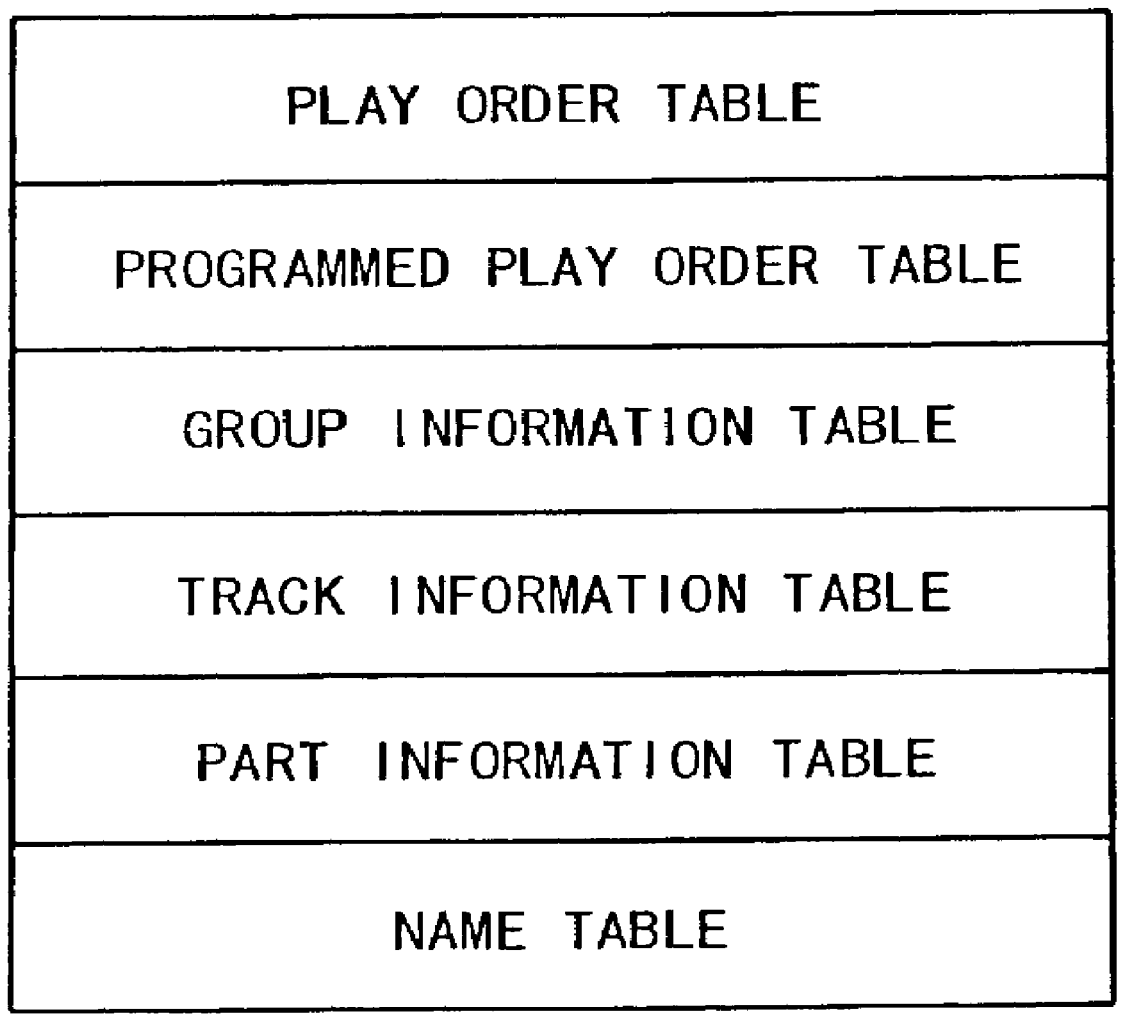
FIG. 30 is an explanatory view of a track index file for use with the first example of the audio data management system.

The track index file is a file that describes various types of information for managing the audio data contained in the audio data file. As shown in FIG. 30, the track index file is made up of a play order table, a programmed play order table, a group information table, a track information table, a part information table, and a name table.

Figure 31:
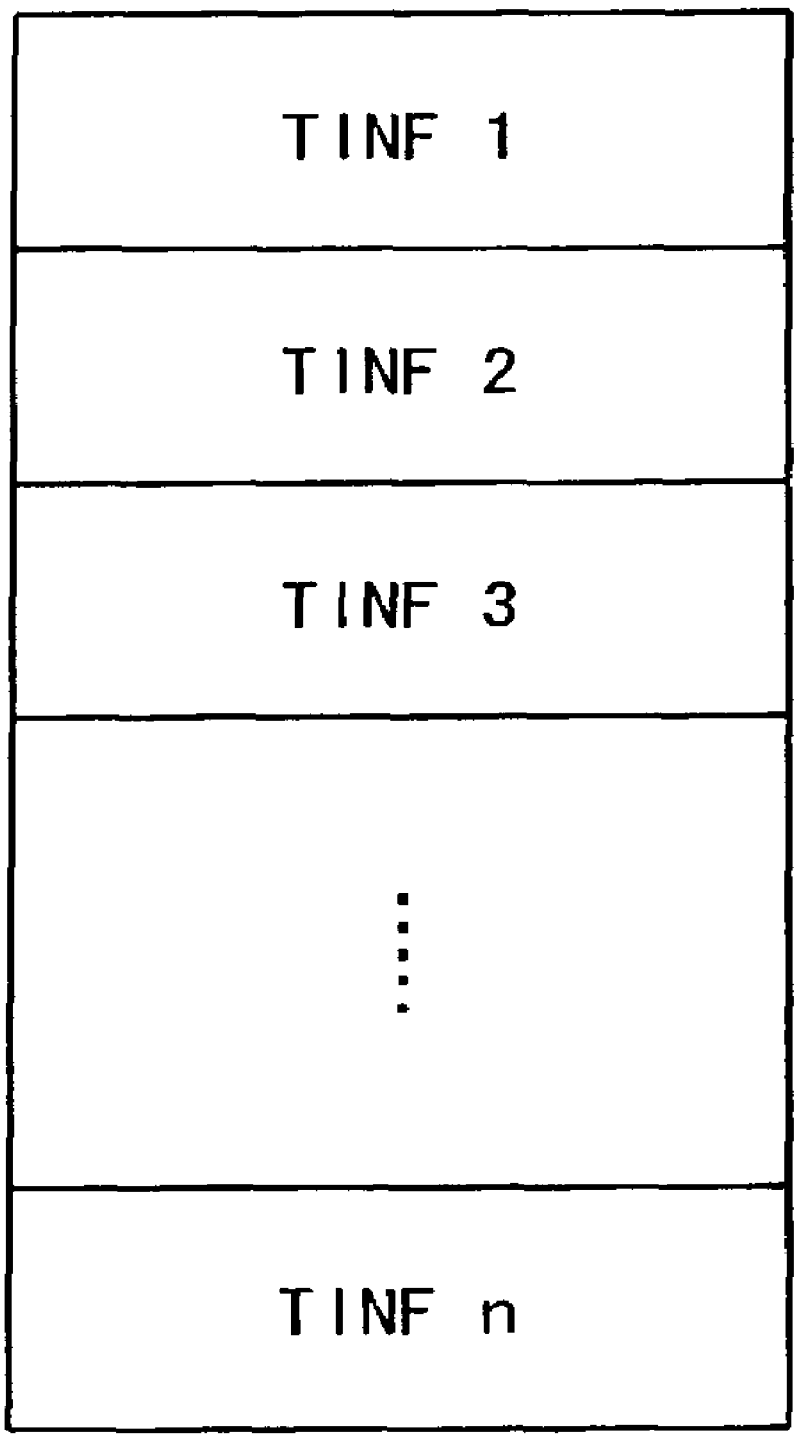
FIG. 31 is an explanatory view of a play order table for use with the first example of the audio data management system.

The play order table indicates the order of audio data reproduction defined by default. As shown in FIG. 31, the play order table contains information items TINF1, TINF2, etc., representing links to track descriptors (FIG. 34A) corresponding to track numbers (i.e., music title numbers) in the track information table. Track numbers are illustratively serial numbers starting from "1."

Figure 32:
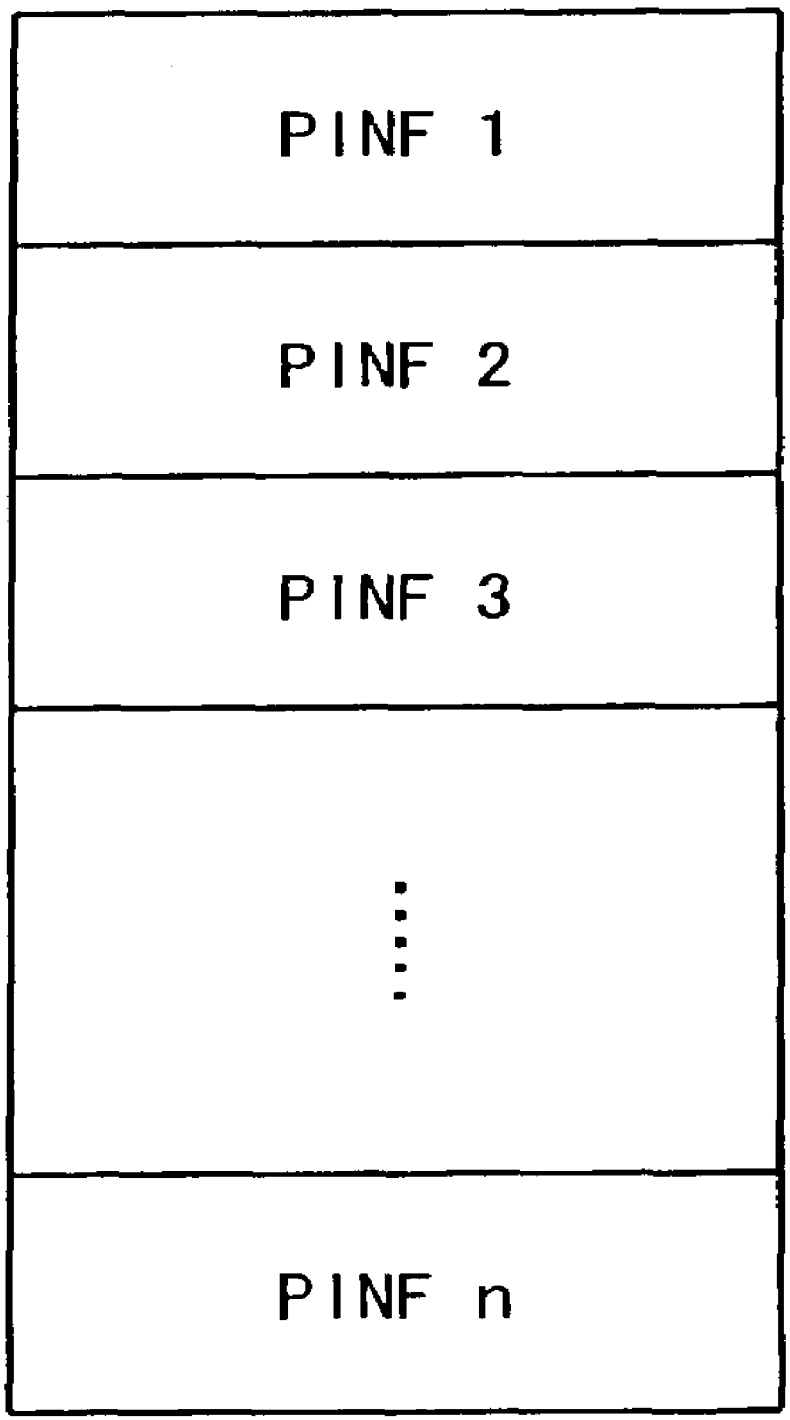
FIG. 32 is an explanatory view of a programmed play order table for use with the first example of the audio data management system.

The programmed play order table contains the order of audio data reproduction defined by the individual user. As shown in FIG. 32, the programmed play order table describes programmed track information items PINF1, PINF2, etc., representing links to the track descriptors corresponding to the track numbers.

Figures 33A, 33B:
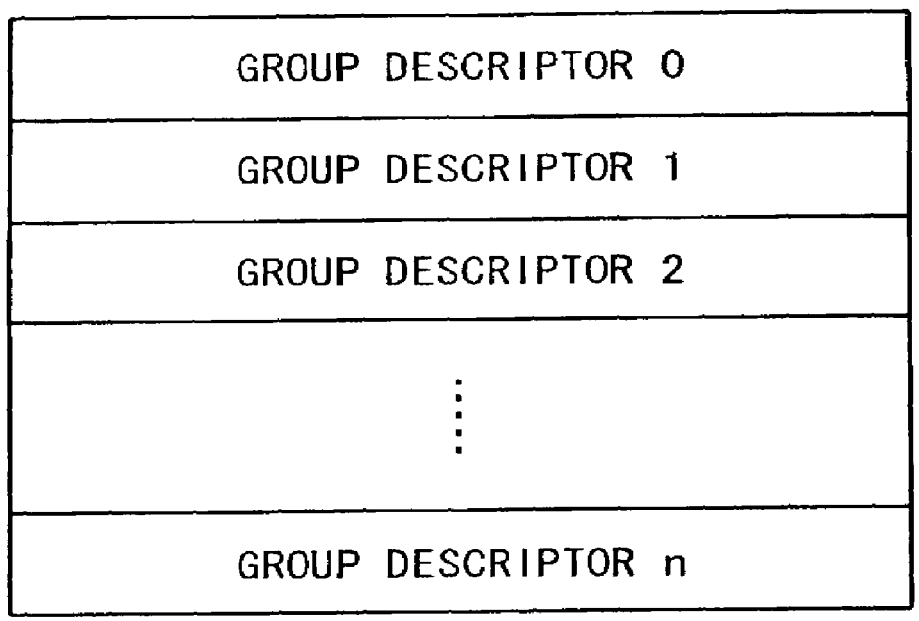
FIGS. 33A and 33B are explanatory views of a group information table for use with the first example of the audio data management system.

The group information table, as depicted in FIGS. 33A and 33B, describes information about groups. A group is defined as a set of one or more tracks having serial track numbers, or a set of one or more tracks with programmed serial track numbers. Specifically, the group information table is made of group descriptors representing track groups as shown in FIG. 33A. Each group descriptor describes a start track number, an end track number, a group name, and a flag regarding the group in question as indicated in FIG. 33B.

Figures 34A, 34B:
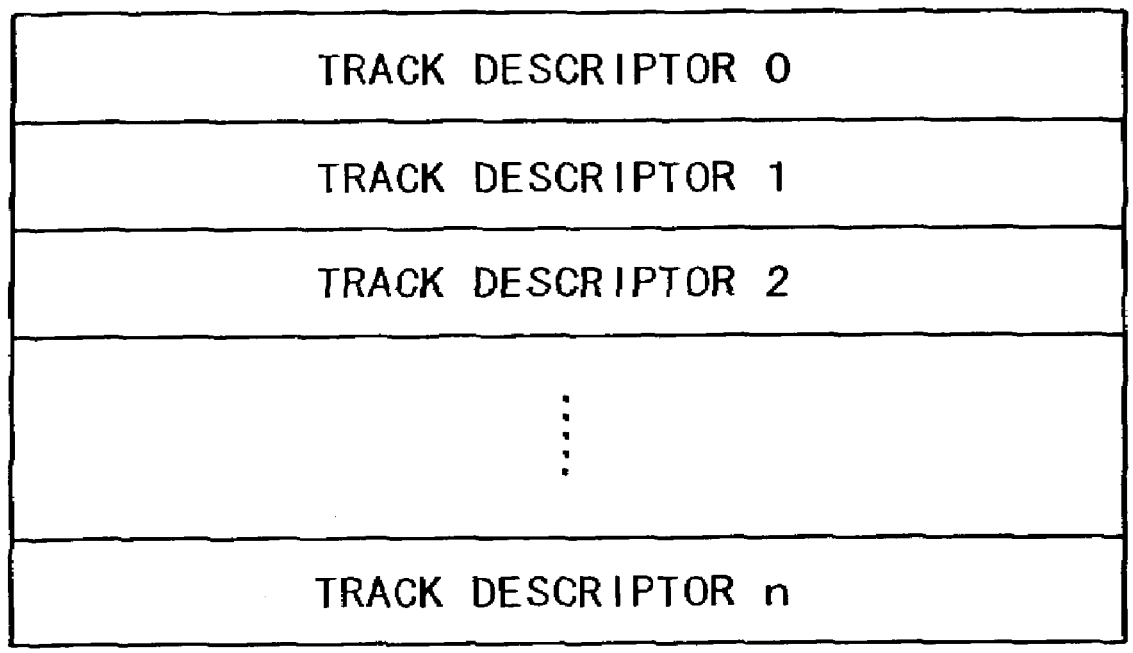
FIGS. 34A and 34B are explanatory views of a track information table for use with the first example of the audio data management system.

The track information table describes information about tracks, i.e., music titles as shown in FIGS. 34A and 34B. Specifically, the track information table is made up of track descriptors representing tracks (music titles) as indicated in FIG. 34A. Each track descriptor, as depicted in FIG. 34B, contains a coding system, copyright management information, content decryption key information, pointer information pointing to the part number serving as the entry to the music title of the track in question, an artist name, a title name, original title order information, and recording time information about the track in question. The artist name and title name do not contain actual names but describe pointer information pointing to relevant entries in the name table. The coding system represents a codec operating scheme serving as decryption information.

Figure 35A:
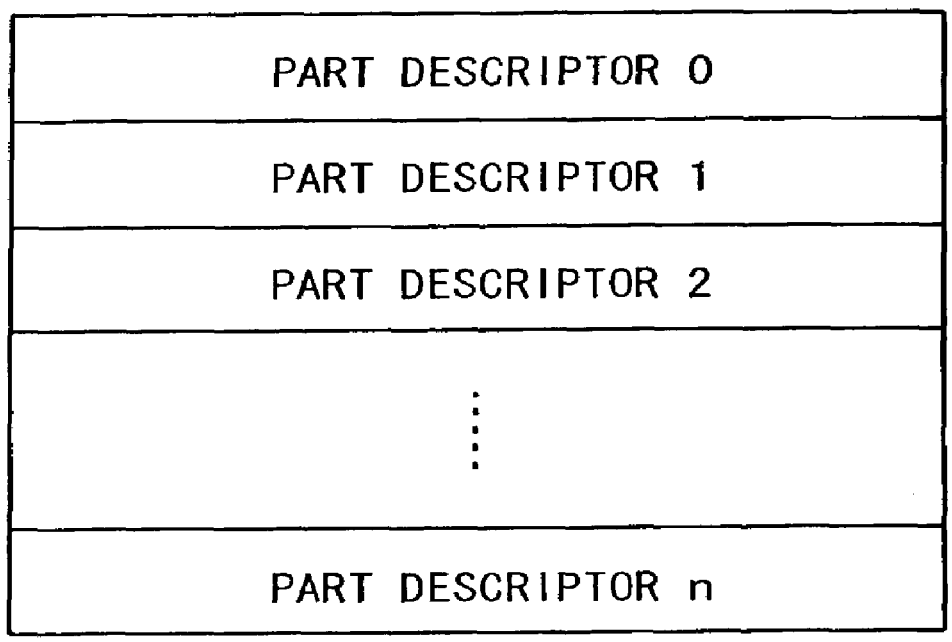
FIGS. 35A and 35B are explanatory views of a part information table for use with the first example of the audio data management system.
Figure 35B:

The part information table describes pointers allowing part numbers to point to actual music title locations as shown in FIGS. 35A and 35B. Specifically, the part information table is made up of part descriptors corresponding to parts as depicted in FIG. 35A. A part is representative of one track in its entirety or one of multiple parts constituting a single track. FIG. 35B indicates entries of a part descriptor in the part information table. As shown in FIG. 35B, each part descriptor is composed of a start address and an end address of the part in question in the audio data file, and a link to the next part.

The addresses used as part number pointer information, name table pointer information, and audio file location pointer information may each be given in the form of a file byte offset, a part descriptor number, a FAT cluster number, or a physical address of a disc utilized as a storage medium. The file byte offset is a specific implementation of an offset scheme that may be implemented according to the present invention, where the part pointer information is an offset value in predetermined units (e.g., bytes, bits, and n-bit blocks) from a beginning of the audio file.

Figure 36A:
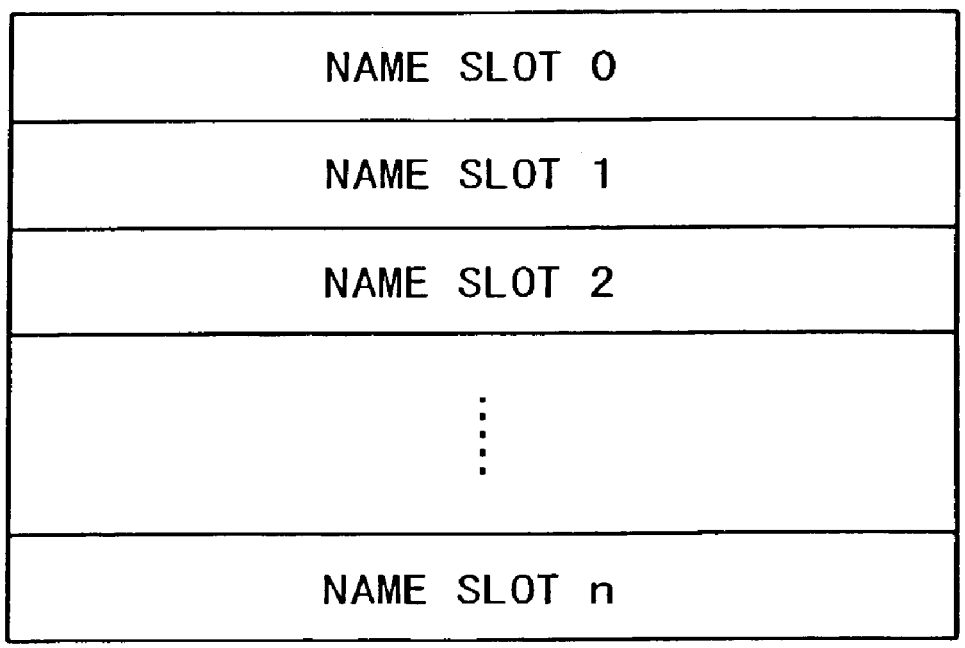
FIGS. 36A and 36B are explanatory views of a name table for use with the first example of the audio data management system.
Figure 36B:

The name table is a table of text making up actual names. As shown in FIG. 36A, the name table is made of a plurality of name slots. Each name slot is linked with and called by a pointer pointing to the name in question. A pointer for calling up a name may be an artist name or a title name in the track information table, or a group name in the group information table. One name slot may be called from a plurality of pointers. As depicted in FIG. 36B, each name slot is composed of name data constituting text information, a name type serving as an attribute of the text information, and a link to another name slot. A name too long to be accommodated in a single name slot may be divided into a plurality of name slots. The divided name slots are traced one after another using links describing the whole name.

Figure 37:
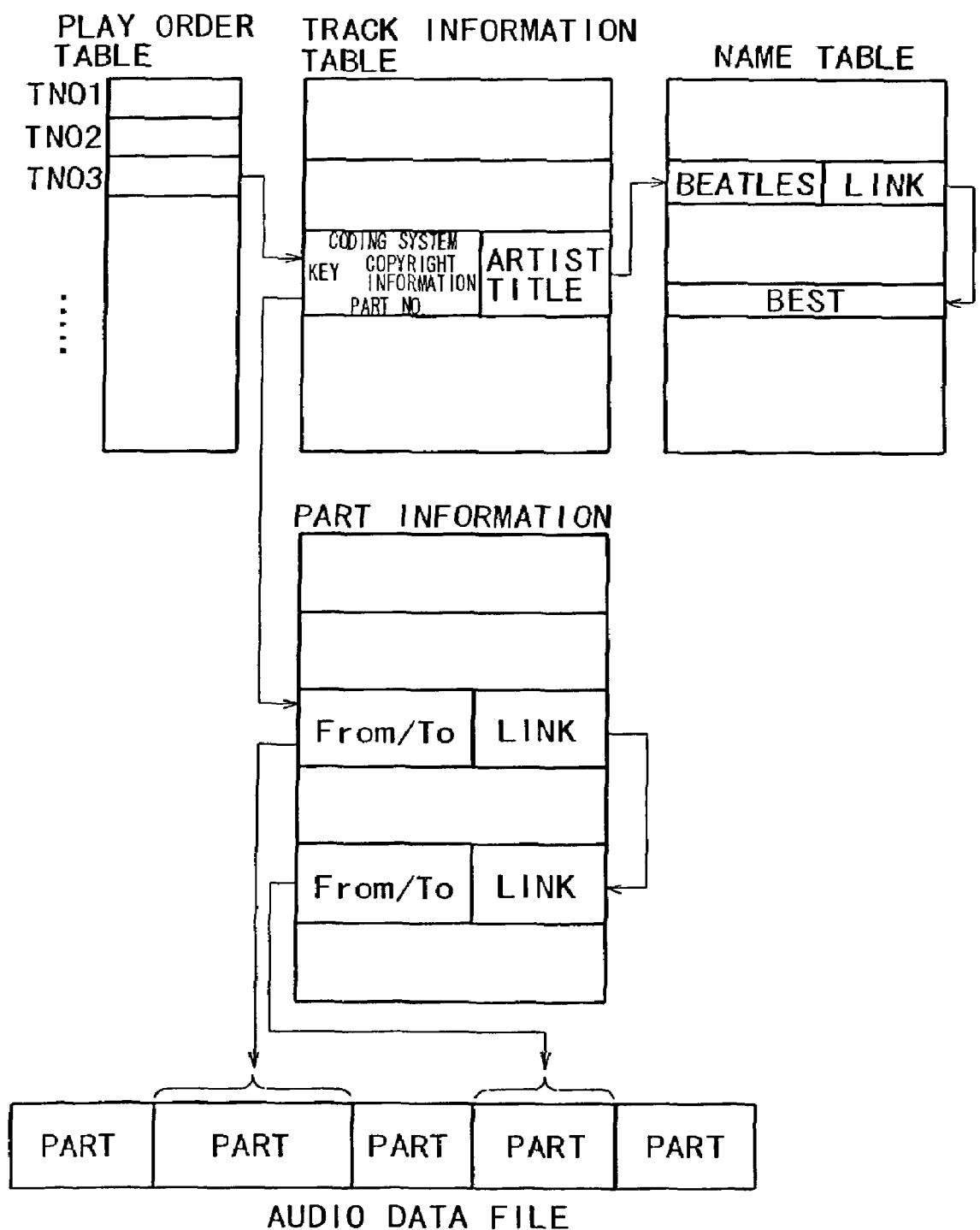
FIG. 37 is an explanatory view of typical processing performed by the first example of the audio data management system.

The first example of the audio data management system according to the invention works as follow: as illustrated in FIG. 37, the track number of a target track to be reproduced is first designated in the play order table (FIG. 31). With the track number designated, access is gained through a link to the track descriptor (FIGS. 34A and 34B) in the track information table, and the linked track descriptor is retrieved from the table. Read from the track descriptor are: a coding system, copyright management information, content decryption key information, pointer information pointing to the part number serving as the entry to the music title of the track in question, an artist name pointer, a title name pointer, original title order information, and recording time information about the track in question.

Based on the part number information read from the track information table, access is gained through a link to the applicable part descriptor in the part information table (FIGS. 35A and 35B). From the part information table, the audio data file is accessed at the part corresponding to the start address of the track (title) in question. When access is gained to the data at the part whose location in the audio data file is designated by the part information table, reproduction of audio data is started from that location. At this time, the reproduced data are decrypted in accordance with the coding system read from the applicable track descriptor in the track information table. If the audio data are encrypted, the key information read from the track descriptor is used to decrypt the data.

If there is any part following the part in question, a link to the destination part is described in the part descriptor. The relevant part descriptors are read one after another in accordance with the links, so that the audio data in the audio data file are reproduced from the parts whose locations are designated by the accessed part descriptors. These steps allow the audio data to be reproduced from the desired track (music title).

A name slot (FIG. 36A) in the name table is called from the location (or name pointer information) designated by an artist name pointer or a title name pointer read from the track information table. Name data are read from the name slot thus called. The name pointer information may be a name slot number, a cluster number in a file allocation table system, or a physical address of a storage medium, for example.

Each name slot in the name table may be referenced from a plurality of pointers as mentioned above. For example, where multiple titles of the same artist are recorded, the same name slot in the name table is referenced from a plurality of pointers in the track information table as shown in FIG. 38. In the example of FIG. 38, track descriptors "1," "2," and "4" represent the music titles all belonging to the same artist "DEF BAND," so that the same name slot is referenced from each of these track descriptors. Also in FIG. 38, track descriptors "3," "5," and "6" represent the music titles all belonging to the same artist "GHQ GIRLS," so that the same name slot is also referenced from each of these track descriptors. When each name slot in the name table is allowed to be referenced from a plurality of pointers, the size of the name table can be reduced appreciably.

Furthermore, information about a given artist name may be displayed by use of links to the name table. If it is desired to display a list of music titles belonging to, say, the artist named "DEF BAND," the track descriptors referencing the same name slot "DEF BAND" are traced and their information is displayed. In this example, the track descriptors "1," "2," and "4" referencing the address in the name slot "DEF BAND" are traced and the descriptor information is acquired. The information thus obtained permits a display of the music titles which belong to the artist named "DEF BAND" and which are held on this disc. There are no links going from the name table back to the track information table, because each name slot in the name table is allowed to be referenced from a plurality of pointers.

When audio data are to be recorded anew, an unused area made up of at least a predetermined number of consecutive recording blocks (e.g., four recording blocks) is allocated according to the FAT table. Recording blocks are allocated consecutively so as to minimize wastage in accessing the recorded audio data.

When the audio data recordable area is allocated, a new track descriptor is assigned to the track information table, and a content key for encrypting the audio data in question is generated. The input audio data are encrypted using the key before getting recorded to the unused area allocated. The area in which the audio data have been recorded is chained to the tail end of the audio data file in the FAT file system.

With the new audio data chained to the audio data file, information about the chained location is generated, and the newly generated audio data location information is written to a newly assigned part descriptor. Key information and a part number are written to the new track descriptor. If necessary, an artist name and a title name are written to relevant name slots. In the track descriptor, pointers are described with links to the artist name and title name. The number of the track descriptor in question is written to the play order table, and the applicable copyright management information is updated.

When audio data are to be reproduced from a particular track, information about the designated track number is retrieved from the play order table. The track descriptor corresponding to the track from which to reproduce the audio data is then acquired.

Key information is obtained from the applicable track descriptor in the track information table, and the part descriptor indicating the area containing entry data is acquired. From the part descriptor, access is gained to the location, in the audio data file, of the first part containing the desired audio data, and data are retrieved from the accessed location. The reproduced data from the location are decrypted using the acquired key information for audio data reproduction. If the part descriptor has a link to another part, the linked part is accessed and the above steps are repeated.

Suppose that it is desired to change a track number "n" of a given track in the play order table into a track number "n+m." In that case, a track descriptor Dn describing information about the track in question is first obtained from a track information item TINFn in the play order table. All values representing track information items TINFn+1 through TINFn+m (i.e., track descriptor numbers) are advanced by one place. The number of the track descriptor Dn is then written to the track information item TINFn+m.

Suppose now that a track with a track number "n" is desired to be erased. In this case, the track descriptor Dn describing the information about the track is acquired from the track information item TINFn in the play order table. All valid track descriptor numbers following the track information entry TINFn+1 in the play order table are advanced by one place. Moreover, because the track "n" is to be erased, all track information entries that follow track "n" are advanced in the play order by one place. Based on the track descriptor Dn thus obtained for the track to be deleted, the coding system and the decryption key corresponding to the track in question are acquired from the track information table. Also acquired is the number of a part descriptor Pn indicating the area containing the start audio data. An audio block with its range designated by the part descriptor Pn is detached from the audio data file in the FAT file system. Then the track descriptor Dn of the track in question is erased from the track information table and the part descriptor is erased from the part information table so as to free the part description on the file system.

Suppose that in FIG. 39A, parts A, B, and C have been chained and that part B is desired to be erased. It is assumed here that the parts A and B share the same audio block (and the same FAT cluster) and that the FAT chain is continuous. It is also assumed that while the part C is located immediately after the part B in the audio data file, the parts C and B are in fact found positioned apart when the FAT table is checked.

In that case, as shown in FIG. 39B, erasing the part B allows two FAT clusters not sharing any cluster with that part to be detached from the FAT chain (i.e., reverted to free areas). In other words, the audio data file is shortened by four audio blocks. As a result, a number "4" is subtracted from each of the numbers of the audio blocks recorded in the part C and subsequent parts.

Part of a track may be erased instead of the track as a whole. If a track is partially erased, information about the remaining track may be decrypted using the coding system and the decryption key which correspond to the track in question and which are acquired from the relevant part descriptor Pn in the track information table.

If it is desired to combine a track "n" with a track "n+1" in the play order table, a track descriptor number Dn is acquired from a track information item TINFn in the play order table, the track descriptor describing information about the track "n"; and a track descriptor number Dm is obtained from a track information item TINFn+1 in the play order table, the track descriptor describing information about the track "n+1." All valid TINF values (track descriptor numbers) following the item TINFn+1 in the play order table are advanced by one place. A search is made through the programmed play order table in order to erase all tracks referencing the track descriptor Dm. A new encryption key is generated, and a part descriptor list is obtained from the track descriptor Dn. To the tail end of that part descriptor list, another part descriptor list extracted from the track descriptor Dm is attached.

Where two tracks are to be combined, their track descriptors need to be compared so as to ascertain that the copyrights involved are not compromised. Part descriptors need to be obtained from these track descriptors to make sure, with reference to the FAT table, that fragmentation-related requirements are met upon combination of the two tracks. It may also be necessary to update pointers to the name table.

Where the track "n" is desired to be divided into a track "n" and a track "n+1," the track descriptor number Dn describing information about the track "n" is first acquired from the track information item TINFn in the play order table. From the track information item TINFn+1 in the play order table, the track descriptor number Dm describing information about the track "n+1" is obtained. All valid TINF values (track descriptor numbers) following the track information item TINFn+1 in the play order table are advanced by one place. A new key is generated for the track descriptor Dn. The part descriptor list is extracted from the track descriptor Dn. A new part descriptor is allocated, and the part descriptor content in effect before the track division is copied to the newly allocated part descriptor. The part descriptor containing a dividing point is shortened up to that point, and any part descriptor links subsequent to the dividing point are discarded. The newly allocated part descriptor is set immediately after the dividing point.

7. Second Example of the Audio Data Management System

Figure 40:
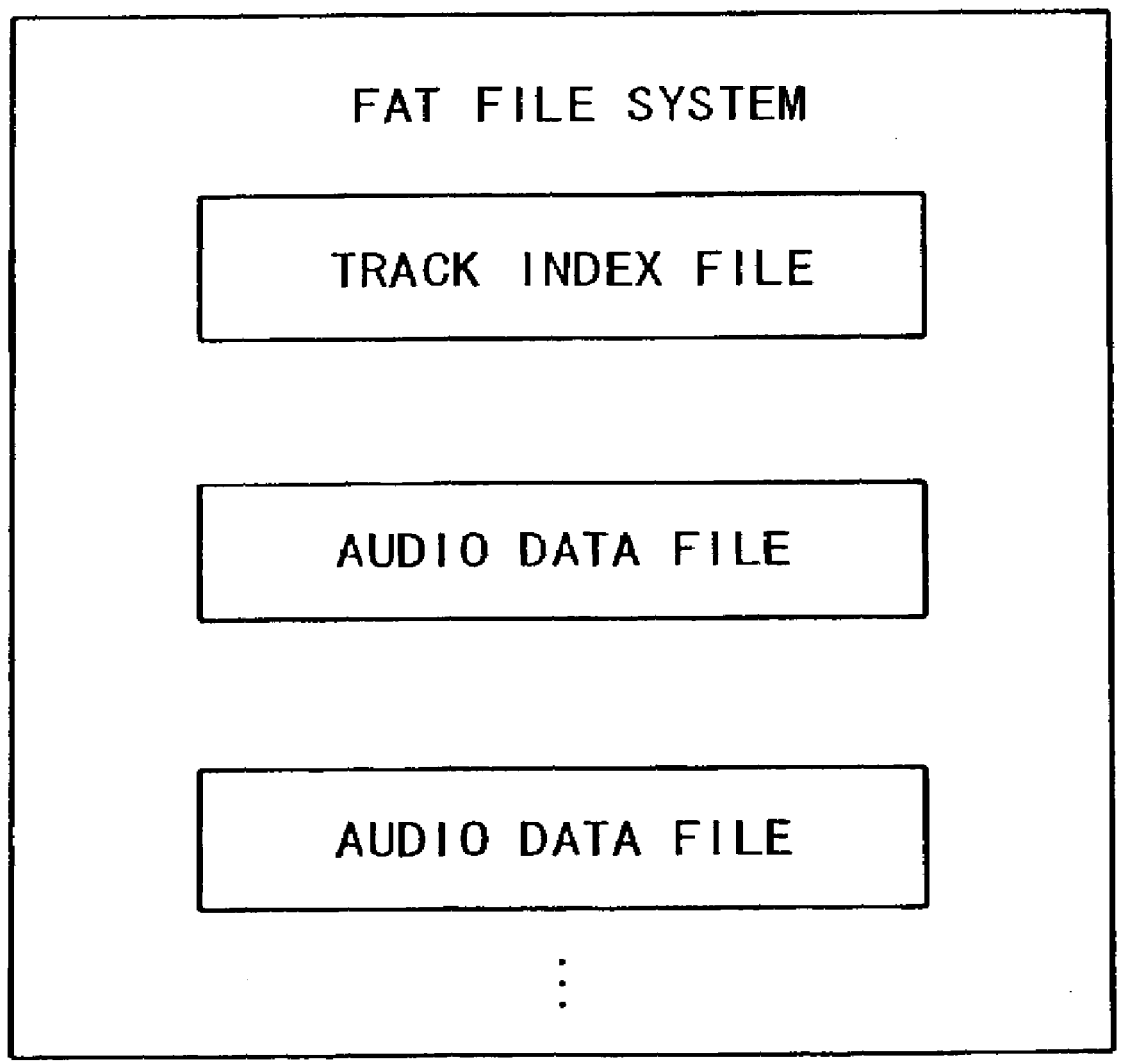
FIG. 40 is an explanatory view of a second example of the audio data management system.

A second example of the audio data management system according to the invention will now be described. FIG. 40 is an explanatory view of a second-example setup of the inventive audio data management system. As shown in FIG. 40, the audio data management system of this example involves generating a track index file and a plurality of audio data files on the disc. These files are managed by the FAT system.

Each audio data file, as shown in FIG. 41, accommodates audio data constituting a single music title (piece of music) in principle. The audio data file has a header that includes a title, decryption key information, copyright management information, and index information. Indexes are used to divide one piece of music on a single track into a plurality of tracks. The header records the locations of index-divided tracks in conjunction with index numbers. Illustratively, up to 255 indexes may be set to a track.

Figure 42:
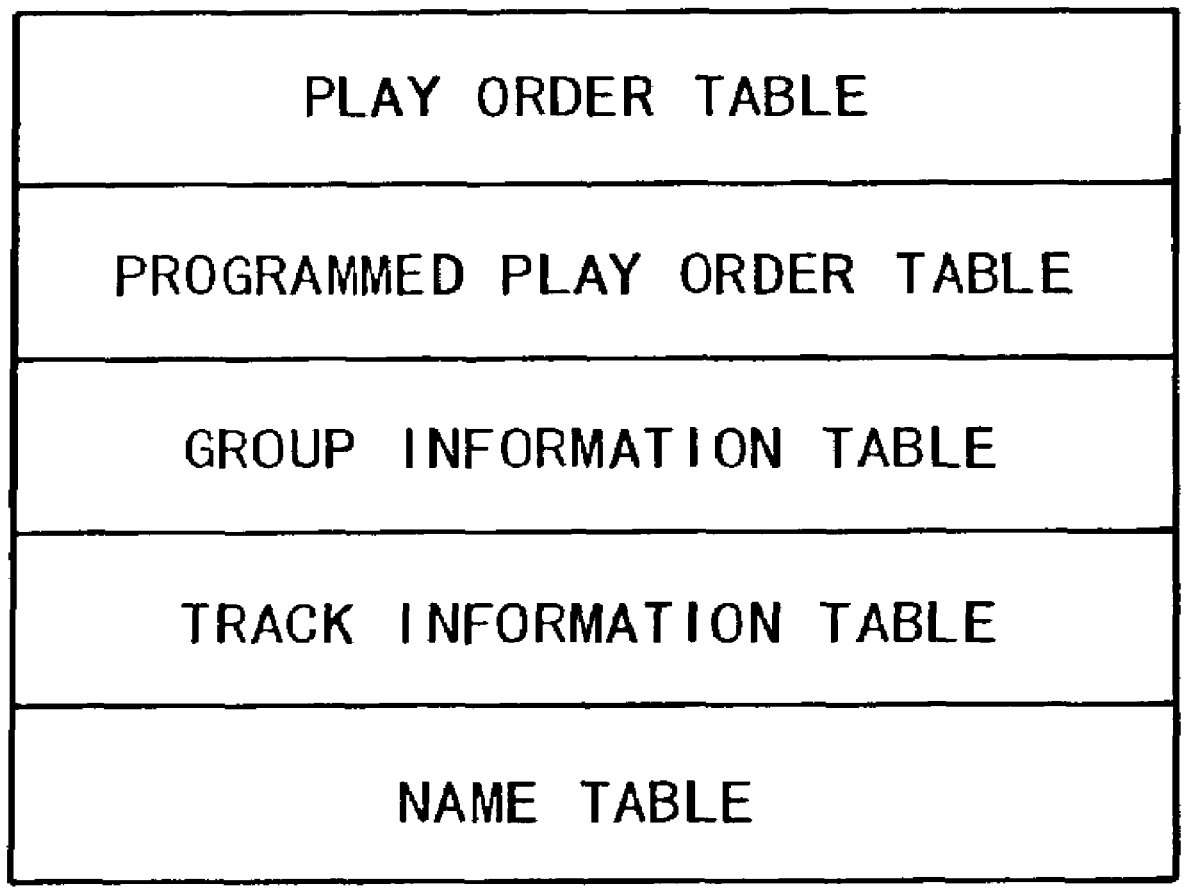
FIG. 42 is an explanatory view of a track index file for use with the second example of the audio data management system.

The track index file is a file that describes various items of information for managing the audio data retained in audio data files. As shown in FIG. 42, the track index file is made up of a play order table, a programmed play order table, a group information table, a track information table, and a name table.

Figure 43:
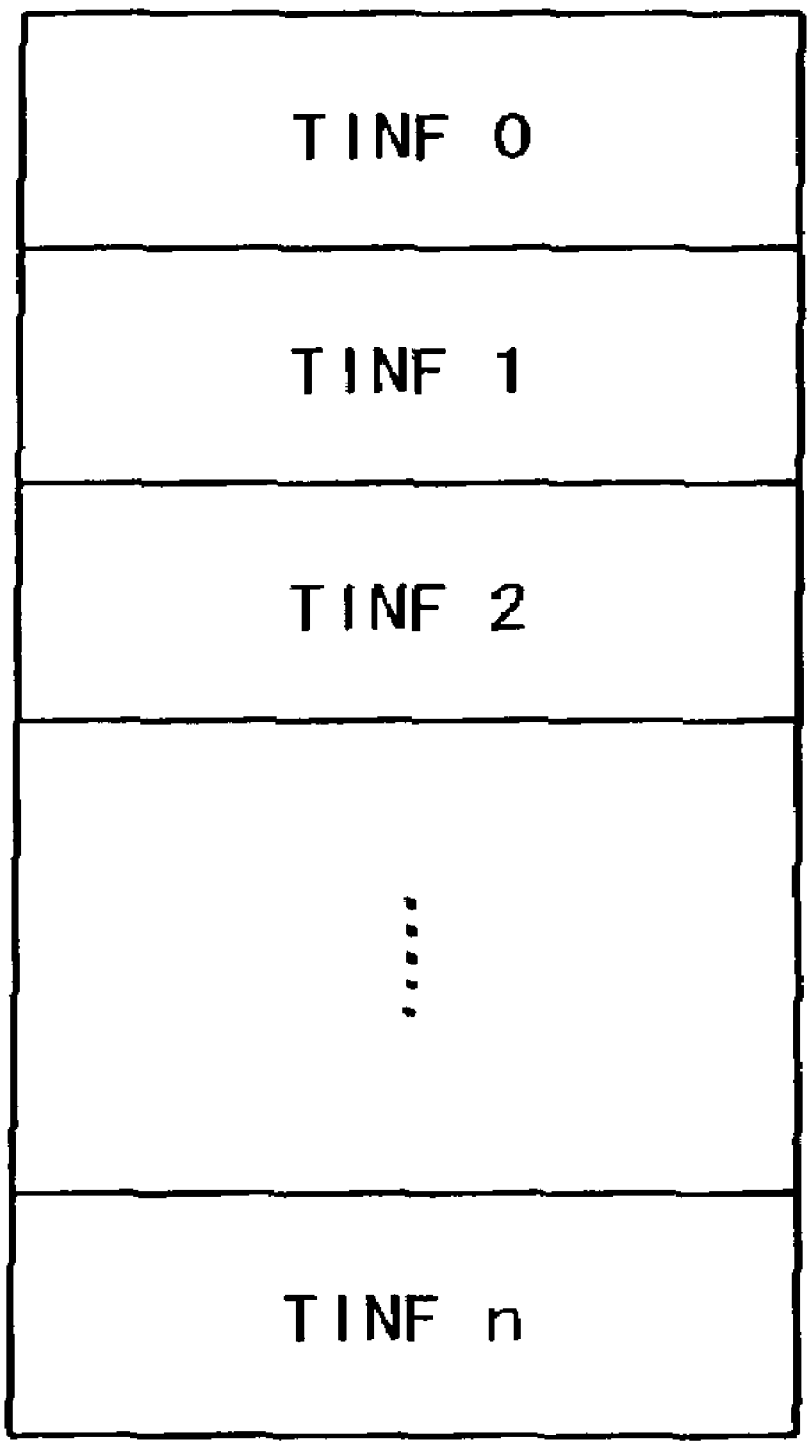
FIG. 43 is an explanatory view of a play order table for use with the second example of the audio data management system.

The play order table indicates the order of audio data reproduction defined by default. As shown in FIG. 43, the play order table contains information items TINF1, TINF2, etc., representing links to track descriptors (FIG. 46A) corresponding to track numbers (i.e., music title numbers) in the track information table. Track numbers are illustratively serial numbers starting from "1."

Figure 44:
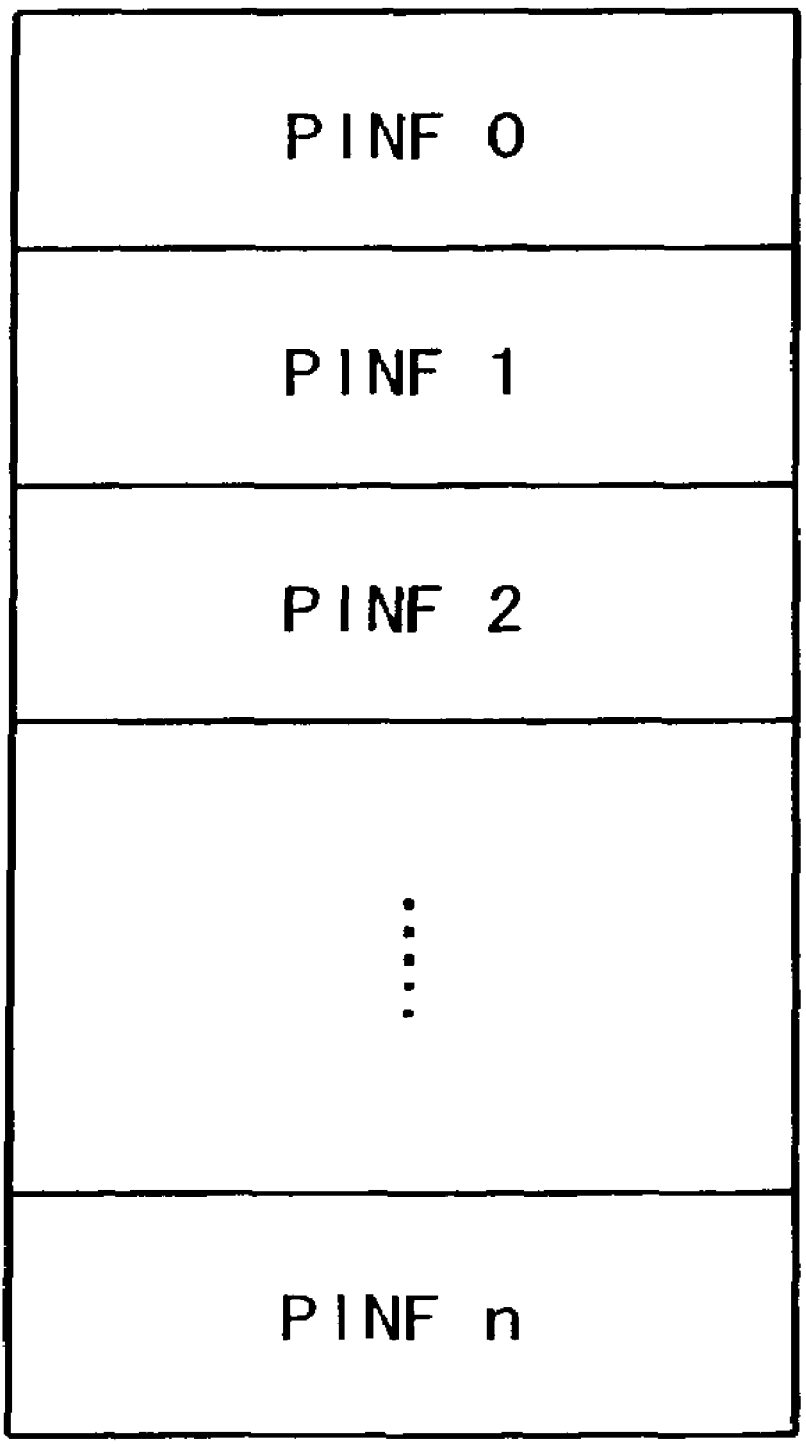
FIG. 44 is an explanatory view of a programmed play order table for use with the second example of the audio data management system.

The programmed play order table contains the order of audio data reproduction defined by the individual user. As shown in FIG. 44, the programmed play order table describes programmed track information items PINF1, PINF2, etc., representing links to the track descriptors corresponding to the track numbers.

Figure 45A:
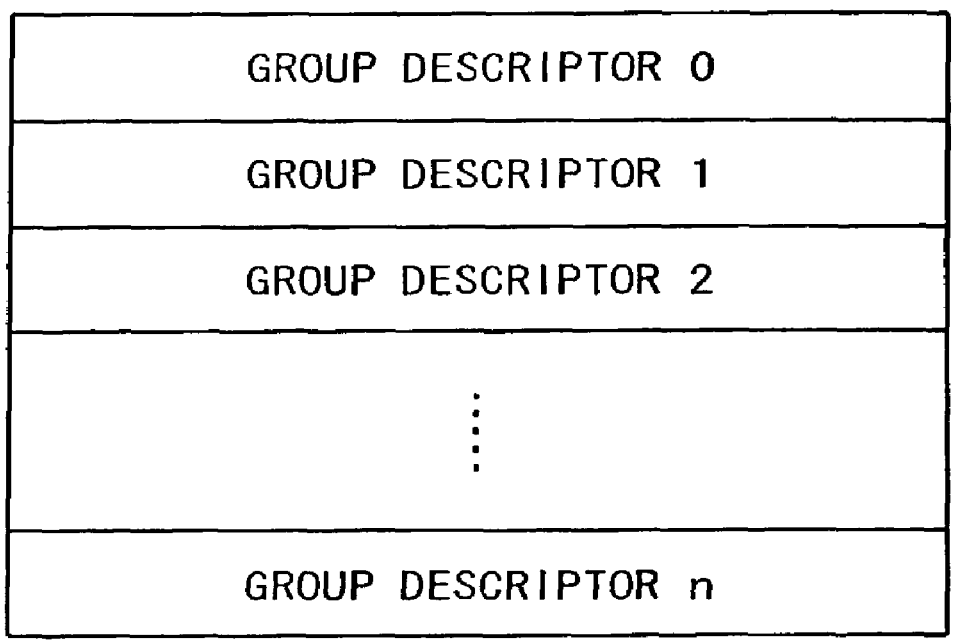
FIGS. 45A and 45B are explanatory views of a group information table for use with the second example of the audio data management system.
Figure 45B:
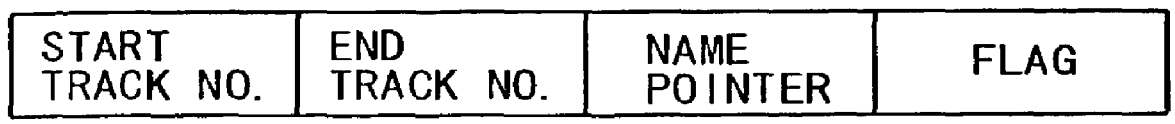

The group information table, as depicted in FIGS. 45A and 45B, describes information about groups. A group is defined as a set of one or more tracks having serial track numbers, or a set of one or more tracks with programmed serial track numbers. Specifically, the group information table is made of group descriptors representing track groups as shown in FIG. 45A. Each group descriptor describes a start track number, an end track number, a group name, and a flag regarding the group in question as indicated in FIG. 45B.

The track information table describes information about tracks, i.e., music titles as shown in FIGS. 46A and 46B. Specifically, the track information table is made up of track descriptors representing tracks (music titles) as indicated in FIG. 46A. Each track descriptor, as depicted in FIG. 46B, includes a file pointer pointing to the audio data file of the track in question, an index number of the track, an artist name, a title name, original title order information, and recording time information about the track. The artist name and title name do not contain actual names but describe pointer information pointing to relevant entries in the name table.

Figure 47A:
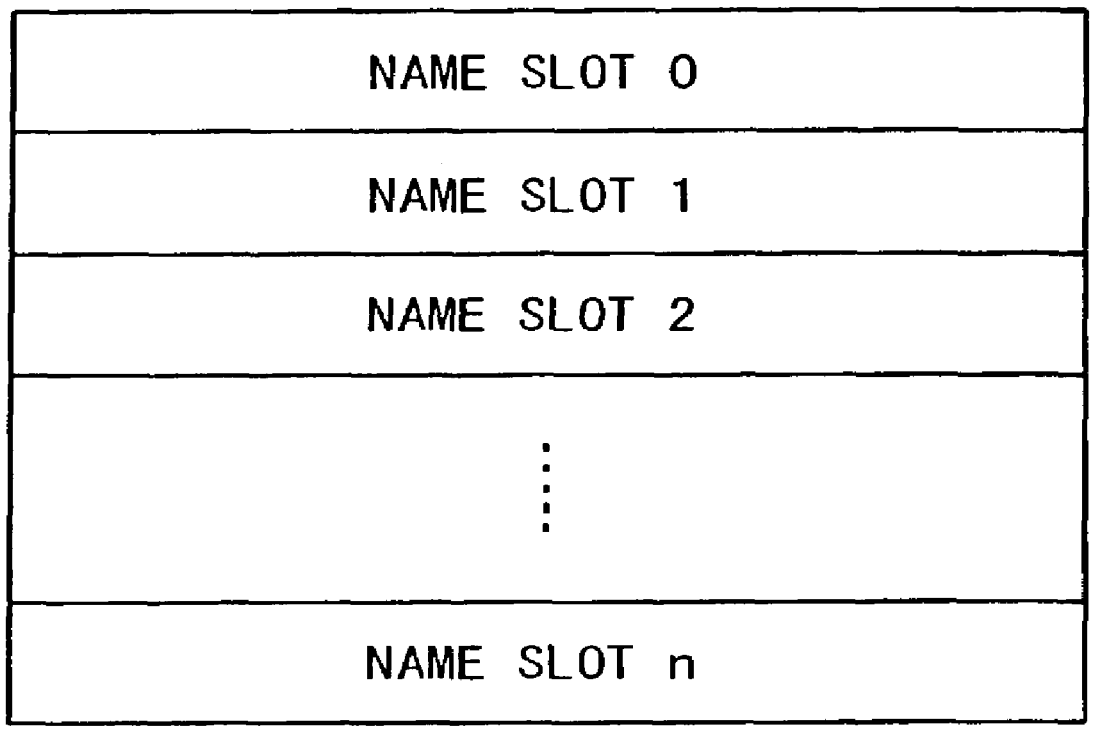
FIGS. 47A and 47B are explanatory views of a name table for use with the second example of the audio data management system.
Figure 47B:

The name table is a table of texts making up actual names. As shown in FIG. 47A, the name table is made of a plurality of name slots. Each name slot is linked with and called by a pointer pointing to the name in question. A pointer for calling up a name may be an artist name or a title name in the track information table, or a group name in the group information table. One name slot may be called from a plurality of pointers. As depicted in FIG. 47B, each name slot is composed of name data, a name type, and a link to another name slot. A name too long to be accommodated in a single name slot may be divided into a plurality of name slots. The divided name slots are traced one after another using links describing the whole name.

Figure 48:
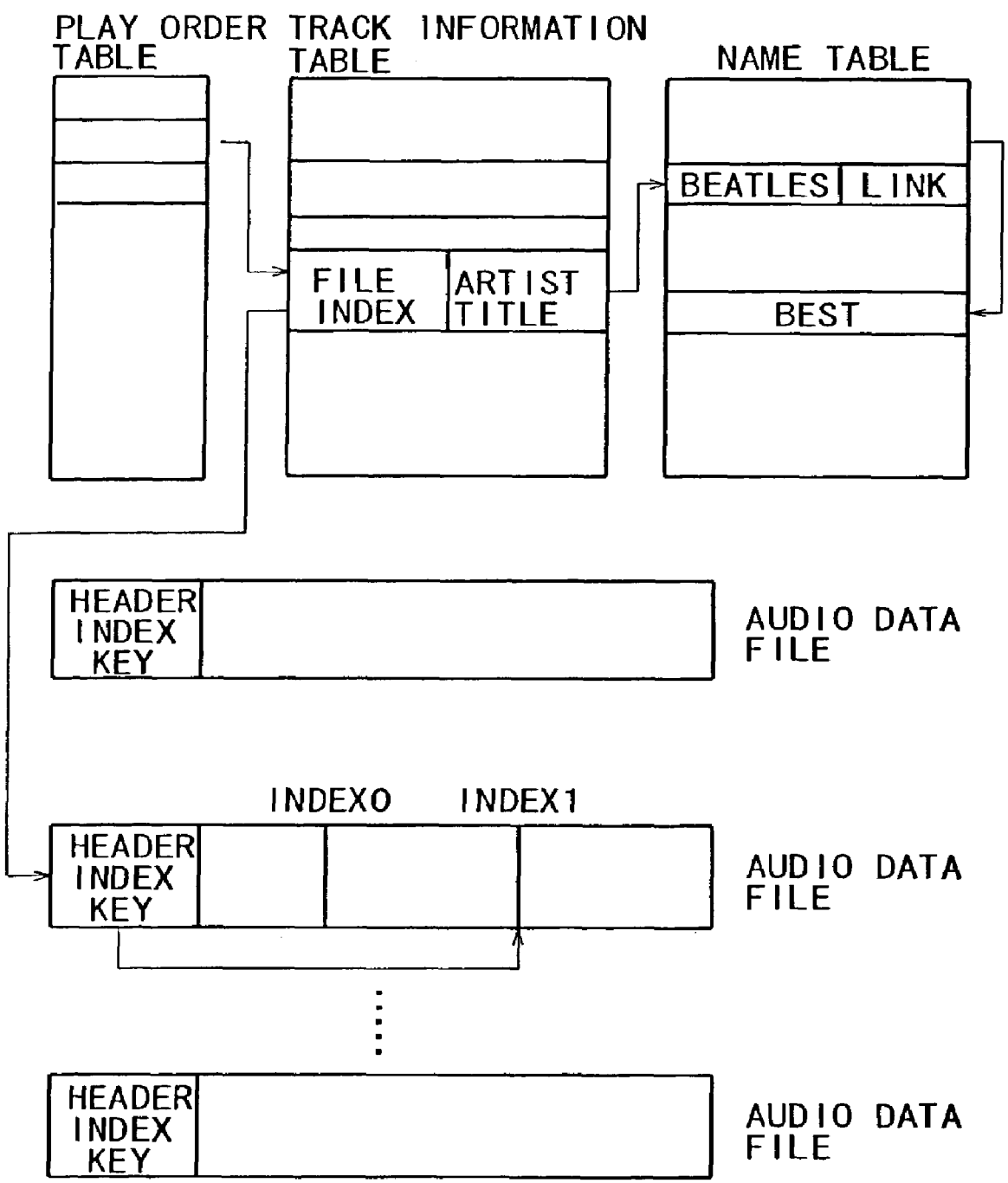
FIG. 48 is an explanatory view of typical processing performed by the second example of the audio data management system.

The second example of the audio data management system according to the invention works as follow: as illustrated in FIG. 48, the track number of a target track to be reproduced is first designated in the play order table (FIG. 43). With the track number designated, access is gained through a link to the track descriptor (FIGS. 46A and 46B) in the track information table, and the linked track descriptor is retrieved from the table. Read from the track descriptor are: a file pointer pointing to the audio data file in question, an index number of the track in question, an artist name pointer, a title name pointer, original title order information, and recording time information about the track.

Based on the audio data file pointer, the audio data file in question is accessed and information is read from the header of the file. If the audio data are encrypted, the key information read from the header is used to decrypt the data for audio data reproduction. If an index number is designated, the location of the designated index number is detected from the header information, and audio data reproduction is started from the location of that index number.

A name slot is called from the location designated by the artist name pointer or the title name pointer retrieved from the track information table. Name data are read from the name slot thus called.

When audio data are to be recorded anew, an unused area made up of at least a predetermined number of consecutive recording blocks (e.g., four recording blocks) is allocated according to the FAT table.

When the audio data recordable area is allocated, a new track descriptor is assigned to the track information table, and a content key for encrypting the audio data in question is generated. The input audio data are encrypted using the key, and an audio data file is generated with the encrypted audio data.

A file pointer of the newly generated audio data file and key information are written to the newly assigned track descriptor. If necessary, an artist name and a title name are written to relevant name slots. In the track descriptor, pointers are described with links to the artist name and title name. The number of the track descriptor in question is written to the play order table, and the applicable copyright management information is updated.

When audio data are to be reproduced from a particular track, information about the designated track number is retrieved from the play order table. The track descriptor corresponding to the track from which to reproduce the audio data is then acquired.

Based on the track descriptor in the track information table, the file pointer pointing to the audio data file containing the desired audio data and the index number of the track in question are obtained. The audio data file is then accessed and key information is acquired from the header of the file. The reproduced data from the audio data file are decrypted using the acquired key information for audio data reproduction. Where the index number is designated, audio data reproduction is started from the location of the designated index number.

Where a track "n" is desired to be divided into a track "n" and a track "n+1," a track descriptor number Dn describing information about the track "n" is first acquired from a track information item TINFn in the play order table. From a track information item TINFn+1, a track descriptor number Dm describing information about the track "n+1" is obtained. All valid TINF values (track descriptor numbers) following the track information item TINFn+1 in the play order table are advanced by one place.

Figure 49:
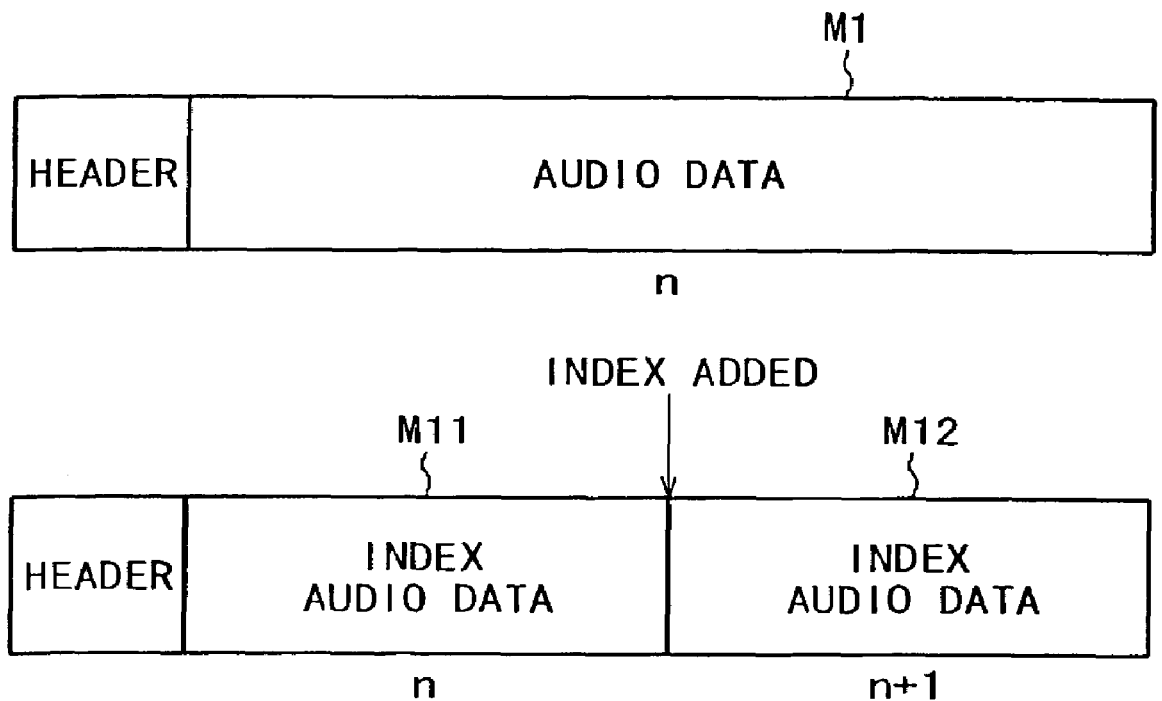
FIG. 49 is an explanatory view showing how the second example of the audio data management system divides one file data item into a plurality of indexed areas using an index scheme.

As shown in FIG. 49, using an index arrangement allows data in one file to be divided into a plurality of indexed areas. The index numbers being used and the locations of the indexed areas are written to the header of the audio track file in question. An audio data file pointer and an index number are written to one track descriptor Dn, and another audio data file pointer and another index number are written to another track descriptor Dm. In this case, one piece of music M1 on a single track in the audio data file is apparently divided into two pieces of music M11 and M12 over two tracks.

If it is desired to combine a track "n" with a track "n+1" in the play order table, a track descriptor number Dn describing information about the track "n" is acquired from a track information item TINFn in the play order table, and a track descriptor number Dm describing information about the track "n+1" is obtained from a track information item TINFn+1 in the play order table. All valid TINF values (track descriptor numbers) following the item TINFn+1 in the play order table are advanced by one place.

If the track "n" and track "n+1" are found in the same audio data file and separated from each other by an index, then erasing the index information from the header of the file allows the tracks to be combined as illustrated in FIG. 50. Two pieces of music M21 and M22 on the two tracks are thus combined into a single piece of music M23 on one track.

Figure 51:
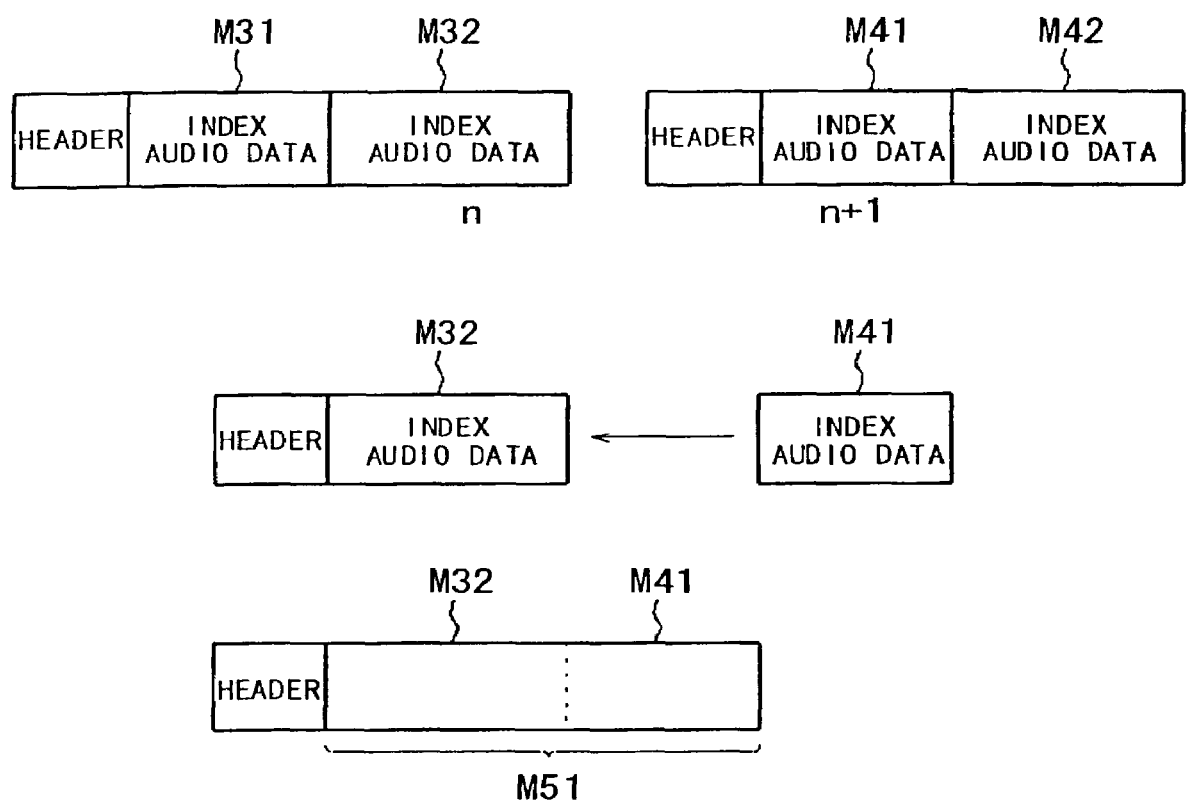
FIG. 51 is an explanatory view indicating how the second example of the audio data management system connects tracks using another scheme.

Suppose that the track "n" is the index-divided latter half of an audio data file and that the track "n+1" is found at the beginning of another audio data file. In that case, as shown in FIG. 51, a header is attached to the data over the index-divided track "n" to create an audio data file accommodating a piece of music M32. The header is then erased from the audio data file of the track "n+1" carrying another piece of music M41, and the audio data of the track "n+1" with the music title M41 is connected to the audio data file of the music title M32. The two pieces of music M32 and M41 are thus combined into a single piece of music M51 on one track.

The processes above are implemented by two functions. One function involves adding a header to each of index-divided tracks, encrypting track data using a different encryption key for each track, and transforming indexed audio data into a single audio data file. The other function involves erasing header information from a given audio data file and connecting the data in that file to another audio data file.

8. Operation During Connection With the Personal Computer

The next-generation MD1 and MD2 systems adopt the FAT system as their data management system in order to secure compatibility with personal computers. It follows that next-generation MD1 and MD2 discs are used to record and reproduce not only audio data but also general data handled by personal computers.

On the disc drive unit 1, audio data are reproduced as they are being read from the disc 90. When the ability of the portable-type disc drive unit 1 to access data is taken into account, audio data should preferably be recorded sequentially on the disc. By contrast, the personal computer has no consideration for such data continuity when writing data to the disc; the PC records data to any free areas found available on the disc.

The recording/reproducing apparatus of the invention has the personal computer 100 connected to the disc drive unit 1 through the USB hub 7 so that the personal computer 100 may write data to the disc 90 loaded in the disc drive unit 1. In that setup, general data are written under control of the file system of the personal computer 100, while audio data are written under control of the file system of the disc drive unit 1.

Figure 52A:
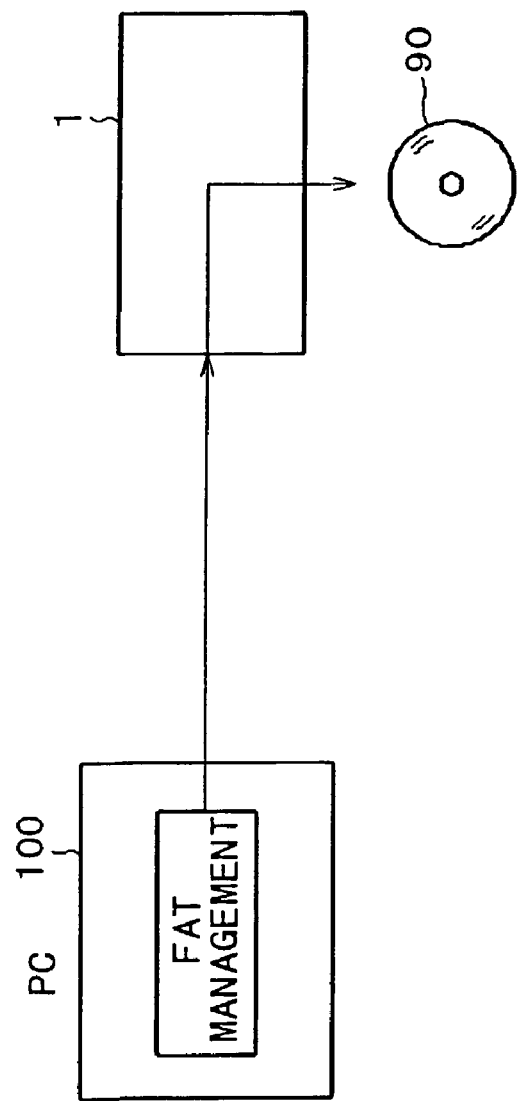
FIGS. 52A and 52B are explanatory views sketching how management authority is moved between a personal computer and a disc drive unit connected therewith depending on the type of data to be written to a disc loaded in the drive unit.
Figure 52B:
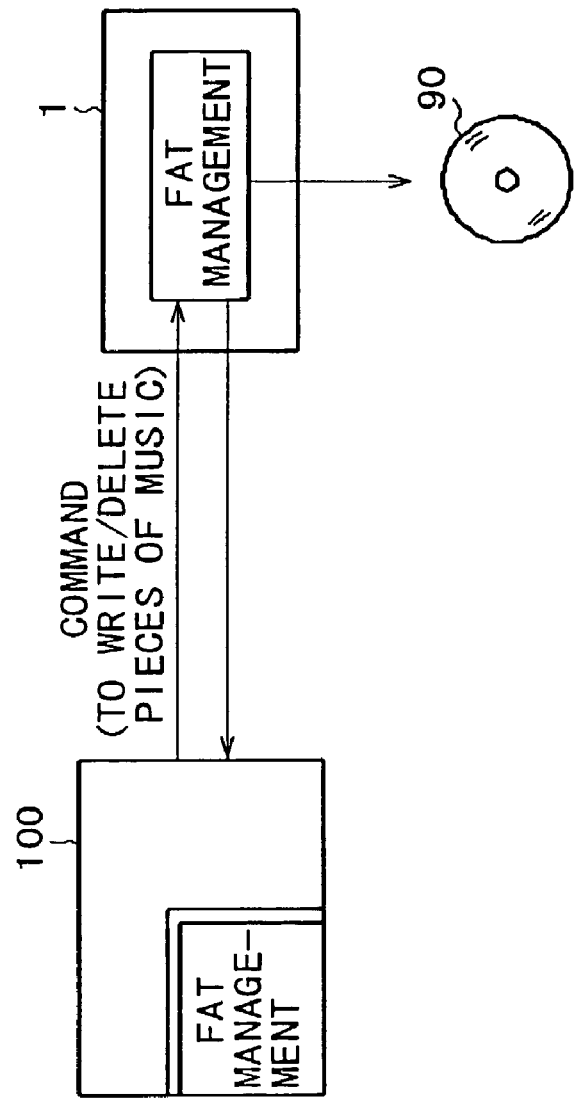

FIGS. 52A and 52B are explanatory views sketching how management authority is moved between the personal computer 100 and the disc drive unit 1 connected therewith through the USB hub 7, not shown, depending on the type of data to be written to the disc loaded in the drive unit 1. FIG. 52A shows how general data are transferred from the personal computer 100 to the disc drive unit 1 for recording onto the disc 90 in the drive unit 1. In this case, the file system on the part of the personal computer 100 provides FAT management over the disc 900.

It is assumed that the disc 90 has been formatted by either the next-generation MD1 system or the next-generation MD2 system.

Viewed from the personal computer 100, the connected disc drive unit 1 functions apparently as a removable disc under PC control. The personal computer 100 can then write and read data to and from the disc 90 in the disc drive unit 1 in the same manner that the PC writes and reads data to and from a flexible disc.

The file system of the personal computer 100 may be furnished as part of the capabilities of an OS (Operating System) carried by the PC 100. As is well known, the OS may be recorded as suitable program files on a hard disc drive incorporated in the personal computer 100. Upon start-up, the program files are read and executed by the personal computer 100 to implement the OS capabilities.

FIG. 52B shows how audio data are transferred from the personal computer 100 to the disc drive unit 1 for recording onto the disc 90 loaded in the drive unit 1. The audio data are retrieved illustratively from the hard disc drive (HDD) held by the personal computer 100.

It is assumed that the personal computer 100 carries utility software for submitting audio data to ATRAC compression encoding and for requiring the disc drive unit 1 to write or erase audio data to or from the disc 90 loaded in the unit 1. The utility software is also assumed to be capable of referencing a track index file on the disc 90 in the disc drive unit 1 in order to look up track information recorded on the disc 90. This utility software is held illustratively as program files on the HDD of the personal computer 100.

Described below is how audio data recorded on a storage medium of the personal computer 100 are typically transferred and recorded to the disc 90 loaded in the disc drive unit 1. It is assumed that the utility software mentioned above is booted in advance.

The user first performs an operation on the personal computer 100 causing it to write desired audio data (called the audio data A hereunder) from its HDD to the disc 90 loaded in the disc drive unit 1. The operation triggers the utility software to issue a write request command requesting a write operation of the audio data A onto the disc 90. The write request command is sent from the personal computer 100 to the disc drive unit 1.

The audio data A are then read from the HDD of the personal computer 100. The retrieved audio data A are subjected to an ATRAC compression encoding process by the utility software carried by the personal computer 100. The process turns the audio data A into ATRAC-compressed data that are transferred from the personal computer 100 to the disc drive unit 1.

Upon receipt of the write request command from the personal computer 100, the disc drive unit 1 starts receiving the ATRAC-compressed audio data A being transferred from the personal computer 100. The disc drive unit 1 recognizes the command as a directive for writing the transferred data to the disc 90 as audio data.

More specifically, the disc drive unit 1 receives the audio data A from the personal computer 100 through the USB hub 7. The received data are forwarded to the media drive unit 2 via the USB interface 6 and memory transfer controller 3. With the audio data A fed to the media drive unit 2, the system controller 9 causes the media drive unit 2 to write the audio data A to the disc 90 under control of the FAT-based management scheme of the disc drive unit 1. That is, the audio data A are written to the disc 90 consecutively in increments of four recording blocks (64 kilobytes×4) based on the FAT system of the disc drive unit 1.

Until the data write operation on the disc 90 is complete, there occur exchanges of data, status information, and commands between the personal computer 100 and the disc drive unit 1 in keeping with a suitable protocol. The exchanges are performed to control the data transfer rate in such a manner that neither overflow nor underflow will occur in the cluster buffer 4.

In addition to the write request command mentioned above, an erase request command may be utilized by the personal computer 100. The erase request command is used to request the disc drive unit 1 to erase audio data from the disc 90 loaded in the unit 1.

For example, when the personal computer 100 is connected to the disc drive unit 1 and the disc 90 is loaded in the unit 1, the utility software reads the track index file from the disc 90. The retrieved data are transferred from the disc drive unit 1 to the personal computer 100. Based on the received data, the personal computer 100 may illustratively display a title list of the audio data held on the disc 90.

Suppose that the user at the personal computer 100 views the displayed title list and performs an operation to erase certain audio data (called the audio data B hereunder). In that case, information designating the audio data B to be erased is transmitted to the disc drive unit 1 together with an erase request command. Given the erase request command, the disc drive unit 1 under its own control erases the audio data B from the disc 90 as requested.

Because audio data erasure is executed by the disc drive unit 1 under control of its own FAT system, it is possible to erase audio data from, say, a huge file combining a plurality of audio data files as explained above with reference to FIGS. 39A and 39B.

9. Restrictions on Copying of Audio Data From the Disc

Protecting the copyrights of audio data recorded on the disc 90 requires establishing appropriate restrictions on their copying to other storage media. Consider a case in which audio data held on the disc 90 are transferred from the disc drive unit 1 to the personal computer 100 for recording illustratively onto the HDD in the PC.

It is assumed here that the disc 90 has been formatted by either the next-generation MD1 system or the next-generation MD2 system. It is also assumed that the operations such as check-in and check-out, to be discussed below, are performed under control of the above-mentioned utility software carried by the personal computer 100.

Figure 53A:
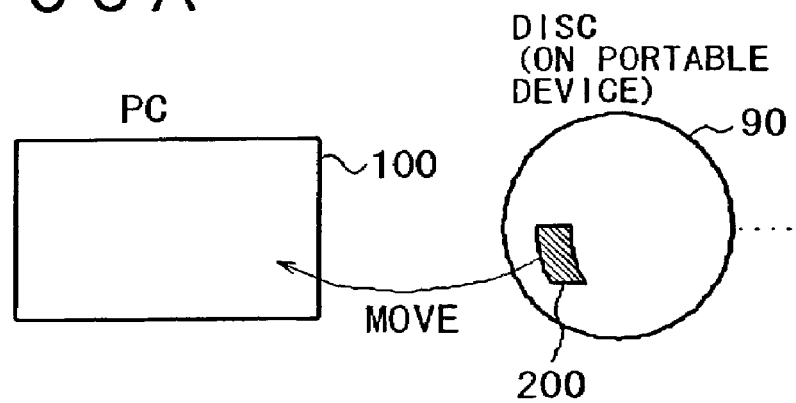
FIGS. 53A, 53B, and 53C are explanatory views illustrating an audio data check-out procedure.

Audio data 200 retained on the disc 90 are first moved to the personal computer 100 as shown in FIG. 53A. The "move" operation represents a series of actions including the copying of the target audio data 200 to the personal computer 100 and erasure of the audio data in question from the original storage medium (i.e., disc 90). That is, the move operation involves deleting the target data from their source location and moving the data to their new destination.

A check-out is defined here as the operation of copying data from one storage medium to another, with a rightful copy count (i.e., the number of times source data are allowed to be copied legitimately) decremented by one for the data in question. A check-in is defined as the operation of erasing checked-out data from the checkout destination, with the rightful copy count for the checked-out original data incremented by one.

Figure 53B:
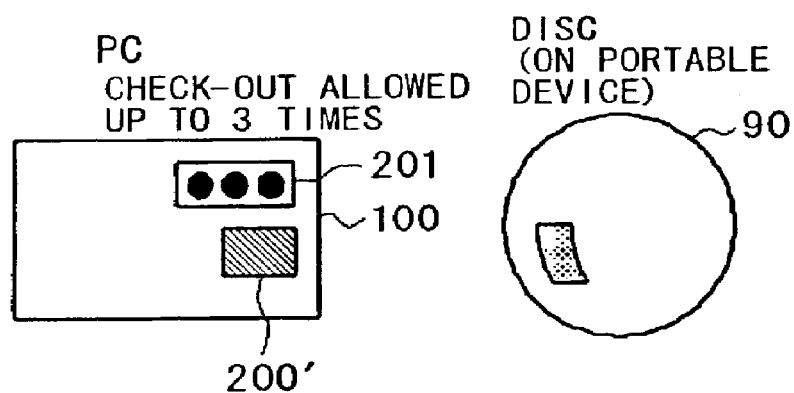

When the audio data 200 are moved to the personal computer 100, the data are sent (as audio data 200') to the storage medium such as the HDD of the personal computer 100 for recording thereto, and the audio data 200 are erased from the disc 90. The personal computer 100 then sets an allowable (or some predetermined) checkout (CO) count 201 for the moved audio data 200' as shown in FIG. 53B. In this example, the allowable check-out count is set for "3" as indicated by three filled-in circles in the figure. The audio data 200' are allowed to be checked out from the personal computer 100 to an external storage medium as many times as the allowable check-out count thus established.

If the checked-out audio data 200 remained erased from the original disc 90, it would be inconvenient for the user. The possible inconvenience is redressed when the audio data 200' checked out to the personal computer 100 are written back to the disc 90.

Figure 53C:
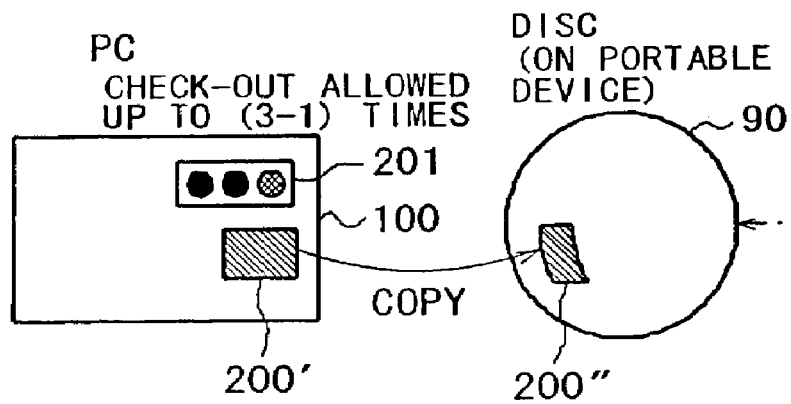

When the audio data 200' are written back to the original disc 90 from the personal computer 100, the allowable check-out count is decremented by one (3−1=2) as shown in FIG. 53C. At this point, the audio data 200' held in the personal computer 100 can still be checked out rightfully twice and thus will not be erased from the PC 100. As a result, the audio data 200' are copied from the personal computer 100 to the disc 90 and held there as audio data 200".

The allowable check-out count 201 is managed by use of the copyright management information contained in the track descriptors in the track information table (see FIG. 34B). Because each track is assigned its own track descriptor, the allowable check-out count can be set for each track (each piece of audio data). A track descriptor copied from the disc 90 to the personal computer 100 is used as control information for managing the corresponding audio data moved into the PC 100.

Illustratively, when any audio data are moved from the disc 90 to the personal computer 100, the track descriptor corresponding to the moved audio data is copied to the PC 100. The personal computer 100 utilizes the copied track descriptor in managing the audio data moved from the disc 90. When the moved audio data are recorded to, say, the HDD of the personal computer 100, a predetermined allowable check-out count 201 ("3" in this example) is set to the copyright management information in the track descriptor.

In addition to the allowable check-out count, the copyright management information includes an equipment ID for identifying the check-out source device and a content ID for identifying the checked-out content (i.e., audio data). In the setup of FIG. 53C, the equipment ID of the copy destination device is verified based on the equipment ID in the copyright management information corresponding to the audio data to be copied. If the equipment ID in the copyright management information does not match the equipment ID of the copy destination device, copying is not permitted.

In the check-out processes of FIGS. 53A through 53C, the audio data held on the disc 90 are moved to the personal computer 100 and then written back to the disc 90. The procedure appears complicated from the user's viewpoint and could be perceived as a waste of time because of the times involved in reading the audio data from the disc 90 and writing the same data back to the disc 90. Furthermore, the user would find it aberrant for the audio data to be erased, even temporarily, from the disc 90.

Such awkwardness is avoided by skipping some of the above steps upon a check-out of audio data from the disc 90, so that the outcome in FIG. 53C is reached in more simplified fashion. Explained below is one such simplified procedure executed in response to a single command from the user, such as "Check out audio data named XX from the disc 90."

(1) The target audio data are copied from the disc 90 to the HDD of the personal computer 100, and the audio data recorded on the disc 90 are erased by disabling part of the management data about the audio data in question. For example, a link information item TINFn linked to the track descriptor corresponding to the audio data is erased from the play order table, and a link information item PINFn linked to the track descriptor corresponding to the audio data is deleted from the programmed file order table. Alternatively, the track descriptors themselves corresponding to the audio data in question may be erased. This step renders the audio data unusable of the disc 90, after moving the data from the disc 90 to the personal computer 100.

(2) When the audio data are copied to the personal computer 100 in step (1) above, the track descriptors corresponding to the audio data are also copied to the HDD of the PC 100.

(3) The personal computer 100 records a predetermined allowable check-out count (e.g., three times) to the copyright management information in the track descriptors corresponding to the audio data copied (i.e., moved) from the disc 90.

(4) Based on the track descriptors copied from the disc 90, the personal computer 100 acquires a content ID corresponding to the moved audio data. This content ID is recorded as indicative of the audio data that may be checked in subsequently.

(5) The personal computer 100 then decrements by one the allowable check-out count recorded in step (3) above to the copyright management information in the track descriptors corresponding to the moved audio data. In this example, the allowable check-out count is now reduced to "2" (=3−1).

(6) On the disc drive unit 1, not shown, in which the disc 90 is loaded, the track descriptors corresponding to the moved audio data are enabled. This is accomplished illustratively by restoring or reconstituting the link information items TINFn and PINFn erased in step (1) above. Where the track descriptors themselves corresponding to the audio data were erased earlier, these track descriptors are reconstituted. Alternatively, the corresponding track descriptors may be transferred from the personal computer 100 to the disc drive unit 1 for recording onto the disc 90.

Carrying out steps (1) through (6) above completes the entire check-out procedure. The steps permit copying of desired audio data from the disc 90 to the personal computer 100 while sparing the user redundant chores and ensuring copyright protection for the audio data in question.

The audio data copying steps (1) through (6) above are applied preferably to the audio data that were recorded onto the disc 90 by the user operating the disc drive unit 1.

Checked-out audio data are checked in as follows: the personal computer 100 first searches for the desired data from among the audio data recorded therein, as well as for control information such as copyright management information in the corresponding track descriptors. With the audio data and the control information found and ascertained, the target data are checked in accordingly.

10. Coexistence of the Next-Generation MD1 system With the Current MD System

The next-generation MD1 system can use the same disc adopted by the current MD system, even thought the disc format of the next-generation MD1 system differs significantly from the disc format of the current MD system. This necessitates making arrangements that will keep the user from getting confused when using either of the two disc formats on the same disc drive unit 1.

Figure 54:
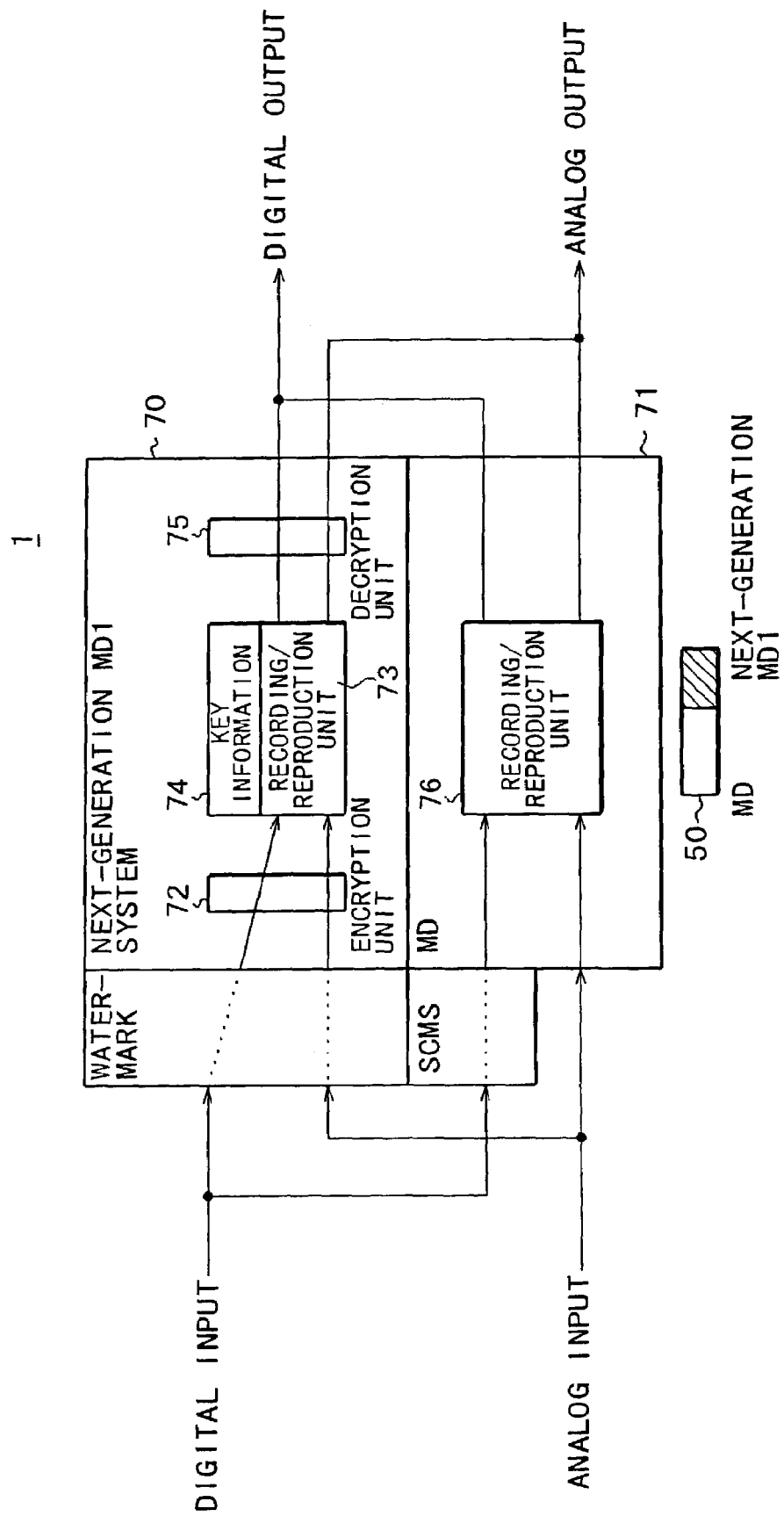
FIG. 54 is a schematic view portraying conceptually how the next-generation MD1 system and the current MD system may coexist in the disc drive unit.

FIG. 54 is a schematic view portraying conceptually how the next-generation MD1 system and the current MD system may coexist in the disc drive unit 1. The disc drive unit 1 complies with both digital and analog formats for the audio signal to be input and output.

Given a digital audio signal, a next-generation MD1 system 70 in FIG. 54 detects a watermark from the signal by a predetermined method, gets an encryption unit 72 to encrypt the signal using key information 74, and feeds the encrypted signal to a recording/reproduction unit 73. If an analog audio signal is supplied, the MD1 system 70 gets an A/D converter, not shown, to covert the signal into a digital audio data signal, detects a watermark from the audio data signal, encrypts the signal, and sends the encrypted signal to the recording/reproduction unit 73. The recording/reproduction unit 73 subjects the encrypted audio data to ATRAC compression encoding. The compression-coded audio data are converted to 1-7 pp modulation format together with the key information 74 before getting recorded to the disc 90, not shown.

If the watermark detected from the input audio signal contains illustratively copy guard information, then the recording/reproduction unit 73 may be inhibited from carrying out any write operation accordingly.

For audio data reproduction, both the audio data and the corresponding key information 74 are read from the disc 90 by the recording/reproduction unit 73. The data are decrypted by a decryption unit 75 using the key information 74, whereby a digital audio signal is acquired. The digital audio signal thus obtained is converted to an analog audio signal by a D/A converter, not shown, for output. Alternatively, the digital audio signal may be output unconverted without the intervention of the D/A converter. A watermark may also be detected from the audio signal being reproduced from the disc 90.

If the detected watermark is judged to include copy guard information, the recording/reproduction unit 73 may be inhibited from carrying out audio data reproduction accordingly.

In a current MD system 71 of FIG. 54, a digital audio signal is furnished with generation management information by SCMS (Serial Copy Management System) before being forwarded to a recording/reproduction unit 76. An analog audio signal, if supplied, is converted to digital audio data by an A/D converter, not shown, before being fed to the recording/reproduction unit 76. The analog audio signal is not furnished with generation management information by SCMS. The recording/reproduction unit 76 submits the received audio data to ATRAC compression encoding. The compression-coded audio data are converted to EFM format before being written to the disc 90, not shown.

For audio data reproduction, the desired audio data are read as a digital audio signal from the disc 90 by the recording/reproduction unit 76. The digital audio signal is converted to an analog audio signal by the D/A converter, not shown, for output. Alternatively, the digital audio signal may be output unconverted without the intervention of the D/A converter.

In the above-described disc drive unit 1 in which the next-generation MD1 system and the current MD system coexist, a switch 50 is provided to switch explicitly between the operation modes of the two MD systems. In particular, the switch 50 is used effectively when audio data are to be recorded to the disc 90.

Figure 55:
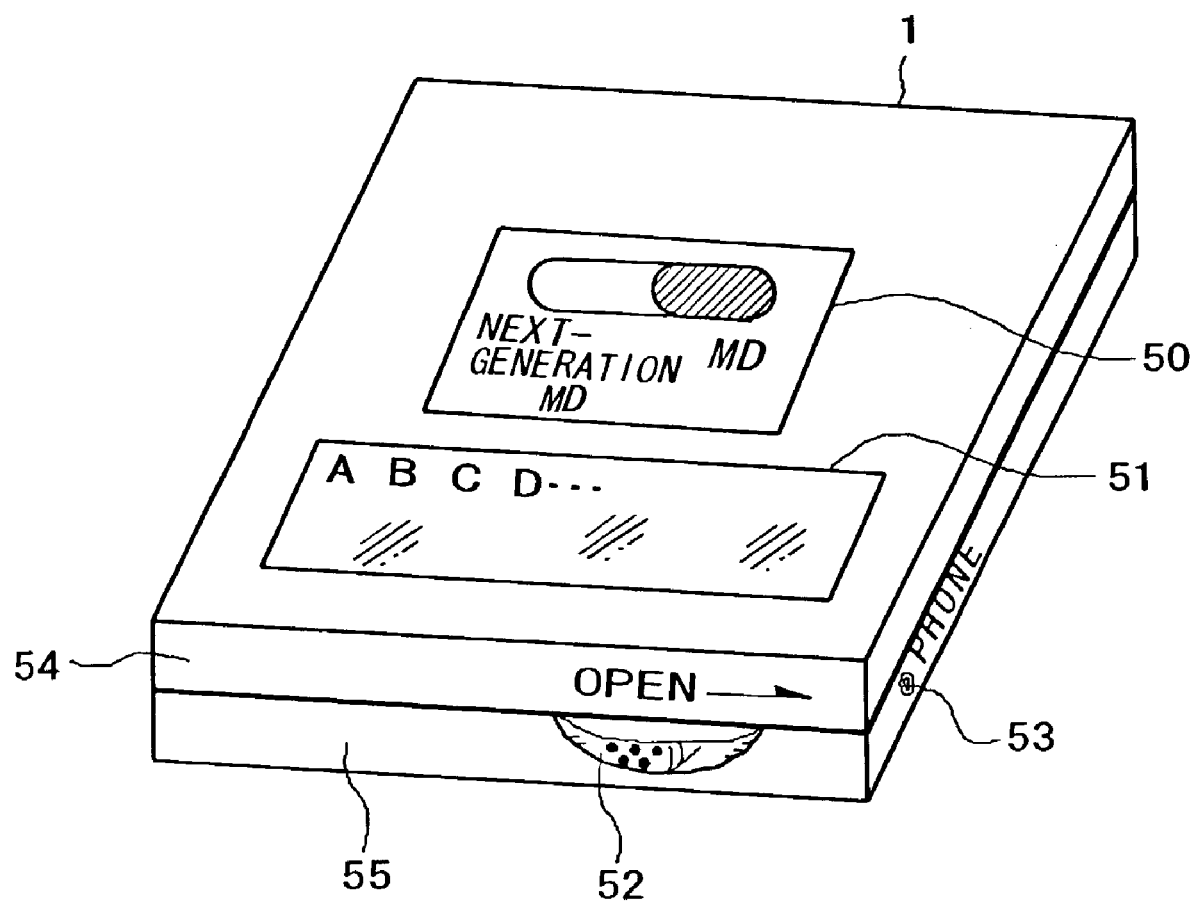
FIG. 55 is an external view of a portable disc drive unit.

FIG. 55 is an external view of a portable-type disc drive unit 1. The disc drive unit 1 is equipped with a hinge, which is located in the rear and hidden in FIG. 55. Sliding on a slider 52 allows a lid 54 around the hinge to swing open away from a body 55. A disc guide appears in the opening through which to insert the disc 90. When the disc 90 is inserted along the guide and the lid 54 is swung shut, the disc 90 is loaded into the disc drive unit 1. With the disc 90 thus loaded, the disc drive unit 1 automatically reads information from the lead-in area and U-TOC area of the disc 90.

A phone jack 53 serves as an analog audio signal output terminal. The user may plug audio reproduction means such as headphones into the phone jack 53 to enjoy the sound of audio data reproduced from the disc 90.

Although not shown in FIG. 55, the disc drive unit 1 is also provided with various keys for control purposes: keys for designating disc operations such as play, record, stop, pause, fast forward, and rewind; keys for editing the audio data and other information held on the disc 90; and keys for inputting commands and data into the disc drive unit 1. These keys are located illustratively on the body 55.

The above-mentioned switch 50 is attached illustratively to the lid 54 of the disc drive unit 1. As shown in FIG. 55, the switch 50 is made fairly large in size and located conspicuously to attract the user's attention. On the disc drive unit 1 in FIG. 55, the switch 50 is shown switchable either to "MD" for the operation mode of the current MD system or to "NEXT-GENERATION MD" for the operation mode of the next-generation MD1 system.

The lid 54 is also equipped with a display unit 51. The display unit 51 displays various operation states of the disc drive unit 1 and track information from the disc 90 loaded in the unit 1. The display unit 51 also gives onscreen indications in conjunction with the operation mode set by use of the switch 50.

Figure 56:
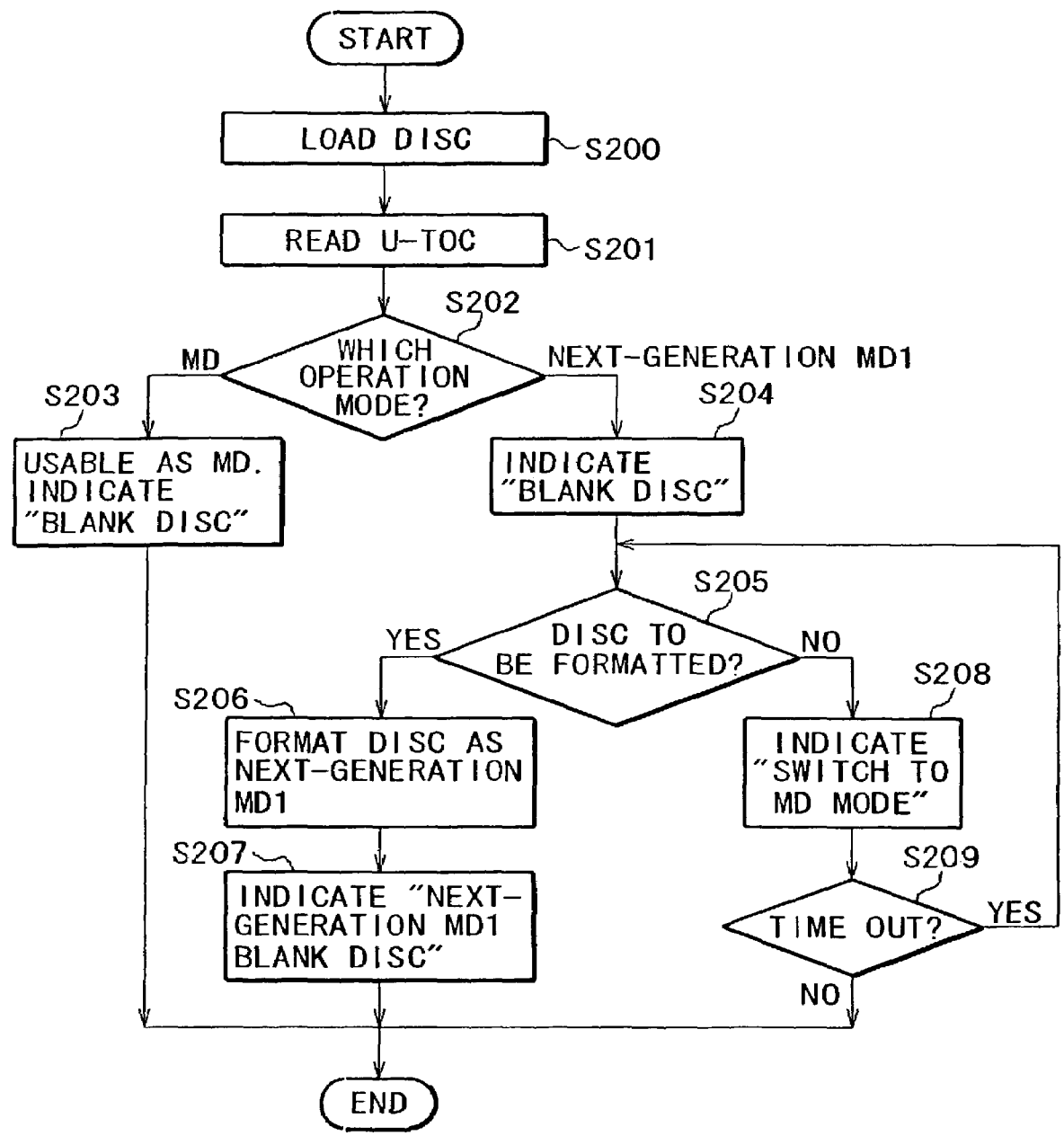
FIG. 56 is a flowchart of steps carried out by the disc drive unit in formatting a disc loaded therein.

Described below with reference to the flowchart of FIG. 56 is how the disc drive unit 1 typically works when formatting the disc 90. The steps in FIG. 56 apply when a so-called virgin disc (unused disc) is to be formatted. In the first step S200 of FIG. 56, a current MD system disc 90 is loaded into the disc drive unit 1. With the disc 90 loaded, step S201 is reached in which information is read first from the lead-in area and then from the U-TOC area on the disc 90.

In step S202, a check is made to see whether the operation mode of the disc drive unit 1 is set by the switch 50 for the current MD system or for the next-generation MD1 system. If in step S202 the operation mode is judged set for the current MD system, step S203 is reached. In step S203, the loaded disc 90 is judged usable as a current MD system disc with no need for further formatting, which is characteristic of the current MD system. The display unit 51 then gives an onscreen indication saying that the disc 90 is a blank disc.

If in step S202 the operation mode of the disc drive unit 1 is judged set for the next-generation MD1 system, then step S204 is reached. In step S204, the display unit 51 indicates that the disc 90 is a blank disc for a period of, say, several seconds before step S205 is reached automatically.

In step S205, the display unit 51 is made to display a message asking the user whether or not to proceed with formatting of the disc 90. If the user gives an instruction specifying that the disc 90 is to be formatted, step S206 is reached. Illustratively, the instruction is entered into the disc drive unit 1 by the user operating a suitable key on the body 55 of the unit 1.

In step S206, the disc drive unit 1 submits the disc 90 to a formatting process of the next-generation MD1 system in the manner described earlier with reference to the flowchart of FIG. 18. While the disc 90 is being formatted, the display unit 51 should preferably indicate the formatting process is in progress. With the formatting process completed in step S206, step S207 is reached. In step S207, the display unit 51 is made to give a message saying that the loaded disc 90 is a blank next-generation MD1 disc.

If in step S205 the user gives an instruction that the disc 90 is not to be formatted, step S205 is followed by step S208. In step S208, the display unit 51 gives an indication prompting the user to set the switch 50 for the operation mode of the current MD system in the disc drive unit 1. In step S209, a check is made, upon elapse of a predetermined period of time, to see whether the setting of the switch 50 stays unchanged despite the indication on the display unit 51. If the setting of the switch 50 is judged unchanged in step S209, a time-out is recognized and control is returned to step S205.

Figure 57:
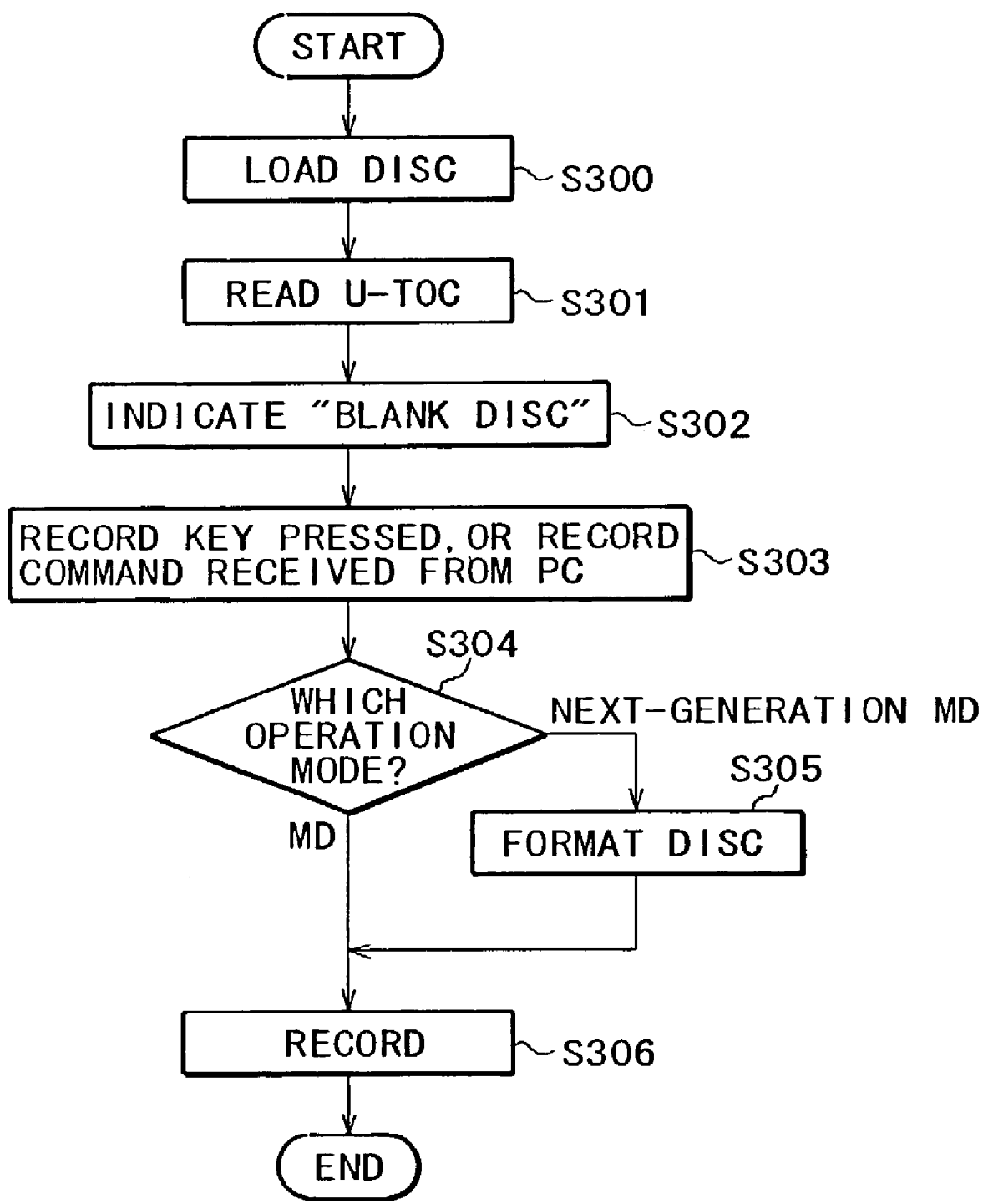
FIG. 57 is a flowchart of steps carried out by the disc drive unit in formatting a virgin disc loaded therein.

FIG. 57 is another flowchart of steps carried out by the disc drive unit 1 in formatting a virgin disc 90 loaded therein. In step S300 of FIG. 57, a blank (unused) disc 90 is loaded into the disc drive unit 1. In step S301, information is read first from the lead-in area and then from the U-TOC area of the disc 90. In step S302, based on the U-TOC information thus acquired, the display unit 51 is made to give an indication that the loaded disc 90 is a blank disc.

In step S303, the record key (not shown) on the disc drive unit 1 is operated to instruct that data are to be recorded to the disc 90 in the disc drive unit 1. The recording instruction may be given to the disc drive unit 1 not only by operation of the record key of the unit 1 but also from, say, the personal computer 100 connected to the disc drive unit 1.

With the recording instruction given to the disc drive unit 1 in step S303, step S304 is reached. In step S304, a check is made to see whether the operation mode of the disc drive unit 1 is set by the switch 50 for the next-generation MD1 system or for the current MD system. If in step S304 the operation mode of the disc drive unit 1 is judged set for the current MD system, then step S306 is reached. In step S306, a recording process of the current MD system is started on the disc 90.

If in step S304 the operation mode of the disc drive unit 1 is judged set for the next-generation MD1 system by the switch 50, step S305 is reached. In step S305, the disc 90 is formatted by the next-generation MD1 system in the manner described earlier with reference to FIG. 18. Step S305 is followed by step S306 in which a recording process of the next-generation MD1 system is started on the formatted disc 90.

Figure 58:
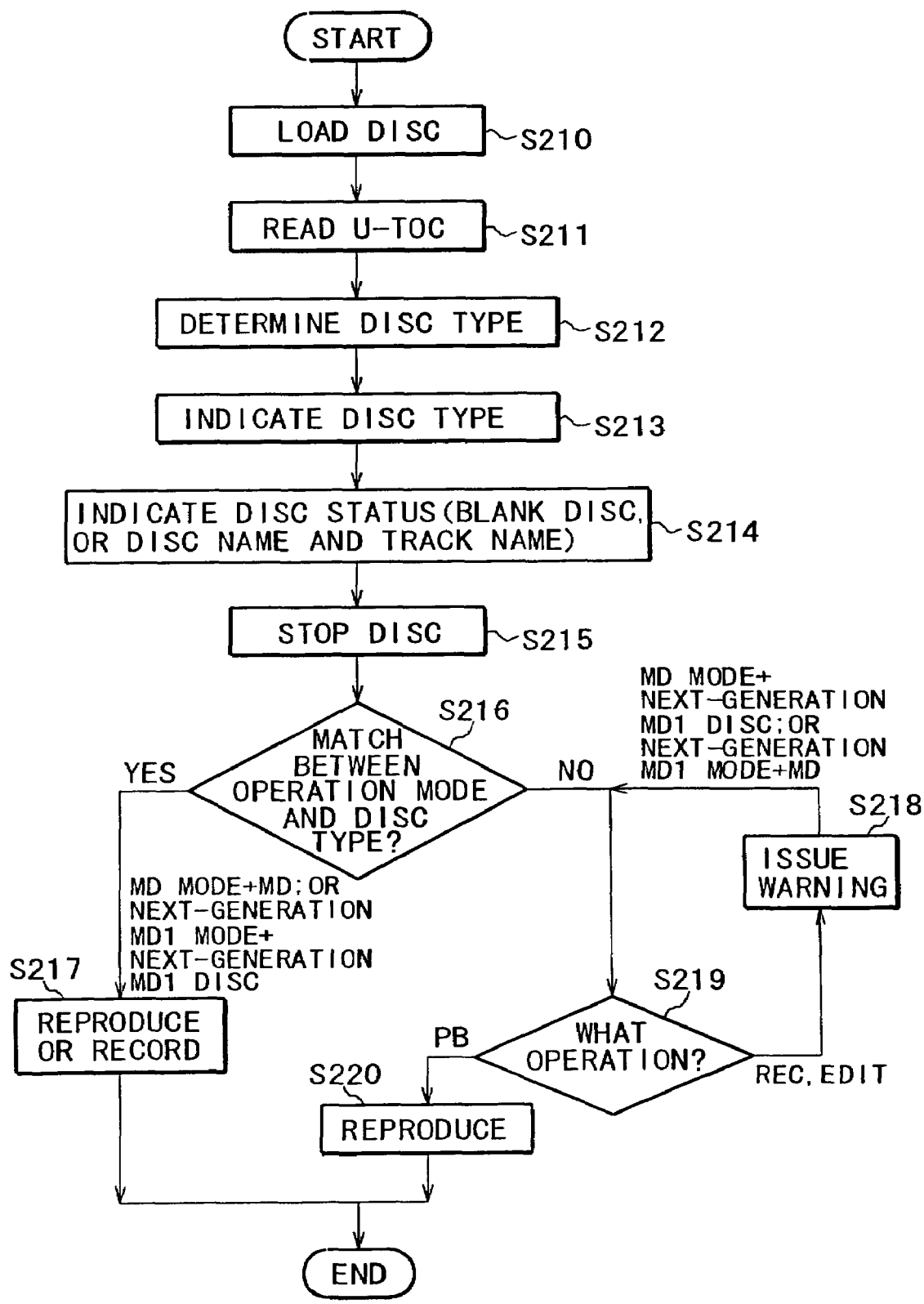
FIG. 58 is a flowchart of steps carried out by the disc drive unit in recording audio data to a disc loaded therein.

Described below with reference to the flowchart of FIG. 58 is how the disc drive unit 1 typically works when recording audio data to the disc 90. The processing varies depending on whether the operation mode of the disc drive unit 1 matches the type of the disc 90, i.e., whether the disc 90 has been formatted by the next-generation MD1 system.

In the first step S210 of FIG. 58, the disc 90 is loaded into the disc drive unit 1. With the disc 90 loaded, step S211 is reached in which information is read first from the lead-in area and then from the U-TOC area of the disc 90.

Based on the U-TOC information thus retrieved, a check is made in step S212 to determine whether the loaded disc 90 has the format of the next-generation MD1 system or the format of the current MD system. The check is made illustratively on the basis of whether FAT data have been retrieved from the U-TOC area. Alternatively, the check may be carried out based on whether alert track start location information is found in the U-TOC area.

In step S213, the display unit 51 is made to indicate the disc type determined in step S212. In step S214, the status of the loaded disc 90 is displayed on the display unit 51 in accordance with the information read from the U-TOC area. Illustratively, the display indicates whether the loaded disc 90 is a blank disc. If the disc 90 is not a blank disc, the disc name and track name information are displayed. In step S215, the rotation of the disc 90 is stopped.

In step S216, a check is made to see if the disc type determined in step S212 matches the operation mode of the disc drive unit 1 set by the switch 50. In case of a match, step S217 is reached.

More specifically, step S217 is reached in one of two cases: where the switch 50 is judged set for the operation mode of the current MD system and the loaded disc 90 turns out to be a current MD system disc on the one hand; and where the switch 50 is judged set for the operation mode of the next-generation MD1 system and the loaded disc 90 is found to have the format of the next-generation MD1 system on the other hand.

In step S217, data may be recorded to or reproduced from the disc 90. It is also possible to edit information in the U-TOC area on the disc 90.

At this point, depending on the disc type determined in step S212, the system controller 9 causes the media drive unit 2 to select using the selector 26 an appropriate signal path complying with the modulation system for the disc type in effect. This makes it possible to switch the demodulation formats automatically between the next-generation MD1 system and the current MD system for audio data reproduction. The file systems are also switched in like manner between the next-generation MD1 system and the current MD system under control of the system controller 9 based on the disc type in effect.

It might happen in step S216 that the disc type determined in step S212 does not match the operation mode of the disc drive unit 1 set by the switch 50. In that case, step S216 is followed by step S219.

More specifically, step S219 is reached in one of two cases: where the switch 50 is judged set for the operation mode of the current MD system and the loaded disc 90 turns out to have the format of the next-generation MD1 system on the one hand; and where the switch 50 is judged set for the operation mode of the next-generation MD1 system and the loaded disc 90 is found to have the format of the current MD system on the other hand.

In step S219, a check is made to see what operation is carried out by the user on the disc 90. If in step S219 the user is judged to have performed an operation to reproduce ("PB") audio data from the disc 90, then step S220 is reached. In step S220, the audio data are reproduced from the disc 90 as instructed by the user.

That is, even if the disc type does not match the operation mode of the disc drive unit 1 set by the switch 50, the audio data recorded on the disc 90 can be reproduced regardless of the setting of the switch 50.

More specifically, depending on the disc type determined in step S212, the system controller 9 causes the media drive unit 2 to select using the selector 26 an appropriate signal path complying with the modulation system for the disc type in effect. This makes it possible to switch the demodulation formats automatically between the next-generation MD1 system and the current MD system for audio data reproduction. The file systems are also switched in like manner between the next-generation MD1 system and the current MD system under control of the system controller 9 based on the disc type in effect.

If in step S219 the user is judged to have performed an operation to record ("REC") audio data to the disc 90 or to erase or otherwise edit ("EDIT") recorded audio data on the disc 90, then step S218 is reached. In step S218, a warning message appears on the display unit 51 saying that the type of the disc 90 does not match the operation mode of the disc drive unit 1. Also displayed is a message saying that recording is not available if the user has designated recording, or that editing is impossible if the user has specified editing.

If in step S219 the user attempts to update the U-TOC area in an editing operation during audio data reproduction, the display unit 51 displays two messages: that the type of the disc 90 does not match the operation mode of the disc drive unit 1, and that editing is not available at this stage.

That is, where the disc type does not comply with the operation mode of the disc drive unit 1 set by the switch 50, no operation, which would modify information recorded on the disc 90, is permitted.

How the disc 90 is changed in its format will now be described. On the disc 90, it is possible to change the format of the next-generation MD1 system into the format of the current MD system and vice versa.

Figure 59:
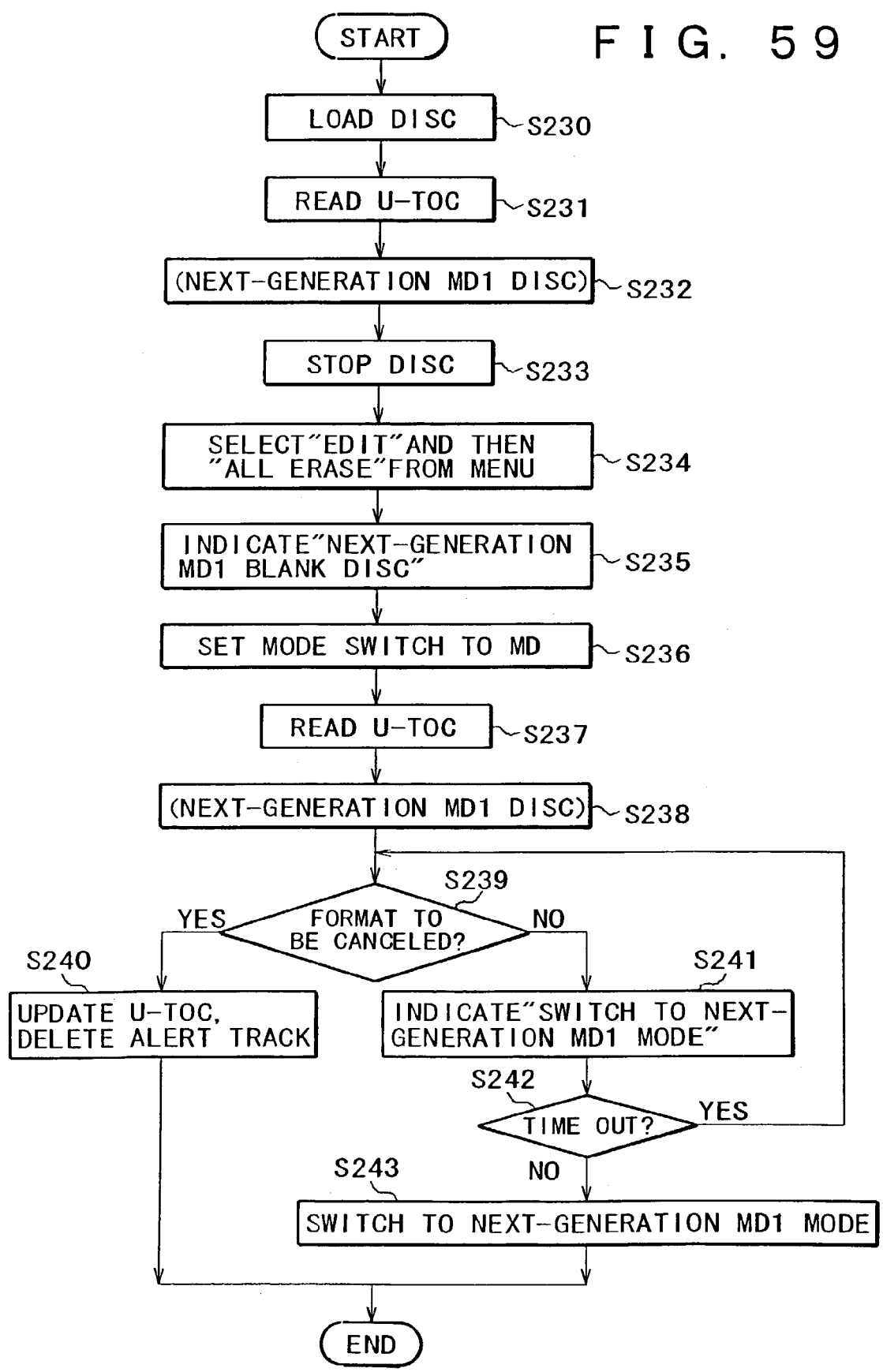
FIG. 59 is a flowchart of steps for switching from the disc format of the next-generation MD1 system to the disc format of the current MD system.

FIG. 59 is a flowchart of steps for switching from the disc format of the next-generation MD1 system to the disc format of the current MD system on the disc 90. It is assumed here that the switch 50 is set in advance for the operation mode of the next-generation MD1 system.

In the first step S230 of FIG. 59, the disc 90 is loaded into the disc drive unit 1. With the disc 90 loaded, step S231 is reached in which information is read first from the lead-in area and then from the U-TOC area of the disc 90. In step S232, it is recognized that the loaded disc 90 has been formatted by the next-generation MD1 system. In step S233, the rotation of the disc 90 is stopped.

In step S234, all data recorded and managed by the FAT system are erased from the disc 90. For example, the user performs an operation to edit data ("EDIT") recorded under the FAT management scheme on the disc 90, and selects from among editing alternatives an operation to erase all data ("ALL ERASE"). It is preferred in step S234 that an indication be given on the display unit 51 asking the user to confirm his or her intention to actually erase all data from the disc 90.

After all data recorded under the FAT management scheme are erased from the disc 90 according to the user's operation, step S235 is reached. In step S235, a message saying that the loaded disc has now become a blank disc appears on the display unit 51.

Step S235 is followed by step S236 in which the user operates the switch 50 to set the operation mode of the disc drive unit 1 for the current MD system. In step S237, information is read from the U-TOC area of the loaded disc 90. In step S238, the disc 90 is recognized as a disc formatted by the next-generation MD1 system.

In step S239, a message saying that the loaded disc is a blank next-generation MD1 system disc on the display unit 51. An indication also appears on the display unit 51 asking the user whether or not to cancel the format of the next-generation MD1 system. Canceling the format of the next-generation MD1 system means switching from the disc format of the next-generation MD1 system to the disc format of the current MD system on the loaded disc 90.

If in step S239 the user is judged to have an operation to cancel the disc format, step S240 is reached. In step S240, the format of the next-generation MD1 system on the loaded disc 90 is canceled. Illustratively, the disc format is canceled erasing the FAT information from the T-TOC area as well as the alert track. Alternatively, the next-generation MD1 system format may be canceled by erasing not the FAT information but the alert track alone.

If in step S239 the user is judged to have performed an operation not to cancel the disc format, step S241 is reached. In step S241, an indication appears on the display unit 51 prompting the user to operate the switch 50 to set the disc drive unit 1 for the operation mode of the next-generation MD1 system.

In step S242, a check is made to see whether the user carries out the operation to set the disc drive unit 1 for the operation mode of the next-generation MD1 system within a predetermined period of time. If the relevant operation is judged performed within the predetermined time period, then step S243 is reached in which the processing is terminated and the loaded disc 90 is rendered usable as a blank disc formatted by the next-generation MD1 system. If in step S242 the setting of the switch 50 is not completed within the predetermined time period, a time-out is recognized and control is returned to step S239.

Switching from the disc format of the current MD system to the disc format of the next-generation MD1 system is performed as follows: the switch 50 is first operated to set the disc drive unit 1 for the operation mode of the current MD system. An operation is carried out to erase from the disc 90 all audio data recorded in the format of the current MD system. Then the disc 90 is formatted anew by the next-generation MD1 system in the manner discussed earlier with reference to FIG. 18.

With the above features in place, the inventive method and apparatus are capable of managing audio data efficiently under control of the FAT system using a storage medium whose specifications are equivalent to those of the current MD system.

While a preferred embodiment of the invention has been described using specific terms, such description is for illustrative purposes only, and it is to be understood that changes and variations may be made without departing from the spirit or scope of the following claims.

The present document contains subject matter related to that disclosed in Japanese Patent Application P2002-099277, filed in the Japanese Patent Office (JPO) on Apr. 1, 2002; Japanese Patent Application P2002-190812, filed in the JPO on Jun. 28, 2002; Japanese Patent Application P2002-099294 filed in the JPO on Apr. 1, 2002; Japanese Patent Application P2002-190811 filed in the JPO on Jun. 28, 2002; Japanese Patent Application P2002-099274 filed in the JPO on Apr. 1, 2002; Japanese Patent Application P2002-190804 filed in the JPO on Jun. 28, 2002; Japanese Patent Application P2002-099278 filed in the JPO on Apr. 1, 2002; Japanese Patent Application P2002-190805 filed Jun. 28, 2002; Japanese Patent Application P2002-099276 filed in the JPO on Apr. 1, 2002; Japanese Patent Application P2002-190808 filed in the JPO on Jun. 28, 2002; Japanese Patent Application P2002-099296 filed in the JPO on Apr. 1, 2002; Japanese Patent Application P2002-190809 filed in the JPO on Jun. 28, 2002; Japanese Patent Application P2002-099272 filed in the JPO on Apr. 1, 2002; Patent Application P2002-190802 filed in the JPO on Jun. 28, 2002; Japanese Patent Application P2002-099271 filed in the JPO on Apr. 1, 2002; Japanese Patent Application P2002-190803 filed in the JPO on Jun. 28, 2002; Japanese Patent Application P2002-099270 filed in the JPO on Apr. 1, 2002; Japanese Patent Application P2002-190578 filed in the JPO on Jun. 28, 2002; Japanese Patent Application P2002-099273 filed in the JPO on Apr. 1, 2002; Japanese Patent Application P2002-190810 filed in the JPO on Jun. 28, 2002; Japanese Patent Application P2002-099279 filed in the JPO on Apr. 1, 2002; and Japanese Patent Application P2002-190801, filed in the JPO on Jun. 28, 2002, the entire contents of each of the above-identified documents being incorporated herein by reference.

What is claimed is:

1. A recording method comprising:

causing a first file allocation table (FAT) management system retained in a first apparatus to manage a storage medium loaded in a second apparatus when the first apparatus and the second apparatus are connected to one another; and recording (1) first general type data to said storage medium based on the first (FAT) management system which is retained in said first apparatus when it is determined that the first general type data transferred from said first apparatus to said second apparatus are to be recorded to said storage medium, said first general type data to be recorded non-sequentially to said storage medium, and (2) recording second audio type data, different from the first general type data and that is to be recorded sequentially to said storage medium, to said storage medium based on a second file allocation table (FAT) management system which is retained in said second apparatus and which sequentially records audio data recording segments when it is determined that the second audio type data transferred from said first apparatus to said second apparatus are to be recorded to said storage medium.

2. A recording method according to claim 1, further comprising:

recording said second audio type data to said storage medium under said second (FAT) management system based on a write request command transferred from said first apparatus to said second apparatus.

3. A recording method according to claim 2, further comprising:

executing software instructions stored in a storing means within said first apparatus so as to output said write request command to record said audio data as the second audio type data stored in said storing means to said storage medium in response to a user-actuated instruction;

transferring said write request command from said first apparatus to said second apparatus;

reading-out said audio data from said storing means;

executing other software instructions so as to compress said audio data and output compressed audio data;

transferring said compressed audio data from said first apparatus to said second apparatus; and recording at said second apparatus said compressed audio data to said storage medium under said second (FAT) management system according to said write request command.

4. A recording method according to claim 3, further comprising:

searching for free areas having at least a predetermined physical length based on said second (FAT) management system configured to manage a file stored in said storage medium;

generating a track descriptor having an attribute of a track and an encryption key configured to encrypt said compressed audio data to be stored in said storage medium;

generating a part descriptor having part pointer information pointing to said file;

recording as encrypted compressed audio data said compressed audio data encrypted with said encryption key in said free areas;

connecting said free areas where said encrypted compressed audio data is recorded to an end of said file managed by said second management system under said second (FAT) management system;

recording the part pointer information pointing to said free areas where said encrypted compressed audio data is recorded in said part descriptor;

recording a decryption key so as to enable later decryption of said encrypted compressed audio data and pointer information pointing to said part descriptor in said track descriptor; and recording a track number that points to said track descriptor in a play order table having a play order of a plurality of tracks.

5. A recording method according to claim 4, wherein said second (FAT) management system is configured to search consecutive free areas having at least a physical length of 64 kilobytes multiplied by four.

6. A recording method in a recording apparatus, comprising:

causing a first file allocation table (FAT) management system retained in a first apparatus to manage a storage medium loaded in said recording apparatus when said recording apparatus and said first apparatus are connected; and recording (1) first general type data to said storage medium based on the first (FAT) management system which is retained in said first apparatus when the first general type data transferred from said first apparatus to said recording apparatus are to be recorded to said storage medium, said first general type data to be recorded non-sequentially to said storage medium, and (2) recording second audio type data, different from the first general type data and that is to be recorded sequentially to said storage medium, to said storage medium based on a second file allocation table (FAT) management system which is retained in said recording apparatus and which sequentially records data recording segments when the second audio type data transferred from said first apparatus to said recording apparatus are to be recorded to said storage medium.

7. An editing method comprising:

causing a first file allocation table (FAT) management system retained in a first apparatus to manage a storage medium loaded in a second apparatus when said first apparatus and said second apparatus are connected; and deleting (1) a part of a first general type file from said storage medium based on the first (FAT) management system which is retained in said first apparatus when said first apparatus instructs said part of said first general type file to be deleted from said storage medium loaded in said second apparatus, said first general type file having been recorded non-sequentially to said storage medium, and (2) deleting a part of a second audio type file, different from said first general type file and that has been recorded sequentially to said storage medium, based on a second file allocation table (FAT) management system which is retained in said second apparatus when said first apparatus instructs said part of said second audio type file to be deleted from said storage medium loaded in said second apparatus.

8. An editing method according to claim 7, wherein a data management method based on said second (FAT) management system comprising:

obtaining track information corresponding to a predetermined track from a play order table having a plurality of track information that respectively point to a track descriptor in a track information table;

obtaining a track descriptor designated by said track information from the track information table, said track descriptor including a decryption key corresponding to a track and pointer information that points to one of a plurality of part descriptors in a part information table;

reading a part descriptor corresponding to said pointer information in said track descriptor; reading a part of said second audio type file according to part pointer information in said part descriptor, said part pointer information pointing to said part of said second audio type file; and decrypting with said decryption key said part of said second audio type file.

9. An editing method according to claim 7, further comprising:

transferring a delete request command and a track identification to be deleted from said first apparatus to second apparatus;

obtaining track information corresponding to said track to be deleted from a play order table;

obtaining a track descriptor designated by said track information from a track information table;

adjusting a play order of a track set to be played after said track to be deleted;

reading a part descriptor corresponding to a pointer information in said track descriptor;

separating a data block as a part of said second audio type file specified by said pointer information from said part descripor from said second audio type file on said second (FAT) management system and freeing said data block on said second (FAT) management system;

freeing said part descriptor; and freeing said track descriptor.

10. An editing method in an editing apparatus, comprising:

causing a first file allocation table (FAT) management system retained in a first apparatus to manage a storage medium loaded in said editing apparatus when said editing apparatus and said first apparatus are connected to one another; and deleting (1) a part of a first general type file based on the first (FAT) management system that is retained in said first apparatus when first apparatus instructs said part of said first general type file to be deleted from said storage medium loaded in said editing apparatus, said first general type file having been recorded non-sequentially to said storage medium, and (2) deleting a part of a second audio type file, different from said first general type file and that has been recorded sequentially to said storage medium, based on a second file allocation table (FAT) management system that is retained in said editing apparatus when said first apparatus instructs said part of said second audio type file to be deleted from said storage medium loaded in said editing apparatus.

* * * * *